US009262794B2

(12) United States Patent
Zhao et al.

(10) Patent No.: US 9,262,794 B2
(45) Date of Patent: Feb. 16, 2016

(54) TRANSACTIONAL VIDEO MARKING SYSTEM

(71) Applicant: Verance Corporation, San Diego, CA (US)

(72) Inventors: Jian Zhao, San Diego, CA (US); Guillaume Mercier, Jouy-en-Josas (FR)

(73) Assignee: Verance Corporation, San Diego, CA (US)

( * ) Notice: Subject to any disclaimer, the term of this patent is extended or adjusted under 35 U.S.C. 154(b) by 0 days.

(21) Appl. No.: 14/214,393

(22) Filed: Mar. 14, 2014

(65) Prior Publication Data

US 2014/0270338 A1    Sep. 18, 2014

Related U.S. Application Data

(60) Provisional application No. 61/785,149, filed on Mar. 14, 2013.

(51) Int. Cl.
*G06K 9/00* (2006.01)
*G06T 1/00* (2006.01)

(52) U.S. Cl.
CPC ............ *G06T 1/0021* (2013.01); *G06T 1/0028* (2013.01); *G06T 1/0071* (2013.01); *G06T 2201/0051* (2013.01); *G06T 2201/0053* (2013.01); *G06T 2201/0202* (2013.01)

(58) Field of Classification Search
CPC ... G06T 1/0021; G06T 1/0028; G06T 1/0035; G06T 1/0042; G06T 1/005; G06T 1/0057; G06T 1/0064; G06T 1/0071; G06T 1/0078; G06T 1/0092; G06T 2201/005; G06T 2201/0051; G06T 2201/0061; H04N 1/32144; H04N 1/3232; H04N 1/32331
See application file for complete search history.

(56) References Cited

U.S. PATENT DOCUMENTS 3,406,344 A   10/1968 Hopper
3,842,196 A   10/1974 Loughlin (Continued)

FOREIGN PATENT DOCUMENTS

CA   2276638    1/2000
CN   1447269    10/2003

(Continued)

OTHER PUBLICATIONS

Office Action dated Nov. 28, 2012 for Japanese Patent Application No. 2011-114666 (8 pages).

(Continued)

*Primary Examiner* — Avinash Yentrapati
(74) *Attorney, Agent, or Firm* — Perkins Coie LLP; Donald L. Wenskay

(57) ABSTRACT

Methods, devices, systems and computer program products facilitate embedding and extraction of transactional watermarks into and from a video content. One method for selecting an area for watermark insertion includes selecting a candidate area within a frame of the video content that is smaller in size that the frame itself, adding a first and a second watermark value to obtain corresponding first and second versions of the area, add noise to each of the first and second versions, and perform watermark extraction operations to obtain corresponding correlation values for the selected area. The above operations are repeated using different areas that are selected at pseudo-random offset values from the previously selected areas until the entire video frame is exhausted. One or more areas with the highest correlation value(s) are selected and designated as areas that are suitable for watermark insertion.

9 Claims, 25 Drawing Sheets

(56) References Cited

U.S. PATENT DOCUMENTS

| | | |
|---|---|---|
| 3,885,217 A | 5/1975 | Cintron |
| 3,894,190 A | 7/1975 | Gassmann |
| 3,919,479 A | 11/1975 | Moon et al. |
| 3,973,206 A | 8/1976 | Haselwood et al. |
| 4,048,562 A | 9/1977 | Haselwood et al. |
| 4,176,379 A | 11/1979 | Wessler et al. |
| 4,199,788 A | 4/1980 | Tsujimura |
| 4,225,967 A | 9/1980 | Miwa et al. |
| 4,230,990 A | 10/1980 | Lert, Jr. et al. |
| 4,281,217 A | 7/1981 | Dolby |
| 4,295,128 A | 10/1981 | Hashemian et al. |
| 4,425,578 A | 1/1984 | Haselwood et al. |
| 4,454,610 A | 6/1984 | Sziklai |
| 4,464,656 A | 8/1984 | Nakamura |
| 4,497,060 A | 1/1985 | Yang |
| 4,512,013 A | 4/1985 | Nash et al. |
| 4,547,804 A | 10/1985 | Greenberg |
| 4,564,862 A | 1/1986 | Cohen |
| 4,593,904 A | 6/1986 | Graves |
| 4,639,779 A | 1/1987 | Greenberg |
| 4,669,089 A | 5/1987 | Gahagan et al. |
| 4,677,466 A | 6/1987 | Lert, Jr. et al. |
| 4,686,707 A | 8/1987 | Iwasaki et al. |
| 4,703,476 A | 10/1987 | Howard |
| 4,706,282 A | 11/1987 | Knowd |
| 4,723,302 A | 2/1988 | Fulmer et al. |
| 4,729,398 A | 3/1988 | Benson et al. |
| 4,739,398 A | 4/1988 | Thomas et al. |
| 4,750,173 A | 6/1988 | Bluthgen |
| 4,755,871 A | 7/1988 | Morales-Garza et al. |
| 4,755,884 A | 7/1988 | Efron et al. |
| 4,764,608 A | 8/1988 | Masuzawa et al. |
| 4,764,808 A | 8/1988 | Solar |
| 4,789,863 A | 12/1988 | Bush |
| 4,805,020 A | 2/1989 | Greenberg |
| 4,807,013 A | 2/1989 | Manocha |
| 4,807,031 A | 2/1989 | Broughton et al. |
| 4,840,602 A | 6/1989 | Rose |
| 4,843,562 A | 6/1989 | Kenyon et al. |
| 4,876,617 A | 10/1989 | Best et al. |
| 4,876,736 A | 10/1989 | Kiewit |
| 4,930,011 A | 5/1990 | Kiewit |
| 4,931,871 A | 6/1990 | Kramer |
| 4,937,807 A | 6/1990 | Weitz et al. |
| 4,939,515 A | 7/1990 | Adelson |
| 4,943,963 A | 7/1990 | Waechter et al. |
| 4,945,412 A | 7/1990 | Kramer |
| 4,967,273 A | 10/1990 | Greenberg |
| 4,969,041 A | 11/1990 | O'Grady et al. |
| 4,972,471 A | 11/1990 | Gross et al. |
| 4,972,503 A | 11/1990 | Zurlinden |
| 4,979,210 A | 12/1990 | Nagata et al. |
| 5,057,915 A | 10/1991 | Von Kohorn |
| 5,073,925 A | 12/1991 | Nagata et al. |
| 5,080,479 A | 1/1992 | Rosenberg |
| 5,113,437 A | 5/1992 | Best et al. |
| 5,116,437 A | 5/1992 | Yamamoto et al. |
| 5,161,251 A | 11/1992 | Mankovitz |
| 5,191,615 A | 3/1993 | Aldava et al. |
| 5,200,822 A | 4/1993 | Bronfin et al. |
| 5,210,820 A | 5/1993 | Kenyon |
| 5,210,831 A | 5/1993 | Emma et al. |
| 5,213,337 A | 5/1993 | Sherman |
| 5,214,792 A | 5/1993 | Alwadish |
| 5,237,611 A | 8/1993 | Rasmussen et al. |
| 5,251,041 A | 10/1993 | Young et al. |
| 5,270,480 A | 12/1993 | Hikawa |
| 5,294,962 A | 3/1994 | Sato et al. |
| 5,294,982 A | 3/1994 | Salomon et al. |
| 5,319,453 A | 6/1994 | Copriviza et al. |
| 5,319,735 A | 6/1994 | Preuss et al. |
| 5,351,304 A | 9/1994 | Yamamoto |
| 5,379,345 A | 1/1995 | Greenberg |
| 5,402,488 A | 3/1995 | Karlock |
| 5,404,160 A | 4/1995 | Schober et al. |
| 5,404,377 A | 4/1995 | Moses |
| 5,408,258 A | 4/1995 | Kolessar |
| 5,414,729 A | 5/1995 | Fenton |
| 5,424,785 A | 6/1995 | Orphan |
| 5,425,100 A | 6/1995 | Thomas et al. |
| 5,432,799 A | 7/1995 | Shimpuku et al. |
| 5,436,653 A | 7/1995 | Ellis et al. |
| 5,450,490 A | 9/1995 | Jensen et al. |
| 5,452,901 A | 9/1995 | Nakada et al. |
| 5,473,631 A | 12/1995 | Moses |
| 5,481,294 A | 1/1996 | Thomas et al. |
| 5,497,372 A | 3/1996 | Nankoh et al. |
| 5,502,576 A | 3/1996 | Ramsay et al. |
| 5,504,518 A | 4/1996 | Ellis et al. |
| 5,508,754 A | 4/1996 | Orphan |
| 5,519,454 A | 5/1996 | Willis |
| 5,523,794 A | 6/1996 | Mankovitz et al. |
| 5,526,427 A | 6/1996 | Thomas et al. |
| 5,537,484 A | 7/1996 | Kobayashi |
| 5,579,124 A | 11/1996 | Aijala et al. |
| 5,581,658 A | 12/1996 | O'Hagan et al. |
| 5,581,800 A | 12/1996 | Fardeau et al. |
| 5,592,553 A | 1/1997 | Guski et al. |
| 5,612,729 A | 3/1997 | Ellis et al. |
| 5,613,004 A | 3/1997 | Cooperman et al. |
| 5,636,292 A | 6/1997 | Rhoads |
| 5,664,018 A | 9/1997 | Leighton |
| 5,687,191 A | 11/1997 | Lee et al. |
| 5,687,236 A | 11/1997 | Moskowitz et al. |
| 5,699,427 A | 12/1997 | Chow et al. |
| 5,719,619 A | 2/1998 | Hattori et al. |
| 5,719,937 A | 2/1998 | Warren et al. |
| 5,737,329 A | 4/1998 | Horiguchi |
| 5,752,880 A | 5/1998 | Gabai et al. |
| 5,761,606 A | 6/1998 | Wolzien |
| 5,764,763 A | 6/1998 | Jensen et al. |
| 5,778,108 A | 7/1998 | Coleman, Jr. |
| 5,787,334 A | 7/1998 | Fardeau et al. |
| 5,805,635 A | 9/1998 | Andrews, Jr. et al. |
| 5,809,064 A | 9/1998 | Fenton et al. |
| 5,809,139 A | 9/1998 | Girod et al. |
| 5,819,289 A | 10/1998 | Sanford, II et al. |
| 5,822,360 A | 10/1998 | Lee et al. |
| 5,822,432 A | 10/1998 | Moskowitz et al. |
| 5,825,892 A | 10/1998 | Braudaway et al. |
| 5,828,325 A | 10/1998 | Wolosewicz et al. |
| 5,832,119 A | 11/1998 | Rhoads |
| 5,841,978 A | 11/1998 | Rhoads |
| 5,848,155 A | 12/1998 | Cox |
| 5,850,249 A | 12/1998 | Massetti et al. |
| 5,850,481 A | 12/1998 | Rhoads |
| 5,862,260 A | 1/1999 | Rhoads |
| 5,870,030 A | 2/1999 | DeLuca et al. |
| 5,887,243 A | 3/1999 | Harvey et al. |
| 5,889,868 A | 3/1999 | Moskowitz et al. |
| 5,892,900 A | 4/1999 | Ginter et al. |
| 5,893,067 A | 4/1999 | Bender et al. |
| 5,901,178 A | 5/1999 | Lee et al. |
| 5,905,800 A | 5/1999 | Moskowitz et al. |
| 5,930,369 A | 7/1999 | Cox et al. |
| 5,933,798 A | 8/1999 | Linnartz |
| 5,937,000 A | 8/1999 | Lee et al. |
| 5,940,124 A | 8/1999 | Janko et al. |
| 5,940,134 A | 8/1999 | Wirtz |
| 5,940,135 A | 8/1999 | Petrovic et al. |
| 5,940,429 A | 8/1999 | Lam et al. |
| 5,943,422 A | 8/1999 | Van Wie et al. |
| 5,945,932 A | 8/1999 | Smith et al. |
| 5,949,885 A | 9/1999 | Leighton |
| 5,960,081 A | 9/1999 | Vynne et al. |
| 5,963,909 A | 10/1999 | Warren et al. |
| 5,986,692 A | 11/1999 | Logan et al. |
| 6,021,432 A | 2/2000 | Sizer, II et al. |
| 6,031,914 A | 2/2000 | Tewfik et al. |
| 6,035,171 A | 3/2000 | Takaya et al. |
| 6,035,177 A | 3/2000 | Moses et al. |
| 6,037,984 A | 3/2000 | Isnardi et al. |
| 6,044,156 A | 3/2000 | Honsinger et al. |
| 6,061,793 A | 5/2000 | Tewfik et al. |

(56) References Cited

U.S. PATENT DOCUMENTS

| | | |
|---|---|---|
| 6,067,440 A | 5/2000 | Diefes |
| 6,078,664 A | 6/2000 | Moskowitz et al. |
| 6,094,228 A | 7/2000 | Ciardullo et al. |
| 6,101,310 A | 8/2000 | Terada et al. |
| 6,122,610 A | 9/2000 | Isabelle |
| 6,128,597 A | 10/2000 | Kolluru et al. |
| 6,145,081 A | 11/2000 | Winograd et al. |
| 6,154,571 A | 11/2000 | Cox et al. |
| 6,160,986 A | 12/2000 | Gabai et al. |
| 6,173,271 B1 | 1/2001 | Goodman et al. |
| 6,175,627 B1 | 1/2001 | Petrovic et al. |
| 6,189,123 B1 | 2/2001 | Anders Nystrom et al. |
| 6,209,092 B1 | 3/2001 | Linnartz |
| 6,209,094 B1 | 3/2001 | Levine et al. |
| 6,222,932 B1 | 4/2001 | Rao et al. |
| 6,229,572 B1 | 5/2001 | Ciardullo et al. |
| 6,233,347 B1 | 5/2001 | Chen et al. |
| 6,246,775 B1 | 6/2001 | Nakamura et al. |
| 6,246,802 B1 | 6/2001 | Fujihara et al. |
| 6,249,870 B1 | 6/2001 | Kobayashi et al. |
| 6,252,972 B1 | 6/2001 | Linnartz |
| 6,253,113 B1 | 6/2001 | Lu |
| 6,253,189 B1 | 6/2001 | Feezell et al. |
| 6,268,866 B1 | 7/2001 | Shibata |
| 6,278,792 B1 | 8/2001 | Cox et al. |
| 6,282,299 B1 | 8/2001 | Tewfik et al. |
| 6,285,774 B1 | 9/2001 | Schumann et al. |
| 6,289,108 B1 | 9/2001 | Rhoads |
| 6,290,566 B1 | 9/2001 | Gabai et al. |
| 6,330,335 B1 | 12/2001 | Rhoads |
| 6,330,672 B1 | 12/2001 | Shur |
| 6,332,031 B1 | 12/2001 | Rhoads et al. |
| 6,332,194 B1 | 12/2001 | Bloom et al. |
| 6,353,672 B1 | 3/2002 | Rhoads |
| 6,363,159 B1 | 3/2002 | Rhoads |
| 6,373,974 B2 | 4/2002 | Zeng |
| 6,374,036 B1 | 4/2002 | Ryan et al. |
| 6,381,341 B1 | 4/2002 | Rhoads |
| 6,385,330 B1 | 5/2002 | Powell et al. |
| 6,388,712 B1 | 5/2002 | Shinohara et al. |
| 6,389,152 B2 | 5/2002 | Nakamura et al. |
| 6,389,538 B1 | 5/2002 | Gruse et al. |
| 6,400,826 B1 | 6/2002 | Chen et al. |
| 6,400,827 B1 | 6/2002 | Rhoads |
| 6,404,781 B1 | 6/2002 | Kawamae et al. |
| 6,404,898 B1 | 6/2002 | Rhoads |
| 6,411,725 B1 | 6/2002 | Rhoads |
| 6,415,040 B1 | 7/2002 | Linnartz et al. |
| 6,415,041 B1 | 7/2002 | Oami et al. |
| 6,424,726 B2 | 7/2002 | Nakano et al. |
| 6,427,012 B1 | 7/2002 | Petrovic |
| 6,430,301 B1 | 8/2002 | Petrovic |
| 6,430,302 B2 | 8/2002 | Rhoads |
| 6,442,285 B2 | 8/2002 | Rhoads et al. |
| 6,449,367 B2 | 9/2002 | Van Wie et al. |
| 6,449,496 B1 | 9/2002 | Beith et al. |
| 6,473,560 B1 | 10/2002 | Linnartz et al. |
| 6,477,431 B1 | 11/2002 | Kalker et al. |
| 6,487,301 B1 | 11/2002 | Zhao |
| 6,490,355 B1 | 12/2002 | Epstein |
| 6,496,591 B1 | 12/2002 | Rhoads |
| 6,505,160 B1 | 1/2003 | Levy et al. |
| 6,510,233 B1 | 1/2003 | Nakano |
| 6,510,234 B1 | 1/2003 | Cox et al. |
| 6,512,837 B1 | 1/2003 | Ahmed |
| 6,523,113 B1 | 2/2003 | Wehrenberg |
| 6,529,506 B1 | 3/2003 | Yamamoto et al. |
| 6,530,021 B1 | 3/2003 | Epstein et al. |
| 6,550,011 B1 | 4/2003 | Sims, III |
| 6,553,127 B1 | 4/2003 | Kurowski |
| 6,556,688 B1 | 4/2003 | Ratnakar |
| 6,557,103 B1 | 4/2003 | Boncelet, Jr. et al. |
| 6,570,996 B1 | 5/2003 | Linnartz |
| 6,571,144 B1 | 5/2003 | Moses et al. |
| 6,574,350 B1 | 6/2003 | Rhoads et al. |
| 6,577,744 B1 | 6/2003 | Braudaway et al. |
| 6,584,138 B1 | 6/2003 | Neubauer et al. |
| 6,590,996 B1 | 7/2003 | Reed et al. |
| 6,590,997 B2 | 7/2003 | Rhoads |
| 6,591,365 B1 | 7/2003 | Cookson |
| 6,592,516 B2 | 7/2003 | Lee |
| 6,598,162 B1 | 7/2003 | Moskowitz |
| 6,614,914 B1 | 9/2003 | Rhoads et al. |
| 6,618,484 B1 | 9/2003 | Van Wie et al. |
| 6,625,297 B1 | 9/2003 | Bradley |
| 6,628,729 B1 | 9/2003 | Sorensen |
| 6,633,653 B1 | 10/2003 | Hobson et al. |
| 6,636,615 B1 | 10/2003 | Rhoads et al. |
| 6,636,967 B1 | 10/2003 | Koyano |
| 6,647,128 B1 | 11/2003 | Rhoads |
| 6,647,129 B2 | 11/2003 | Rhoads |
| 6,654,501 B1 | 11/2003 | Acharya et al. |
| 6,661,905 B1 | 12/2003 | Chupp et al. |
| 6,665,419 B1 | 12/2003 | Oami |
| 6,668,068 B2 | 12/2003 | Hashimoto |
| 6,671,376 B1 | 12/2003 | Koto et al. |
| 6,671,388 B1 | 12/2003 | Op De Beeck et al. |
| 6,674,861 B1 | 1/2004 | Xu et al. |
| 6,674,876 B1 * | 1/2004 | Hannigan et al. ............ 382/100 |
| 6,675,146 B2 | 1/2004 | Rhoads |
| 6,678,389 B1 | 1/2004 | Sun et al. |
| 6,681,029 B1 | 1/2004 | Rhoads |
| 6,683,958 B2 | 1/2004 | Petrovic |
| 6,697,944 B1 | 2/2004 | Jones et al. |
| 6,700,990 B1 | 3/2004 | Rhoads |
| 6,704,431 B1 | 3/2004 | Ogawa et al. |
| 6,707,926 B1 | 3/2004 | Macy et al. |
| 6,721,439 B1 | 4/2004 | Levy et al. |
| 6,728,390 B2 | 4/2004 | Rhoads et al. |
| 6,737,957 B1 | 5/2004 | Petrovic et al. |
| 6,738,495 B2 | 5/2004 | Rhoads et al. |
| 6,744,906 B2 | 6/2004 | Rhoads et al. |
| 6,748,360 B2 | 6/2004 | Pitman et al. |
| 6,751,337 B2 | 6/2004 | Tewfik et al. |
| 6,757,405 B1 | 6/2004 | Muratani et al. |
| 6,757,908 B1 | 6/2004 | Vogel |
| 6,760,463 B2 | 7/2004 | Rhoads |
| 6,768,807 B1 | 7/2004 | Muratani |
| 6,771,797 B2 | 8/2004 | Ahmed |
| 6,785,399 B2 | 8/2004 | Fujihara |
| 6,785,401 B2 | 8/2004 | Walker et al. |
| 6,785,815 B1 | 8/2004 | Serret-Avila et al. |
| 6,792,542 B1 | 9/2004 | Lee et al. |
| 6,798,893 B1 | 9/2004 | Tanaka |
| 6,801,999 B1 | 10/2004 | Venkatesan et al. |
| 6,810,527 B1 | 10/2004 | Conrad et al. |
| 6,823,455 B1 | 11/2004 | Macy et al. |
| 6,829,368 B2 | 12/2004 | Meyer et al. |
| 6,829,582 B1 | 12/2004 | Barsness |
| 6,834,344 B1 | 12/2004 | Aggarwal et al. |
| 6,834,345 B2 | 12/2004 | Bloom et al. |
| 6,850,555 B1 | 2/2005 | Barclay |
| 6,850,626 B2 | 2/2005 | Rhoads et al. |
| 6,856,693 B2 | 2/2005 | Miller |
| 6,871,180 B1 | 3/2005 | Neuhauser et al. |
| 6,880,082 B2 | 4/2005 | Ohta |
| 6,888,943 B1 | 5/2005 | Lam et al. |
| 6,891,958 B2 | 5/2005 | Kirovski et al. |
| 6,912,010 B2 | 6/2005 | Baker et al. |
| 6,912,294 B2 | 6/2005 | Wang et al. |
| 6,912,315 B1 | 6/2005 | Wong et al. |
| 6,915,002 B2 | 7/2005 | Gustafson |
| 6,915,422 B1 | 7/2005 | Nakamura |
| 6,915,481 B1 | 7/2005 | Tewfik et al. |
| 6,928,233 B1 | 8/2005 | Walker et al. |
| 6,931,536 B2 | 8/2005 | Hollar |
| 6,944,313 B1 | 9/2005 | Donescu |
| 6,944,771 B2 | 9/2005 | Epstein |
| 6,947,571 B1 | 9/2005 | Rhoads et al. |
| 6,947,893 B1 | 9/2005 | Iwaki et al. |
| 6,952,774 B1 | 10/2005 | Kirovski et al. |
| 6,954,541 B2 | 10/2005 | Fan et al. |
| 6,961,854 B2 | 11/2005 | Serret-Avila et al. |
| 6,973,195 B1 | 12/2005 | Matsui |

(56) References Cited

U.S. PATENT DOCUMENTS

| | | | |
|---|---|---|---|
| 6,993,154 B2 | 1/2006 | Brunk |
| 6,996,249 B2 | 2/2006 | Miller et al. |
| 7,007,166 B1 | 2/2006 | Moskowitz et al. |
| 7,020,304 B2 | 3/2006 | Alattar et al. |
| 7,024,018 B2 | 4/2006 | Petrovic |
| 7,043,049 B2 | 5/2006 | Kuzma |
| 7,043,536 B1 | 5/2006 | Philyaw et al. |
| 7,043,638 B2 | 5/2006 | McGrath et al. |
| 7,046,808 B1 | 5/2006 | Metois et al. |
| 7,054,461 B2 | 5/2006 | Zeller et al. |
| 7,054,462 B2 | 5/2006 | Rhoads et al. |
| 7,058,809 B2 | 6/2006 | White et al. |
| 7,058,815 B2 | 6/2006 | Morin |
| 7,068,809 B2 | 6/2006 | Stach |
| 7,072,492 B2 | 7/2006 | Ogawa et al. |
| 7,103,678 B2 | 9/2006 | Asai et al. |
| 7,107,452 B2 | 9/2006 | Serret-Avila et al. |
| 7,111,169 B2 | 9/2006 | Ripley et al. |
| 7,113,613 B2 | 9/2006 | Echizen et al. |
| 7,123,718 B1 | 10/2006 | Moskowitz et al. |
| 7,142,691 B2 | 11/2006 | Levy |
| 7,159,118 B2 | 1/2007 | Petrovic |
| 7,162,642 B2 | 1/2007 | Schumann et al. |
| 7,164,778 B1 | 1/2007 | Nakamura et al. |
| 7,167,560 B2 | 1/2007 | Yu |
| 7,167,599 B1 | 1/2007 | Diehl |
| 7,171,020 B2 | 1/2007 | Rhoads et al. |
| 7,177,429 B2 | 2/2007 | Moskowitz et al. |
| 7,197,368 B2 | 3/2007 | Kirovski et al. |
| 7,206,649 B2 | 4/2007 | Kirovski et al. |
| 7,224,819 B2 | 5/2007 | Levy et al. |
| 7,231,061 B2 | 6/2007 | Bradley |
| 7,289,643 B2 | 10/2007 | Brunk et al. |
| 7,298,865 B2 | 11/2007 | Lubin et al. |
| 7,319,759 B1 | 1/2008 | Peinado et al. |
| 7,321,666 B2 | 1/2008 | Kunisa |
| 7,334,247 B1 | 2/2008 | Finseth et al. |
| 7,336,802 B2 | 2/2008 | Kunisa |
| 7,346,514 B2 | 3/2008 | Herre et al. |
| 7,369,677 B2 | 5/2008 | Petrovic et al. |
| 7,369,678 B2 | 5/2008 | Rhoads |
| 7,389,421 B2 | 6/2008 | Kirovski et al. |
| 7,409,073 B2 * | 8/2008 | Moskowitz et al. ......... 382/100 |
| 7,430,670 B1 | 9/2008 | Horning et al. |
| 7,450,727 B2 | 11/2008 | Griesinger |
| 7,454,019 B2 | 11/2008 | Williams |
| 7,460,667 B2 | 12/2008 | Lee et al. |
| 7,562,392 B1 | 7/2009 | Rhoads et al. |
| 7,581,103 B2 | 8/2009 | Home et al. |
| 7,587,601 B2 | 9/2009 | Levy et al. |
| 7,616,776 B2 | 11/2009 | Petrovic et al. |
| 7,617,509 B1 | 11/2009 | Brunheroto et al. |
| 7,630,497 B2 | 12/2009 | Lotspiech et al. |
| 7,644,282 B2 | 1/2010 | Petrovic et al. |
| 7,660,991 B2 | 2/2010 | Nakamura et al. |
| 7,664,332 B2 | 2/2010 | Wong et al. |
| 7,693,297 B2 | 4/2010 | Zhang et al. |
| 7,698,570 B2 | 4/2010 | Schumann et al. |
| 7,756,272 B2 | 7/2010 | Kocher et al. |
| 7,788,684 B2 | 8/2010 | Petrovic et al. |
| 7,788,693 B2 | 8/2010 | Robbins |
| 7,818,763 B2 | 10/2010 | Sie et al. |
| 7,840,006 B2 | 11/2010 | Ogawa et al. |
| 7,979,881 B1 | 7/2011 | Wong et al. |
| 7,983,922 B2 | 7/2011 | Neusinger et al. |
| 7,986,806 B2 | 7/2011 | Rhoads |
| 7,991,995 B2 | 8/2011 | Rabin et al. |
| 8,005,258 B2 | 8/2011 | Petrovic et al. |
| 8,015,410 B2 | 9/2011 | Pelly et al. |
| 8,055,013 B2 | 11/2011 | Levy et al. |
| 8,059,815 B2 | 11/2011 | Lofgren et al. |
| 8,059,858 B2 * | 11/2011 | Brundage et al. ......... 382/100 |
| 8,085,935 B2 | 12/2011 | Petrovic |
| 8,106,744 B2 | 1/2012 | Petrovic et al. |
| 8,106,745 B2 | 1/2012 | Petrovic et al. |
| 8,138,930 B1 | 3/2012 | Heath |
| 8,151,113 B2 | 4/2012 | Rhoads |
| 8,155,463 B2 | 4/2012 | Wong et al. |
| 8,181,262 B2 | 5/2012 | Cooper et al. |
| 8,189,861 B1 | 5/2012 | Rucklidge |
| 8,194,803 B2 | 6/2012 | Baum et al. |
| 8,249,992 B2 | 8/2012 | Harkness et al. |
| 8,259,938 B2 | 9/2012 | Petrovic et al. |
| 8,280,103 B2 | 10/2012 | Petrovic et al. |
| 8,301,893 B2 * | 10/2012 | Brundage ............... 713/176 |
| 8,315,835 B2 | 11/2012 | Tian et al. |
| 8,321,679 B2 | 11/2012 | Petrovic et al. |
| 8,340,348 B2 | 12/2012 | Petrovic et al. |
| 8,346,532 B2 | 1/2013 | Chakra et al. |
| 8,346,567 B2 | 1/2013 | Petrovic et al. |
| 8,451,086 B2 | 5/2013 | Petrovic et al. |
| 8,467,717 B2 | 6/2013 | Croy et al. |
| 8,479,225 B2 | 7/2013 | Covell et al. |
| 8,533,481 B2 | 9/2013 | Petrovic et al. |
| 8,538,066 B2 | 9/2013 | Petrovic et al. |
| 8,588,459 B2 | 11/2013 | Bloom et al. |
| 8,589,969 B2 | 11/2013 | Falcon |
| 8,601,504 B2 | 12/2013 | Stone et al. |
| 8,615,104 B2 | 12/2013 | Petrovic et al. |
| 8,681,978 B2 | 3/2014 | Petriovic et al. |
| 8,682,026 B2 | 3/2014 | Petrovic et al. |
| 8,726,304 B2 | 5/2014 | Petrovic et al. |
| 8,745,403 B2 | 6/2014 | Petrovic |
| 8,781,967 B2 | 7/2014 | Tehranchi et al. |
| 8,791,789 B2 | 7/2014 | Petrovic et al. |
| 8,806,517 B2 | 8/2014 | Petrovic et al. |
| 8,811,655 B2 | 8/2014 | Petrovic et al. |
| 8,838,977 B2 | 9/2014 | Winograd et al. |
| 8,838,978 B2 | 9/2014 | Winograd et al. |
| 8,869,222 B2 | 10/2014 | Winograd et al. |
| 8,923,548 B2 | 12/2014 | Petrovic et al. |
| 9,009,482 B2 | 4/2015 | Winograd |
| 9,055,239 B2 | 6/2015 | Tehranchi et al. |
| 9,106,964 B2 | 8/2015 | Zhao |
| 9,117,270 B2 | 8/2015 | Wong et al. |
| 2001/0001159 A1 | 5/2001 | Ford |
| 2001/0021926 A1 | 9/2001 | Schneck et al. |
| 2001/0022786 A1 | 9/2001 | King et al. |
| 2001/0025341 A1 | 9/2001 | Marshall |
| 2001/0044899 A1 | 11/2001 | Levy |
| 2001/0051996 A1 | 12/2001 | Cooper et al. |
| 2001/0054146 A1 | 12/2001 | Carro et al. |
| 2002/0007403 A1 | 1/2002 | Echizen et al. |
| 2002/0010684 A1 | 1/2002 | Moskowitz |
| 2002/0012443 A1 | 1/2002 | Rhoads et al. |
| 2002/0019769 A1 | 2/2002 | Barritz et al. |
| 2002/0033844 A1 | 3/2002 | Levy et al. |
| 2002/0044659 A1 | 4/2002 | Ohta |
| 2002/0052885 A1 | 5/2002 | Levy |
| 2002/0053026 A1 | 5/2002 | Hashimoto |
| 2002/0054089 A1 | 5/2002 | Nicholas et al. |
| 2002/0068987 A1 | 6/2002 | Hars |
| 2002/0080964 A1 | 6/2002 | Stone et al. |
| 2002/0080976 A1 | 6/2002 | Schreer |
| 2002/0082731 A1 | 6/2002 | Pitman et al. |
| 2002/0095577 A1 | 7/2002 | Nakamura et al. |
| 2002/0097873 A1 | 7/2002 | Petrovic |
| 2002/0120849 A1 | 8/2002 | McKinley et al. |
| 2002/0120854 A1 | 8/2002 | LeVine et al. |
| 2002/0126842 A1 | 9/2002 | Hollar |
| 2002/0126872 A1 | 9/2002 | Brunk et al. |
| 2002/0138734 A1 | 9/2002 | David et al. |
| 2002/0154144 A1 | 10/2002 | Lofgren et al. |
| 2002/0168087 A1 | 11/2002 | Petrovic |
| 2002/0178368 A1 | 11/2002 | Yin et al. |
| 2002/0199106 A1 | 12/2002 | Hayashi |
| 2003/0009671 A1 | 1/2003 | Yacobi et al. |
| 2003/0012098 A1 | 1/2003 | Sako et al. |
| 2003/0012403 A1 | 1/2003 | Rhoads et al. |
| 2003/0016825 A1 | 1/2003 | Jones |
| 2003/0021439 A1 | 1/2003 | Lubin et al. |
| 2003/0021441 A1 | 1/2003 | Levy et al. |
| 2003/0028796 A1 | 2/2003 | Roberts et al. |
| 2003/0031317 A1 | 2/2003 | Epstein |

(56) References Cited

U.S. PATENT DOCUMENTS

| | | |
|---|---|---|
| 2003/0033321 A1 | 2/2003 | Schrempp et al. |
| 2003/0037075 A1 | 2/2003 | Hannigan et al. |
| 2003/0053655 A1 | 3/2003 | Barone et al. |
| 2003/0056213 A1 | 3/2003 | McFaddin et al. |
| 2003/0061489 A1 | 3/2003 | Pelly et al. |
| 2003/0063747 A1 | 4/2003 | Petrovic |
| 2003/0070075 A1 | 4/2003 | Deguillaume et al. |
| 2003/0072468 A1 | 4/2003 | Brunk et al. |
| 2003/0076955 A1 | 4/2003 | Alve et al. |
| 2003/0078891 A1 | 4/2003 | Capitant |
| 2003/0081780 A1 | 5/2003 | Kim |
| 2003/0081809 A1 | 5/2003 | Fridrich et al. |
| 2003/0112974 A1 | 6/2003 | Levy |
| 2003/0112997 A1 | 6/2003 | Ahmed |
| 2003/0115504 A1 | 6/2003 | Holliman et al. |
| 2003/0131350 A1 | 7/2003 | Peiffer et al. |
| 2003/0152225 A1 | 8/2003 | Kunisa |
| 2003/0174862 A1 | 9/2003 | Rhoads et al. |
| 2003/0177359 A1 | 9/2003 | Bradley |
| 2003/0179901 A1 | 9/2003 | Tian et al. |
| 2003/0185417 A1 | 10/2003 | Alattar et al. |
| 2003/0187679 A1 | 10/2003 | Odgers et al. |
| 2003/0188166 A1 | 10/2003 | Pelly et al. |
| 2003/0190054 A1 | 10/2003 | Troyansky et al. |
| 2003/0190055 A1 | 10/2003 | Kalker et al. |
| 2003/0200438 A1 | 10/2003 | Kirovski et al. |
| 2003/0223584 A1 | 12/2003 | Bradley et al. |
| 2004/0005076 A1 | 1/2004 | Hosaka et al. |
| 2004/0008864 A1 | 1/2004 | Watson et al. |
| 2004/0009763 A1 | 1/2004 | Stone et al. |
| 2004/0010692 A1 | 1/2004 | Watson |
| 2004/0015400 A1 | 1/2004 | Whymark |
| 2004/0025023 A1 | 2/2004 | Yamada et al. |
| 2004/0025176 A1 | 2/2004 | Franklin et al. |
| 2004/0028255 A1 | 2/2004 | Miller |
| 2004/0042635 A1 | 3/2004 | Epstein et al. |
| 2004/0042636 A1 | 3/2004 | Oh |
| 2004/0073916 A1 | 4/2004 | Petrovic et al. |
| 2004/0078575 A1 | 4/2004 | Morten et al. |
| 2004/0088556 A1 | 5/2004 | Weirauch |
| 2004/0091111 A1 | 5/2004 | Levy et al. |
| 2004/0093202 A1 | 5/2004 | Fischer et al. |
| 2004/0093523 A1 | 5/2004 | Matsuzaki et al. |
| 2004/0098593 A1 | 5/2004 | Muratani |
| 2004/0101160 A1* | 5/2004 | Kunisa ............... 382/100 |
| 2004/0103293 A1 | 5/2004 | Ryan |
| 2004/0111740 A1 | 6/2004 | Seok et al. |
| 2004/0120544 A1 | 6/2004 | Eguchi et al. |
| 2004/0133794 A1 | 7/2004 | Kocher et al. |
| 2004/0136531 A1 | 7/2004 | Asano et al. |
| 2004/0151316 A1 | 8/2004 | Petrovic |
| 2004/0169581 A1 | 9/2004 | Petrovic et al. |
| 2004/0174996 A1 | 9/2004 | Tewfik et al. |
| 2004/0202324 A1 | 10/2004 | Yamaguchi et al. |
| 2004/0204943 A1 | 10/2004 | Kirovski et al. |
| 2004/0216157 A1 | 10/2004 | Shain et al. |
| 2004/0250078 A1 | 12/2004 | Stach et al. |
| 2004/0258274 A1 | 12/2004 | Brundage et al. |
| 2004/0260930 A1 | 12/2004 | Malik et al. |
| 2005/0008190 A1 | 1/2005 | Levy et al. |
| 2005/0010779 A1 | 1/2005 | Kobayashi et al. |
| 2005/0013462 A1 | 1/2005 | Rhoads |
| 2005/0025332 A1 | 2/2005 | Seroussi |
| 2005/0050332 A1 | 3/2005 | Serret-Avila et al. |
| 2005/0071283 A1 | 3/2005 | Randle et al. |
| 2005/0071669 A1 | 3/2005 | Medvinsky et al. |
| 2005/0120220 A1 | 6/2005 | Oostveen et al. |
| 2005/0144632 A1 | 6/2005 | Mears et al. |
| 2005/0154891 A1 | 7/2005 | Skipper |
| 2005/0177861 A1 | 8/2005 | Ma et al. |
| 2005/0196051 A1 | 9/2005 | Wong et al. |
| 2005/0202781 A1 | 9/2005 | Steelberg et al. |
| 2005/0242568 A1 | 11/2005 | Long et al. |
| 2005/0251683 A1 | 11/2005 | Levy et al. |
| 2005/0267928 A1 | 12/2005 | Anderson et al. |
| 2006/0005029 A1 | 1/2006 | Petrovic et al. |
| 2006/0056653 A1 | 3/2006 | Kunisa |
| 2006/0062426 A1 | 3/2006 | Levy et al. |
| 2006/0075424 A1 | 4/2006 | Talstra et al. |
| 2006/0104477 A1 | 5/2006 | Isogai et al. |
| 2006/0190403 A1 | 8/2006 | Lin et al. |
| 2006/0227968 A1 | 10/2006 | Chen et al. |
| 2006/0239501 A1 | 10/2006 | Petrovic et al. |
| 2007/0003103 A1 | 1/2007 | Lemma et al. |
| 2007/0005500 A1 | 1/2007 | Steeves et al. |
| 2007/0033146 A1 | 2/2007 | Hollar |
| 2007/0039018 A1 | 2/2007 | Saslow et al. |
| 2007/0100483 A1 | 5/2007 | Kentish et al. |
| 2007/0110237 A1 | 5/2007 | Tehranchi et al. |
| 2007/0143617 A1 | 6/2007 | Farber et al. |
| 2007/0150418 A1 | 6/2007 | Ben-Menahem et al. |
| 2007/0168673 A1 | 7/2007 | Van Der Veen et al. |
| 2007/0177761 A1 | 8/2007 | Levy |
| 2007/0192261 A1 | 8/2007 | Kelkar et al. |
| 2007/0208711 A1 | 9/2007 | Rhoads et al. |
| 2007/0214049 A1 | 9/2007 | Postrel |
| 2007/0223708 A1 | 9/2007 | Villemoes et al. |
| 2008/0002854 A1 | 1/2008 | Tehranchi et al. |
| 2008/0016360 A1 | 1/2008 | Rodriguez et al. |
| 2008/0031463 A1 | 2/2008 | Davis |
| 2008/0209219 A1 | 8/2008 | Rhein |
| 2008/0219643 A1 | 9/2008 | Le Buhan et al. |
| 2008/0228733 A1 | 9/2008 | Davis et al. |
| 2008/0273861 A1 | 11/2008 | Yang et al. |
| 2008/0298632 A1 | 12/2008 | Reed |
| 2008/0301304 A1 | 12/2008 | Chitsaz et al. |
| 2008/0310629 A1 | 12/2008 | Van Der Veen et al. |
| 2008/0310673 A1 | 12/2008 | Petrovic et al. |
| 2008/0313741 A1 | 12/2008 | Alve et al. |
| 2009/0031134 A1 | 1/2009 | Levy |
| 2009/0033617 A1 | 2/2009 | Lindberg et al. |
| 2009/0086812 A1 | 4/2009 | Ducharme |
| 2009/0136082 A1* | 5/2009 | Zandifar et al. ............... 382/100 |
| 2009/0158318 A1 | 6/2009 | Levy |
| 2009/0172405 A1 | 7/2009 | Shiomi et al. |
| 2009/0175594 A1 | 7/2009 | Ann et al. |
| 2009/0177674 A1 | 7/2009 | Yoshida |
| 2009/0208008 A1* | 8/2009 | Lubin ........................... 380/205 |
| 2009/0262932 A1 | 10/2009 | Petrovic |
| 2009/0319639 A1 | 12/2009 | Gao et al. |
| 2009/0326961 A1 | 12/2009 | Petrovic et al. |
| 2010/0011217 A1 | 1/2010 | Tachibana et al. |
| 2010/0023489 A1 | 1/2010 | Miyata et al. |
| 2010/0034513 A1 | 2/2010 | Nakano et al. |
| 2010/0046606 A1 | 2/2010 | Celik et al. |
| 2010/0069151 A1 | 3/2010 | Suchocki |
| 2010/0111355 A1 | 5/2010 | Petrovic et al. |
| 2010/0115267 A1 | 5/2010 | Guo et al. |
| 2010/0121608 A1 | 5/2010 | Tian et al. |
| 2010/0146286 A1 | 6/2010 | Petrovic et al. |
| 2010/0159425 A1 | 6/2010 | Hamlin |
| 2010/0162352 A1 | 6/2010 | Haga et al. |
| 2010/0214307 A1 | 8/2010 | Lee et al. |
| 2010/0226525 A1 | 9/2010 | Levy et al. |
| 2010/0228632 A1 | 9/2010 | Rodriguez |
| 2010/0228857 A1 | 9/2010 | Petrovic et al. |
| 2010/0287579 A1 | 11/2010 | Petrovic et al. |
| 2010/0287609 A1 | 11/2010 | Gonzalez et al. |
| 2010/0332723 A1 | 12/2010 | Lin et al. |
| 2011/0016172 A1 | 1/2011 | Shah |
| 2011/0068898 A1 | 3/2011 | Petrovic et al. |
| 2011/0091066 A1 | 4/2011 | Alattar |
| 2011/0103444 A1 | 5/2011 | Baum et al. |
| 2011/0123063 A1 | 5/2011 | Delp et al. |
| 2011/0173210 A1 | 7/2011 | Ahn et al. |
| 2011/0194727 A1* | 8/2011 | Guo et al. ..................... 382/100 |
| 2011/0202687 A1 | 8/2011 | Glitsch et al. |
| 2011/0202844 A1 | 8/2011 | Davidson et al. |
| 2011/0209191 A1 | 8/2011 | Shah |
| 2011/0214044 A1 | 9/2011 | Davis et al. |
| 2011/0214143 A1 | 9/2011 | Rits et al. |
| 2011/0219229 A1 | 9/2011 | Cholas et al. |
| 2011/0225427 A1 | 9/2011 | Wood et al. |
| 2011/0235908 A1 | 9/2011 | Ke et al. |

(56) References Cited

U.S. PATENT DOCUMENTS

| | | |
|---|---|---|
| 2011/0255690 A1 | 10/2011 | Kocher et al. |
| 2011/0261667 A1 | 10/2011 | Ren et al. |
| 2011/0286625 A1 | 11/2011 | Petrovic et al. |
| 2011/0293090 A1 | 12/2011 | Ayaki et al. |
| 2011/0311056 A1 | 12/2011 | Winograd |
| 2011/0320627 A1 | 12/2011 | Landow et al. |
| 2012/0017091 A1 | 1/2012 | Petrovic et al. |
| 2012/0023595 A1 | 1/2012 | Speare et al. |
| 2012/0026393 A1 | 2/2012 | Petrovic et al. |
| 2012/0072729 A1 | 3/2012 | Winograd et al. |
| 2012/0072730 A1 | 3/2012 | Winograd et al. |
| 2012/0072731 A1 | 3/2012 | Winograd et al. |
| 2012/0084870 A1 | 4/2012 | Petrovic |
| 2012/0102304 A1 | 4/2012 | Brave |
| 2012/0122429 A1 | 5/2012 | Wood et al. |
| 2012/0129547 A1 | 5/2012 | Andrews, III et al. |
| 2012/0130719 A1 | 5/2012 | Petrovic et al. |
| 2012/0203556 A1 | 8/2012 | Villette et al. |
| 2012/0203734 A1 | 8/2012 | Spivack et al. |
| 2012/0216236 A1 | 8/2012 | Robinson et al. |
| 2012/0265735 A1 | 10/2012 | McMillan et al. |
| 2012/0272012 A1 | 10/2012 | Aronovich et al. |
| 2012/0272327 A1 | 10/2012 | Shin et al. |
| 2012/0300975 A1 | 11/2012 | Chalamala et al. |
| 2012/0300977 A1 | 11/2012 | Petrovic et al. |
| 2012/0304206 A1 | 11/2012 | Roberts et al. |
| 2012/0308071 A1 | 12/2012 | Ramsdell et al. |
| 2013/0007462 A1 | 1/2013 | Petrovic et al. |
| 2013/0011006 A1 | 1/2013 | Petrovic et al. |
| 2013/0031579 A1 | 1/2013 | Klappert |
| 2013/0060837 A1 | 3/2013 | Chakraborty et al. |
| 2013/0073065 A1 | 3/2013 | Chen et al. |
| 2013/0108101 A1 | 5/2013 | Petrovic et al. |
| 2013/0114847 A1 | 5/2013 | Petrovic et al. |
| 2013/0114848 A1 | 5/2013 | Petrovic et al. |
| 2013/0117570 A1 | 5/2013 | Petrovic et al. |
| 2013/0117571 A1 | 5/2013 | Petrovic et al. |
| 2013/0129303 A1 | 5/2013 | Lee et al. |
| 2013/0132727 A1 | 5/2013 | Petrovic |
| 2013/0142382 A1 | 6/2013 | Petrovic et al. |
| 2013/0151855 A1 | 6/2013 | Petrovic et al. |
| 2013/0151856 A1 | 6/2013 | Petrovic et al. |
| 2013/0152210 A1 | 6/2013 | Petrovic et al. |
| 2013/0283402 A1 | 10/2013 | Petrovic |
| 2013/0339029 A1 | 12/2013 | Petrovic et al. |
| 2014/0029786 A1 | 1/2014 | Winograd |
| 2014/0067950 A1 | 3/2014 | Winograd |
| 2014/0071342 A1 | 3/2014 | Winograd et al. |
| 2014/0074855 A1 | 3/2014 | Zhao et al. |
| 2014/0075465 A1 | 3/2014 | Petrovic et al. |
| 2014/0075466 A1 | 3/2014 | Zhao |
| 2014/0075469 A1 | 3/2014 | Zhao |
| 2014/0229963 A1 | 8/2014 | Petrovic et al. |
| 2014/0237628 A1 | 8/2014 | Petrovic |
| 2014/0267907 A1 | 9/2014 | Downes et al. |
| 2014/0270337 A1 | 9/2014 | Zhao et al. |
| 2014/0270338 A1 | 9/2014 | Zhao et al. |
| 2014/0279296 A1 | 9/2014 | Petrovic et al. |
| 2014/0279549 A1 | 9/2014 | Petrovic et al. |
| 2014/0325550 A1 | 10/2014 | Winograd et al. |
| 2014/0325673 A1 | 10/2014 | Petrovic |
| 2014/0355817 A1 | 12/2014 | Wong et al. |
| 2014/0376723 A1 | 12/2014 | Petrovic |
| 2015/0016228 A1 | 1/2015 | Petrovic et al. |
| 2015/0016663 A1 | 1/2015 | Tehranchi et al. |
| 2015/0030200 A1 | 1/2015 | Petrovic et al. |
| 2015/0036873 A1 | 2/2015 | Petrovic et al. |
| 2015/0121534 A1 | 4/2015 | Zhao et al. |

FOREIGN PATENT DOCUMENTS

| | | |
|---|---|---|
| CN | 1556987 | 12/2004 |
| CN | 101001354 | 7/2007 |
| EP | 282734 | 9/1988 |
| EP | 372601 | 6/1990 |
| EP | 581317 | 2/1994 |
| EP | 1137250 | 9/2001 |
| EP | 2166725 | 3/2010 |
| EP | 2306725 | 4/2011 |
| EP | 2605485 | 6/2013 |
| EP | 2653964 | 10/2013 |
| EP | 2782337 | 9/2014 |
| GB | 2260246 | 4/1993 |
| GB | 2292506 | 2/1996 |
| GB | 2358313 | 7/2001 |
| GB | 2363027 | 12/2001 |
| JP | 10-150548 | 6/1998 |
| JP | 11-086435 | 3/1999 |
| JP | 11-284516 | 10/1999 |
| JP | 11-346302 | 12/1999 |
| JP | 2000-069273 | 3/2000 |
| JP | 2000083159 | 3/2000 |
| JP | 2000-174628 | 6/2000 |
| JP | 2000163870 | 6/2000 |
| JP | 2000219681 | 8/2000 |
| JP | 2001022366 | 1/2001 |
| JP | 2001-119555 | 4/2001 |
| JP | 2001175270 | 6/2001 |
| JP | 2001-188549 | 7/2001 |
| JP | 2001-216763 | 8/2001 |
| JP | 2001-218006 | 8/2001 |
| JP | 2001245132 | 9/2001 |
| JP | 2001257865 | 9/2001 |
| JP | 2001-312570 | 11/2001 |
| JP | 2001-527660 | 12/2001 |
| JP | 2001339700 | 12/2001 |
| JP | 2002-010057 | 1/2002 |
| JP | 2002-024095 | 1/2002 |
| JP | 2002-027223 | 1/2002 |
| JP | 2002-091465 | 3/2002 |
| JP | 2002091712 | 3/2002 |
| JP | 2002100116 | 4/2002 |
| JP | 2002125205 | 4/2002 |
| JP | 2002135557 | 5/2002 |
| JP | 2002-165191 | 6/2002 |
| JP | 2002176614 | 6/2002 |
| JP | 2002-519916 | 7/2002 |
| JP | 2002-232693 | 8/2002 |
| JP | 2002232412 | 8/2002 |
| JP | 2002319924 | 10/2002 |
| JP | 2002354232 | 12/2002 |
| JP | 2003-008873 | 1/2003 |
| JP | 2003-039770 | 2/2003 |
| JP | 2003-091927 | 3/2003 |
| JP | 2003134461 | 5/2003 |
| JP | 2003-230095 | 8/2003 |
| JP | 2003-244419 | 8/2003 |
| JP | 2003-283802 | 10/2003 |
| JP | 2003316556 | 11/2003 |
| JP | 2003348324 | 12/2003 |
| JP | 2004-023786 | 1/2004 |
| JP | 2004070606 | 3/2004 |
| JP | 2004-163855 | 6/2004 |
| JP | 2004163855 | 6/2004 |
| JP | 2004173237 | 6/2004 |
| JP | 2004-193843 | 7/2004 |
| JP | 2004193843 | 7/2004 |
| JP | 2004194233 | 7/2004 |
| JP | 2004-328747 | 11/2004 |
| JP | 2004328747 | 11/2004 |
| JP | 2005051733 | 2/2005 |
| JP | 2005-094107 | 4/2005 |
| JP | 2005094107 | 4/2005 |
| JP | 2005525600 | 8/2005 |
| JP | 20080539669 | 11/2008 |
| JP | 20100272920 | 12/2010 |
| JP | 5283732 | 7/2013 |
| KR | 1020080087047 | 9/2008 |
| KR | 20100009384 | 1/2010 |
| KR | 1020110007789 | 1/2011 |
| KR | 1020120045131 | 5/2012 |
| KR | 1020120128149 | 11/2012 |
| WO | 94-10771 | 5/1994 |

(56) References Cited

FOREIGN PATENT DOCUMENTS

| | | |
|---|---|---|
| WO | 95-14289 | 5/1995 |
| WO | 97-09797 | 3/1997 |
| WO | 97-33391 | 9/1997 |
| WO | 98-53565 | 11/1998 |
| WO | 99-03340 | 1/1999 |
| WO | 99-39344 | 5/1999 |
| WO | 99-45706 | 10/1999 |
| WO | 99-62022 | 12/1999 |
| WO | 00-00969 | 1/2000 |
| WO | 00-13136 | 3/2000 |
| WO | 00-56059 | 9/2000 |
| WO | 01-54035 | 7/2001 |
| WO | 0150665 | 7/2001 |
| WO | 01-55889 | 8/2001 |
| WO | 0197128 | 12/2001 |
| WO | 200213138 | 2/2002 |
| WO | 0219589 | 3/2002 |
| WO | 0223883 | 3/2002 |
| WO | 0249363 | 6/2002 |
| WO | 0295727 | 11/2002 |
| WO | 2003052598 | 6/2003 |
| WO | 2003102947 | 12/2003 |
| WO | 2005017827 | 2/2005 |
| WO | 2005-027501 | 3/2005 |
| WO | 2005038778 | 4/2005 |
| WO | 2006051043 | 5/2006 |
| WO | 2006116394 | 11/2006 |
| WO | 2009031082 | 3/2009 |
| WO | 2010073236 | 7/2010 |
| WO | 2010135687 | 11/2010 |
| WO | 2011116309 | 9/2011 |
| WO | 2013067439 | 5/2013 |
| WO | 2013090462 | 6/2013 |
| WO | 2013090466 | 6/2013 |
| WO | 2013090467 | 6/2013 |
| WO | 2013163921 | 11/2013 |
| WO | 2014144101 | 9/2014 |
| WO | 2014153199 | 9/2014 |
| WO | 2014160324 | 10/2014 |
| WO | 2015013419 | 1/2015 |

OTHER PUBLICATIONS

Office Action dated Oct. 30, 2014 for Korean Patent Application No. 10-2013-7009718 (8 pages).
Office Action dated Mar. 30, 2015 for Korean Patent Application No. 10-2014-7015220 (19 pages).
Office Action dated Feb. 3, 2015 for Chinese Patent Application No. 201180051678.7 (27 pages).
Park, J.H., et al., "Robust and fragile watermarking techniques for documents using bidirectional diagonal profiles," Information and Communications Security: Third International Conference, Xian, China, Nov. 2001, pp. 483-494.
Perez-Gonzalez, F., et al., "Approaching the capacity limit in image watermarking a perspective on coding techniques for data hiding applications," Signal Processing, 6(81):1215-1238 Jun. 2001.
Petitcolas, F., et al., "The blind pattern matching attack on watermark systems," IEEE Trans. Signal Processing, Apr. 2003 (4 pages).
Petitcolas, F.A.P., et al., "Attacks: on copyright marking systems," Second Workshop on Information Hiding, Lecture Notes in Computer Science, Portland, Oregon, pp. 218-238, Apr. 1998.
Philips Research Liquid Audio Fraunhofer Institute, "Digital Audio Screening Technology for Phased Rollout," Version 1.00, May 1999 (38 pages).
Pytlak, J.,"Anti-piracy coding," http://www.tele.com/pipermail/tig/2003-November/003842.html;; Nov. 2003 (2 pages).
RSA Laboratories, "Frequently asked questions about today's cryptography," Version 4.1, May 2000 (37 pages).
Schneier, B., "Applied cryptography, second edition: protocols, algorithms and source code in C," Oct. 1995 (10 pages).
Seok, J., et al., "A novel audio watermarking algorithm for copyright protection of digital audio," ETRI Journal, 24(3):181-189, Jun. 2002.
Shih, F.Y., et al., "Combinational, image watermarking in the spatial and frequency domains," Pattern Recognition, 36:696-975, May 2002.
Solanki, K., et al., "Robust image-adaptive data hiding: modeling, source coding and channel coding", 41st Allerton Conference on Communications, Control and Computing, Oct. 2003 (10 pages).
Spangler, T., "Social Science," http://www.multichannel.com/content/social-science, Sep. 2011 (5 pages).
Steinebach, M., et al., "StirMark benchmark: audio; watermarking attacks," International Conference on Information Technology: Coding and Computing (ITCC 2001), Las Vegas, Nevada, Apr. 2001 (6 pages).
Tanaka, K., et al., "Secret transmission method of character data in motion picture communication," SPIE Visual Communications and Image Processing '91, 1605:646-649, 1991.
Tsai, M.J., et al., "Wavelet packet and adaptive spatial transformation of watermark for digital image authentication," IEEE Image Processing, 2000 International Conference, 1:450-453, 2000 (4 pages).
Verance Corporation, "Confirmedia," PowerPoint presentation made to National Association of Broadcasters, Apr. 24, 2001 (40 pages).
Wang, X, et al., "Robust correlation of encrypted attack traffic through stepping stones by manipulation of interpacket delays," Proceedings of the 10th ACM conference on computer communications security, Oct. 27-30, 2003, Washington D.C., USA.
Wolfgang, R., et al., "Perceptual watermarks for digital images and video," Proceedings of the IEEE, 87(7):1108-1126, Jul. 1999.
Xu, C., et al., "Applications of digital watermarking technology in audio signals," Journal of Audio Eng. Soc., 10(47):805-812, Oct. 1999.
Yeung, M. M., et al., "An invisible watermarking technique for image verification," Image Processing, International Conference Proceedings, 2:680-683, Oct. 26-29, 1997.
Zhao, J., "A WWW service to embed and prove digital copyright watermarks," Proc. European Conf. on Multimedia Applications, Services and Techniques (ECMAST'96), May 1996 (15 pages).
Zhao, J., "Applying digital watermarking techniques to online multimedia commerce," Proc. Int. Conf. on Imaging Science, Systems and Applications (CISSA'97), Jun./Jul. 1997 (7 pages).
Aris Technologies, Inc. "Audio Watermarking System to Screen Digital Audio Content for LCM Acceptance," May 1999 (17 pages).
Bangaleea, R., et al., "Performance improvement of spread spectrum spatial-domain watermarking scheme through diversity and attack characterisation," IEEE Africon, pp. 293-298, 2002.
Hartung, F., et al., "Watermarking of MPEG-2 encoded video without decoding and re-coding," Proc. SPIE Multimedia Computing and Networking 97, 3020:264-274, Feb. 1997.
Hartung, F., et al., "Watermarking of uncompressed and compressed video," Signal Processing, 3(66):283-301, May 1998.
Kalker, T., et al., "System issues in digital image and video watermarking for copy protection," Proc. IEEE Int. Conf. on Multimedia Computing and Systems, pp. 562-567, Jun. 1999.
Kirovski, D., et al., "Multimedia content screening using a dual watermarking and fingerprinting system," Proceedings of the tenth ACM international conference, pp. 372-381, 2002.
Kirovski, D., et al., "Multimedia content screening using a dual watermarking and fingerprinting system,"Multimedia '02 Proceedings of the tenth ACM international conference on Multimedia, 2002 (11 pages).
International Search Report and Written Opinion dated Aug. 25, 2014 for International Application No. PCT/US2014/029564, filed Mar. 14, 2014 (10 pages).
International Search Report and Written Opinion dated Aug. 22, 2007 for International Application No. PCT/US2006/031267, filed Aug. 9, 2006 (2 pages).
International Search Report and Written Opinion dated Aug. 25, 2013 for International Application No. PCT/US2014/026322, filed Aug. 25, 2014 (12 pages).
International Search Report and Written Opinion dated Aug. 8, 2014 for International Application No. PCT/US2014/028372, filed Mar. 14, 2014 (18 pages).
International Search Report and Written Opinion dated Feb. 14, 2002 for International Application No. PCT/US2001/026505, filed Aug. 27, 2001 (2 pages).

(56) References Cited

OTHER PUBLICATIONS

International Search Report and Written Opinion dated Feb. 28, 2013 for International Application No. PCT/US2012/066138, filed Nov. 20, 2012 (11 pages).
International Search Report and Written Opinion dated Jan. 4, 2008 for International Application No. PCT/US2006/015615, filed Apr. 25, 2006 (5 pages).
International Search Report and Written Opinion dated Mar. 14, 2013 for International Application No. PCT/US2012/069308, filed Dec. 12, 2012 (10 pages).
International Search Report and Written Opinion dated Mar. 18, 2013 for International Application No. PCT/US2012/063431, filed Nov. 2, 2012 (10 pages).
International Search Report and Written Opinion dated Mar. 25, 2013 for International Application No. PCT/US2012/069302, filed Dec. 12, 2012 (22 pages).
International Search Report and Written Opinion dated Mar. 28, 2012 for International Application No. PCT/US2011/051855, filed Sep. 15, 2011 (8 pages).
International Search Report and Written Opinion dated May 13, 2008 for International Application No. PCT/US2006/025090, filed Jun. 27, 2006 (2 pages).
International Search Report and Written Opinion dated May 19, 2004 for International Application No. PCT/US2003/031816, filed Apr. 29, 2004 (3 pages).
International Search Report and Written Opinion dated May 29, 2008 for International Application No. PCT/US2006/015410, filed Apr. 21, 2006 (6 pages).
International Search Report and Written Opinion dated Sep. 26, 2008 for International Application No. PCT/US2007/016812, filed Jul. 25, 2007 (6 pages).
International Search Report and Written Opinion dated Nov. 11, 2014 for International Application No. PCT/US2014/047840, filed Jul. 23, 2014 (15 pages).
International Search Report and Written Opinion dated Feb. 25, 2015 for International Application No. PCT/US2014/041166, filed Jun. 5, 2014 (10 pages).
Jacobsmeyer, J., et al., "Introduction to error-control coding," Pericle Communications Company, 2004 (16 pages).
Kalker, T., et al., "A security risk for publicly available watermark detectors," Proc. Benelux Info. Theory Symp., Veldhoven, The Netherlands, May 1998 (7 pages).
Kang, X., et al., "A DWT-DFT composite watermarking scheme robust to both affine transform and JPEG compression," IEEE Transactions on Circuits and Systems for Video Technology, 8(13):776-786, Aug. 2003.
Kim, T.Y., et al., "An asymmetric watermarking system with many embedding watermarks corresponding to one detection watermark," IEEE Signal Processing Letters, 3(11):375-377, Mar. 2004.
Kirovski, D., et al., "Randomizing the replacement attack," ICASSP, pp. 381-384, 2004.
Kirovski, D., et al., "Robust spread-spectrum audio watermarking," IEEE International Conference on Acoustics, Speech, and Signal Processing, 3:1345-1348, 2001.
Kirovski, D., et al., "Multimedia content; screening using a dual watermarking and fingerprinting system," Multimedia '02 Proceedings of the tenth ACM international conference on Multimedia, 2002 (11 pages).
Kocher, P., et al., "Self-Protecting Digital Content: A Technical Report from the CRI Content Security Research Initiative," Cryptography Research, Inc. (CRI), 2002-2003 (14 pages).
Kutter, M., et al., "The watermark; copy attack," Proc. of the SPIE: Security and Watermarking of Multimedia Content II, 3971:1-10, Jan. 2000.
Kuznetsov, A.V., et al., "An error correcting scheme for defective memory," IEEE Trans. Inf. Theory, 6(4):712-718, Nov. 1978 (7 pages).
Lacy, J., et al., "Intellectual property protection systems and digital watermarking," Proceedings: Information Hiding, Second International Workshop, Portland, Oregon, pp. 158-168, 1998.
Lin, E.T., et al., "Detection of image alterations using semi-fragile watermarks," Proceedings of the SPIE International Conference on Security and Watermarking of Multimedia Contents II, Jan. 2000 (12 pages).
Lin, P.L., et al., "Robust transparent image watermarking system with spatial mechanisms," The Journal of Systems and Software, 50:107-116, Feb. 2000.
Lotspeich, J., "The Advanced Access Content System's Use of Digital Watermarking," MCPS '06, Oct. 28, 2006, pp. 19-21.
Lu, C.S., et al., "Oblivious cocktail watermarking by sparse code shrinkage: A regional-and global-based scheme," IEEE Transactions on Multimedia, 4(2):209-224, Dec. 2000.
Maehara, F., et al., "A proposal of multimedial home education terminal system based on flash-squeak OS," Technical report of the institute of image information and television engineers, 28(43):21-24, Jul. 2004.
Mason, A. J., et al., "User requirements for watermarking in broadcast applications," IEEE Conference Publication, International Broadcasting Convention (BC 2000), Amsterdam, Sep. 8-12, 2000 (7 pages).
Miller, M.L. et al. "Computing the probability of false watermark detection," Published in the Proceedings of the Workshop on Information Hiding, Dresden, Germany, Sep. 29-Oct. 1, 1999.
Miller, M.L. et al. "Informed embedding: exploiting image and detector information during watermark insertion," IEEE Conference Publication, Image Processing, (3):1-4, Sep. 2000.
Mintzer, F., et al., "If one watermark is good, are more better?," Acoustics, Speech, and Signal Processing, ICASSP, 4:2067-2069, Mar. 1999.
Mobasseri, B.G., et al. "Content authentication and tamper detection in digital video," Image Processing Proceedings, International Conference, 1:458-461, 2000.
Moulin, P., et al., "Detection-theoretic analysis of desynchronization attacks in watermarking, " Technical Report MSR-TR-2002-24, Microsoft Corporation, Mar. 2002.
Muranoi, R., et al., "Video retrieval method using shotID for copyright protection systems," Proc. SPIE Multimedia Storage and Archiving Systems III, 3527:245-252, Nov. 1998.
Nikolaidis, N., et al., "Watermark detection: benchmarking perspectives," 2002 IEEE Conference on Multimedia and Expo, 2002 (4 pages).
Office Action dated Dec. 29, 2014 for Chinese Patent Application No. 201180051690.8 (14 pages).
Office Action dated Jan. 20, 2014 for Japanese Patent Application No. 2013-036990 (6 pages).
Office Action dated Jul. 21, 2011 for Japanese Patent Application No. 2008-508985 (6 pages).
Office Action dated Mar. 16, 2012 for Japanese Patent Application No. 2008-508985 (8 pages).
Office Action dated Mar. 18, 2011 for European Patent Application No. 03774648.4 (6 pages).
Office Action dated May 1, 2013 for Japanese Patent Application No. 2011-114667 (6 pages).
Office Action dated May 8, 2012 for Japanese Patent Application No. 2009-522802 (4 pages).
Office Action dated Nov. 26, 2012 for Japanese Patent Application No. 2011-114667 (8 pages).
"Advanced Access Content System (AACS), Pre-recorded Video Book," Revision 0.951, Sep. 2009 (86 pages).
"Civolution's 2nd screen synchronisation solution wins CSI product of the year 2011 award at IBC," IBC Press Release, Hall 2—Stand C30, Sep. 2011 (2 pages).
"Content Protection—Self Protecting Digital Content," http://www.cryptography.com/technology/spdc/index.html, May 2010 (1 page).
"Microsoft response to CfP for technology solutions to screen digital audio content for LCM acceptance," Microsoft Corporation, May 23, 1999 (9 pages).
"Red Bee and Civolution develop companion app for FX UK," http://www.digitaltveurope.net/19981/red-bee-and-civolution-develop-companion-app-for-fx-uk, Jan. 2012 (2 pages).
"Task AC122-copy protection for distribution services," Http://acad.bg/WISE/english/rd/partners/acts/areal/ac122-t.html, Jul. 1, 1997 (2 pages).

(56) References Cited

OTHER PUBLICATIONS

Adelsbach, A., et al., "Proving Ownership of Digital Content," Proc. 3rd Int. Workshop on Information Hiding, 1768:117-133, Sep. 1999.
Aggarwal, A., et al., "Multi-Layer Grid Embeddings," Foundations of Computer Science, 26th Annual Symposium on Foundations of Computer Science, 85:186-196, Oct. 1985.
Barreto, P.S.L.M., et al. "Toward Secure Public-Key Blockwise Fragile Authentication Watermarking," IEEE Proceedings Vision, Image, and Signal Processing, 149(2):57-62, Apr. 2002.
Baudy, S., et al., "Estimation of geometric distortions in digital watermarking," IEEE International Conference on Watermarking, (2):885-888, Sep. 2002.
Boney, L., et al., "Digital Watermarks for Audio Signals," Dept. of Electrical Engineering, Univ. of Minnesota, Mar. 1996 (4 pages).
Cappellini, V., et al. "Robust Frame-based Watermarking for Digital Video," Proceedings of the 12th International Workshop on Database and Expert Systems Applications, Sep. 2001 (5 pages).
Caronni, G., "Assuring Ownership Rights for Digital; Images," Proceedings of reliable IT systems VIS 95, Vieweg Publishing Company, Germany, 1995 (10 pages).
Chen, B et al., "Quantization index modulation: a class of provably good methods for digital watermarking and information embedding," IEEE Transactions on Information Theory, 47(4):1423-1443, May 2001.
Chou, J., et al., "A Robust Blind Watermarking Scheme based on Distributed Source Coding Principles," Multimedia! 2000 Proceedings of the eighth ACM international conference on multimedia, Los Angeles, California, 2000 (8 pages).
Chou, J., et al., "A Robust Optimization Solution to the Data Hiding Problem using Distributed Source Coding Principles," Pro. SPIE, 3971, San Jose, California, Jan. 2000 (10 pages).
Cinea, Inc., "Forensic watermarking deterring video piracy," 2004, (9 pages). [http://www.cinea.com/whitepapers/forensic_watermarking.pdf];.
Costa, M., "Writing on Dirty Paper," IEEE Trans. on Info. Theory, 29(3):439-441, May 1983.
Cox, I. J., et al., "Some general methods for tampering with watermarks," IEEE Journal on Selected Areas in Communications, 16(4): 587-593, May 1998.
Coxford, A., et al., "Advanced Mathematics: A Preparation for Calculus, Second Edition," Harcourt Brace Jovanovish, Inc., 1978 (14 pages).
Das, et al., "Distributed Priority Queues on Hybercube Architectures," IEEE, 1996, pp. 620-627.
Davidson, M.F., "Music File Filter," Sony Music, New York, May 23, 1999 (2 pages).
Digimarc Corporation, "Digimarc Watermarking Guide," 1999 (22 pages).
Dittmann, J., "Combining digital watermarks and collusion secure fingerprints for customer copy monitoring," Proc. IEEE Seminar on Secure Images and Image Authentication, Apr. 2000 (6 pages).
Dittmann, J., et al., "Combining digital watermarks and collusion secure fingerprints for digital images," Proc. SPIE 3657:171-182, Jan. 1999 (12 pages).
Epp, L.W., et al., "Generalized scattering matrices for unit cell characterization of grid amplifiers and device de-embedding," IEEE, 2:1288-1291, Jun. 1995.
European Search Report dated Apr. 12, 2012 for European Patent Application No. 07836262.1 filed Jul. 25, 2007 (12 pages).
European Search Report dated Jul. 3, 2012 for European Patent Application No. 12150742.0, filed Oct. 7, 2003 (5 pages).
European Search Report dated Nov. 10, 2010 for European Patent Application No. 03774648.4, filed Oct. 7, 2003 (5 pages).
European Search Report dated Nov. 8, 2012 for European Patent Application No. 06785709.4, filed Jun. 27, 2006 (5 pages).
European Search Report dated Oct. 24, 2012 for European Patent Application No. 06758537.2, filed Apr. 21, 2006 (6 pages).
European Search Report dated Oct. 31, 2012 for European Patent Application No. 06758577.8, filed Apr. 25, 2006 (6 pages).
European Search Report dated Oct. 14, 2014 for European Patent Application No. 14173053.1, filed Oct. 7, 2003 (5 pages).
European Search Report dated Apr. 15, 2015 for European Patent Application No. 12846172.0, filed Nov. 2, 2012 (8 pages).
Furon, T., et al., "An asymmetric watermarking; method," IEEE Trans. Signal Processing, 4(51):981-995, Apr. 2003.
Guth, H.J. et al., "Error-and collusion-secure fingerprinting for digital data," Proc. 3rd Int. Workshop on Information Hiding, LNCS 1768:134-145, Sep./Oct. 1999.
Hartung, F., et al., "Digital watermarking of MPEG-2 coded video in the bitstream domain," Proc. IEEE Int. Conf. on Acoustics, Speech and Signal Processing, 4:2621-2624, Apr. 1997.
Heegard, C., et al., "On the capacity of computer memory with defects," IEEE Trans. Info. Theory, 5(IT-29):731-739, Sep. 1983.
International Search Report and Written Opinion dated May 28, 2015 for International Application No. PCT/US2015/020282, filed Mar. 12, 2015 (7 pages).
International Search Report and Written Opinion dated May 1, 2015 for International Application No. PCT/US2014/052973, filed Aug. 27, 2014 (16 pages).
International Search Report and Written Opinion dated Sep. 12, 2014 for International Application No. PCT/US2014/035474, filed Apr. 25, 2014 (17 pages).
International Search Report and Written Opinion dated Sep. 15, 2014 for International Application No. PCT/US2014/035539, filed Apr. 25, 2014 (16 pages).
International Search Report and Written Opinion dated Apr. 24, 2012 for International Application No. PCT/US2011/051857, filed Sep. 15, 2011 (9 pages).
International Search Report and Written Opinion dated Apr. 8, 2013 for International Application No. PCT/US2012/069306, filed Dec. 12, 2012 (12 pages).
International Search Report and Written Opinion dated Aug. 14, 1998 for International Application No. PCT/US1998/009587, filed May 12, 1998 (3 pages).

\* cited by examiner

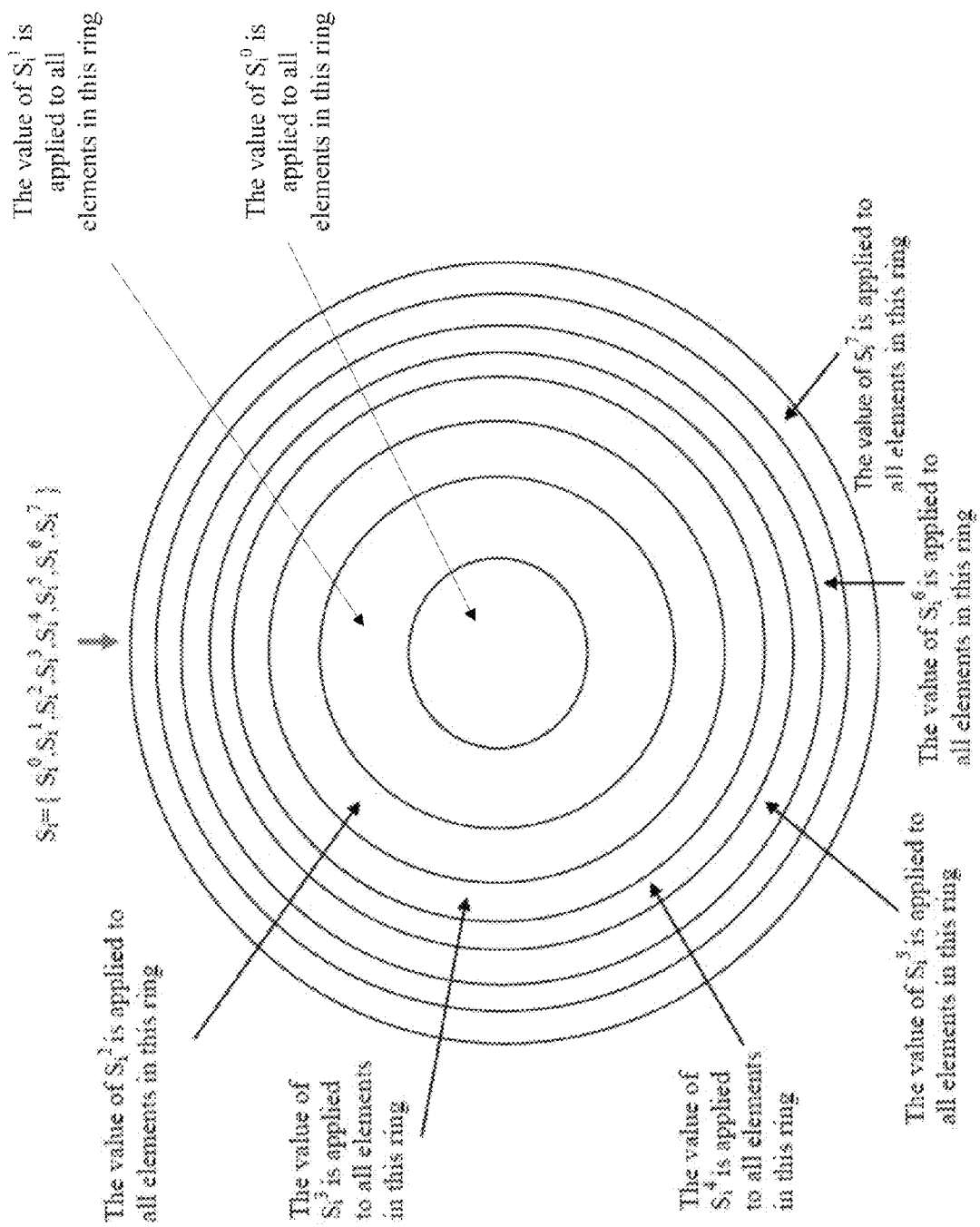

TRANSACTIONAL VIDEO MARKING SYSTEM

CROSS REFERENCE TO RELATED APPLICATIONS

This patent application claims the benefit of U.S. Provisional Patent Application No. 61/785,149, filed Mar. 14, 2013. The entire content of the before-mentioned provisional patent application is incorporated by reference as part of the disclosure of this application.

FIELD OF INVENTION

The disclosed embodiments relate to methods, devices, systems and computer program products that enable insertion of transactional (or forensic) watermarks in a video content in an efficient and flexible manner.

BACKGROUND

Transactional video marking system is a forensic video watermarking system that can be used for applications such as high-value content distribution, including, but not limited to, distribution of pre-release content (e.g., early release of a movie before nationwide theatre distribution, early release for reviewer viewing, etc.), digital cinema, and video-on-demand applications. In such applications, a unique identifier is inserted into each individual video stream in the form of digital watermarks to identify, for example, the content distributor and the transaction (e.g., the provision of the content to a particular user or entity). The embedded watermarks after release of the movie, and potential piracy of the content, can be used to trace back the source of content piracy by identifying the particular user, entity or distribution channel(s) involved in dissemination of the content.

SUMMARY

The disclosed embodiments relates to methods, devices, systems and computer program products that facilitate the insertion of transactional watermarks into a video content. One aspect of the disclosed embodiments relates to a method for facilitating embedding of watermarks into a video content, comprising selecting a first number of frames from the video content, performing one or both of a temporal and a spatial psychovisual analysis on the first number of frames, identifying at least one area within the first number of frames for insertion of watermarks, embedding a first watermark symbol in the identified area(s) of the first number of frames, re-encoding the first number of frames subsequent to embedding with the first watermark symbol to obtain a first alternative data, embedding a second watermark symbol in the identified area(s) of the first number of frames, re-encoding to the first number of frames subsequent to embedding with the second watermark symbol to obtain a second alternative data; and forming an inserter manifest comprising the first and the second alternative data to enable insertion of a watermark into the video content by selecting one or the other of the first and second alternative data for insertion into the video content.

In one exemplary embodiment, the first number of frames are selected to minimize a number of frames that must be re-encoded. In another exemplary embodiment, the first number of frames consist of only frames that are not referred to by other frames in the video content. In another exemplary embodiment, the video content is a compressed video content. In yet another exemplary embodiment, the first number of frames are selected to include image areas that remain substantially similar in consecutive frames. In another exemplary embodiment, identifying the at least one area for insertion of watermarks comprises performing a watermark extraction simulation operation to assess a robustness measure of one or more areas of the first number of frames, and selecting an area within each of the first number of frames that produces highest robustness measure.

According to another exemplary embodiment, performing the watermark extraction simulation operation comprises, for each of the first number of frames: (a) selecting a candidate area of a selected frame for insertion of watermarks; (b) inserting the first watermark symbol into the selected candidate area; (c) impairing the selected candidate area subsequent to embedding with the first watermark symbol; (d) determining a correlation value associated with extraction of the first watermark value from the impaired area; (e) selecting another area of the selected frame that is shifted with respect to the previously selected candidate area; (f) repeating steps (b) through (e) for a plurality of additional shifted areas within the selected frame to obtain a plurality of correlation values; (g) performing steps (a) through (f) but instead of inserting the first watermark value, inserting the second watermark value; and (h) identifying an area with highest correlation value.

In one exemplary embodiment, the method further includes customizing the inserter manifest in accordance with a profile. In another exemplary embodiment, the method further includes receiving a pre-marking message to be inserted as a watermark into the video content for generation of a pre-marked video stream. In yet another exemplary embodiment, the method further includes receiving a built-in message, the built-in message identifying at least a portion of the first or the second alternative data to be excluded from insertion into the video content and to thereby generate a customized inserter and/or extractor manifest that designates, for the excluded portion, the insertion of either the first or the second alternative data into the video content. In one exemplary embodiment, generation of the customized inserter manifest comprises removing one or more of the alternate data from the inserter manifest.

In still another exemplary embodiment, the method further includes producing an extractor manifest to facilitate extraction of watermark from contents include the first and the second alternative data, the extractor manifest including information to assist selection of specific video frames or areas within the specific video frames for watermark extraction. In another exemplary embodiment, the profile specifies at least one of: a channel design, a repeat of payload, a message size, a payload size, or a priority. In yet another exemplary embodiment, each channel represents a different transaction watermark, the channel design is one of a sequential design or an overlapping design, the sequential channel design designates, in a particular sequential order, non-overlapping segments of the video content for insertion of watermark payloads of each channel, and the overlapping channel design designates overlapping segments of the video content for insertion of watermark payloads for two or more channels.

Another aspect of the disclosed embodiments relates to a device that includes a frame selection component coupled to a video decoder to receive a video content from the video decoder and to select a first number of frames from the video content. The device also includes an evaluation component coupled to the frame selection component to receive the first number of frames, the evaluation component including: a temporal psychovisual analysis component to conduct a temporal psychovisual analysis on the first number of frames, a spatial psychovisual analysis component to conduct a spatial psychovisual analysis on the first number of frames, and an area selection component to identify at least one area within the first number of frames for insertion of watermarks. The device further includes one or more combiners coupled to the evaluation component to embed a first watermark symbol in the identified area(s) of the first number of frames and to embed a second watermark symbol in the identified area(s) of the first number of frames, and a video re-encoder coupled to the one or more combiners to re-encode to the first number of frames subsequent to embedding with the first watermark symbol to obtain a first alternative data, to re-encode the first number of frames subsequent to embedding with the second watermark symbol to obtain a second alternative data, and to form an inserter manifest comprising the first and the second alternative data.

In one exemplary embodiment, the frame selection component is configured to select the first number of frames to minimize a number of frames that must be re-encoded. In another exemplary embodiment, the frame selection component is configured to select the first number of frames that only consist of frames that are not referred to by other frames in the video content. In still another exemplary embodiment, the video decoder is coupled to a video input, and is configured to receive a compressed video content and to decompress the received compressed video content.

In another exemplary embodiment, the frame selection component is configured select the first number of frames to include image areas that remain substantially similar in consecutive frames. According to another exemplary embodiment, the area selection component includes a simulator component to perform a watermark extraction simulation operation to assess a robustness measure of one or more areas of the first number of frames, and the frame selection component is configured to select an area within each of the first number of frames that produces highest robustness measure.

In one exemplary embodiment, the simulator component of the above device is configured to perform the following operations on each the selected first number of frames: (a) select a candidate area of a selected frame for insertion of watermarks, (b) insert the first watermark symbol into the selected candidate area, (c) impair the selected candidate area subsequent to embedding with the first watermark symbol, (d) determine a correlation value associated with extraction of the first watermark value from the impaired area, (e) select another area of the selected frame that is shifted with respect to the previously selected candidate area, (f) repeat operations (b) through (e) for a plurality of additional shifted areas within the selected frame to obtain a plurality of correlation values, (g) perform operations (a) through (f) but instead of inserting the first watermark value, insert the second watermark value, and (h) identify an area with highest correlation value.

In one exemplary embodiment, the above device further includes a customizer component coupled to the re-encoder to receive the inserter manifest and to customize the inserter manifest in accordance with a profile. In another exemplary embodiment, the customizer component is configured to receive a pre-marking message to be inserted as a watermark into the video content for generation of a pre-marked video stream. In still another exemplary embodiment, the customizer component is configured to receive a built-in message, the built-in message identifying at least a portion of the first or the second alternative data to be excluded from insertion into the video content and to thereby generate a customized inserter and/or extractor manifest that designates, for the excluded portion, the insertion of either the first or the second alternative data into the video content.

According to another exemplary embodiment, the customizer component generates the customized inserter manifest by removing one or more of the alternate data from the inserter manifest. In another exemplary embodiment, the customizer component is configured to generate an extractor manifest to facilitate extraction of watermark from contents that include the first and the second alternative data, the extractor manifest including information to assist selection of specific video frames or areas within the specific video frames for watermark extraction.

Another aspect of the disclosed embodiments relates to a computer program product stored on a one or more non-transitory computer readable media, that includes program code for selecting a first number of frames from the video content, program code for performing one or both of a temporal and a spatial psychovisual analysis on the selected frames, program code for identifying at least one area within the first number of frames for insertion of watermarks, program code for embedding a first watermark symbol in the identified area(s) of the first number of frames, program code for re-encoding the first number of frames subsequent to embedding with the first watermark symbol to obtain a first alternative data, program code for embedding a second watermark symbol in the identified area(s) of the first number of frames, program code for re-encoding to the first number of frames subsequent to embedding with the second watermark symbol to obtain a second alternative data, and program code for forming an inserter manifest comprising the first and the second alternative data to enable insertion of a watermark into the video content by selecting one or the other of the first and second alternative data for insertion into the video content.

Another aspect of the disclosed embodiments relates to a device that includes a processor and a memory comprising processor executable code. The processor executable code when executed by the processor configures the device to select a first number of frames from the video content, to perform one or both of a temporal and a spatial psychovisual analysis on the selected frames, to identify at least one area within the first number of frames for insertion of watermarks, to embed a first watermark symbol in the identified area(s) of the first number of frames, to re-encode the first number of frames subsequent to embedding with the first watermark symbol to obtain a first alternative data, to embed a second watermark symbol in the identified area(s) of the first number of frames, to re-encode to the first number of frames subsequent to embedding with the second watermark symbol to obtain a second alternative data, and to form an inserter manifest comprising the first and the second alternative data to enable insertion of a watermark into the video content by selecting one or the other of the first and second alternative data for insertion into the video content.

Another aspect of the disclosed embodiments relates to a method that includes using a first inserter manifest associated with a first video stream to facilitate insertion of watermarks into a second video stream. The first inserter manifest comprises at least a first and a second alternative data, and the first and the second video stream include similar image content. In such a method one or both of the following takes place: (a) a frame in the second video stream is identified for embedding of watermark symbols based on a corresponding frame in the first video stream, or (b) an area within a frame in the second video stream is identified for embedding of watermark symbols based on a corresponding area in a corresponding frame in the first video stream.

Another aspect of the disclosed embodiments relates to a computer program product stored on a one or more non-transitory computer readable media, that includes computer code for using a first inserter manifest associated with a first video stream to facilitate insertion of watermarks into a second video stream, where the first inserter manifest comprises at least a first and a second alternative data, and the first and the second video stream include similar image content. Further, one or both of the following is carried out: (a) a frame in the second video stream is identified for embedding of watermark symbols based on a corresponding frame in the first video stream, or (b) an area within a frame in the second video stream is identified for embedding of watermark symbols based on a corresponding area in a corresponding frame in the first video stream.

Another aspect of the disclosed embodiments relates to a device that includes a processor and a memory comprising processor executable code. The processor executable code when executed by the processor configures the device to: use a first inserter manifest associated with a first video stream to facilitate insertion of watermarks into a second video stream, wherein the first inserter manifest comprises at least a first and a second alternative data, the first and the second video stream include similar image content, and one or both of the following: (a) a frame in the second video stream is identified for embedding of watermark symbols based on a corresponding frame in the first video stream, or (b) an area within a frame in the second video stream is identified for embedding of watermark symbols based on a corresponding area in a corresponding frame in the first video stream.

Another aspect of the disclosed embodiments relates to a method for inserting a watermark into a video content that includes receiving the video content, obtaining an inserter manifest comprising at least a first and a second alternative data, where the at least the first and the second alternative data having been generated by preprocessing the video content prior to the receiving, each of the at least the first and the second alternative data, when replacing a particular segment of the video content, producing video segments that are perceptually similar to the particular segment. The method also includes selecting the first alternative data in accordance with a transactional watermark payload and replacing a first segment of the received video content with the selected first alternative data, selecting the second alternative data in accordance with the transactional watermark payload and replacing a second segment of the received video with the selected second alternative data.

Another aspect of the disclosed embodiments relates to a computer program product stored on a one or more non-transitory computer readable media, that includes computer code for receiving the video content, computer code for obtaining an inserter manifest comprising at least a first and a second alternative data, the at least the first and the second alternative data having been generated by preprocessing the video content prior to the receiving, each of the at least the first and the second alternative data, when replacing a particular segment of the video content, producing video segments that are perceptually similar to the particular segment. The computer program product also includes computer code for selecting the first alternative data in accordance with a transactional watermark payload and replacing a first segment of the received video content with the selected first alternative data, and computer code for selecting the second alternative data in accordance with the transactional watermark payload and replacing a second segment of the received video with the selected second alternative data.

Another aspect of the disclosed embodiments relates to a device that includes a processor, and a memory comprising processor executable code. The processor executable code when executed by the processor configures the device to receive a video content, obtain an inserter manifest comprising at least a first and a second alternative data, the at least the first and the second alternative data having been generated by preprocessing the video content, each of the at least the first and the second alternative data, when replacing a particular segment of the video content, producing video segments that are perceptually similar to the particular segment. The processor executable code when executed by the processor also configures the device to select the first alternative data in accordance with a transactional watermark payload and replace a first segment of the received video content with the selected first alternative data, and select the second alternative data in accordance with the transactional watermark payload and replace a second segment of the received video with the selected second alternative data.

Another aspect of the disclosed embodiments relates to a method for over-watermarking a segment of a video content that has an existing watermark embedded therein. The method includes detecting a value of the existing watermark in the segment, determining whether a new value that is designated for embedding is identical to the value of the existing watermark, upon a determination that the new value that is designated for embedding is not identical to the value of the existing watermark, using an inserter manifest to obtain an alternate data corresponding to the new value. The inserter manifest can include at least a first and a second alternative data, the at least the first and the second alternative data having been generated by preprocessing the video content prior to the detecting, each of the at least the first and the second alternative data, when replacing a particular segment of the video content, producing video segments that are perceptually similar to the particular segment. The method also includes inserting the new value into the segment.

In one exemplary embodiment, the over-watermarking is performed in an swapping mode of operation that includes updating the inserter manifest to exclude one alternative data from the inserter manifest that corresponds to each of the embedded symbols of the new value.

Another aspect of the disclosed embodiments relates to a computer program product stored on a one or more non-transitory computer readable media that includes computer code for detecting a value of the existing watermark in the segment, computer code for determining whether a new value that is designated for embedding is identical to the value of the existing watermark, computer code for, upon a determination that the new value that is designated for embedding is not identical to the value of the existing watermark, using an inserter manifest to obtain an alternate data corresponding to the new value. The inserter manifest includes at least a first and a second alternative data, the at least the first and the second alternative data having been generated by preprocessing the video content prior to the detecting, each of the at least the first and the second alternative data, when replacing a particular segment of the video content, producing video segments that are perceptually similar to the particular segment. The computer program product further includes computer code for inserting the new value into the segment.

Another aspect of the disclosed embodiments relates to a device that includes a processor and a memory comprising processor executable code. The processor executable code when executed by the processor configures the device to detect a value of the existing watermark in the segment, determine whether a new value that is designated for embedding is identical to the value of the existing watermark. The processor executable code when executed by the processor also configures the device to, upon a determination that the new value that is designated for embedding is not identical to the value of the existing watermark, use an inserter manifest to obtain an alternate data corresponding to the new value. The inserter manifest comprising at least a first and a second alternative data, the at least the first and the second alternative data having been generated by preprocessing the video content, each of the at least the first and the second alternative data, when replacing a particular segment of the video content, producing video segments that are perceptually similar to the particular segment. The processor executable code when executed by the processor further configures the device to insert the new value into the segment.

Another aspect of the disclosed embodiments relates to a method for facilitating insertion of a watermark into an encrypted video. The method includes decrypting a portion of the encrypted video, using a preprocessor for processing the decrypted portion to generate an inserter manifest comprising at least a first and a second alternative data. Each of the at least the first and the second alternative data, when replacing a particular segment of the video content in non-encrypted format, produce video segments that are perceptually similar to the particular segment. The method also includes, upon a determination that a size of the first or the second alternate data is not a multiple of encryption block size, increasing the size of the first or the second alternate data to become a multiple of the encryption block size, encrypting the first and the second alternate data using an encryption key used for encrypting the video, and generating an inserter manifest that includes the encrypted first and second alternative data.

Another aspect of the disclosed embodiments relates to a computer program product stored on a one or more non-transitory computer readable media that includes computer code for decrypting a portion of the encrypted video, computer code for using a preprocessor for processing the decrypted portion to generate an inserter manifest comprising at least a first and a second alternative data. Each of the at least the first and the second alternative data, when replacing a particular segment of the video content in non-encrypted format, produce video segments that are perceptually similar to the particular segment. The computer program product also includes computer code for, upon a determination that a size of the first or the second alternate data is not a multiple of encryption block size, increasing the size of the first or the second alternate data to become a multiple of the encryption block size, computer code for encrypting the first and the second alternate data using an encryption key used for encrypting the video, and computer code for generating an inserter manifest that includes the encrypted first and second alternative data.

Another aspect of the disclosed embodiments relates to a device that includes a processor and a memory comprising processor executable code. The processor executable code when executed by the processor configures the device to decrypt a portion of the encrypted video, process the decrypted portion to generate an inserter manifest comprising at least a first and a second alternative data. Each of the at least the first and the second alternative data, when replacing a particular segment of the video content in non-encrypted format, produce video segments that are perceptually similar to the particular segment. The processor executable code when executed by the processor also configures the device to, upon a determination that a size of the first or the second alternate data is not a multiple of encryption block size, increase the size of the first or the second alternate data to become a multiple of the encryption block size, encrypt the first and the second alternate data using an encryption key used for encrypting the video, and generate an inserter manifest that includes the encrypted first and second alternative data.

Another aspect of the disclosed embodiments relates to a device that includes a decryptor coupled to a video input to receive an encrypted video content and to decrypt at least a portion of the received encrypted content using an encryption key and a pre-processor component coupled to the decryptor to receive the decrypted portions of the video content and to generate an inserter manifest comprising at least a first and a second alternative data. Each of the at least the first and the second alternative data, when replacing a particular segment of the video content in non-encrypted format, producing video segments that are perceptually similar to the particular segment. The device further includes a customizer coupled to the pre-processor component to generate an inserter manifest that includes encrypted first and second alternative data. The customizer includes an encryption block alignment component, where the encryption block alignment component to increase a size of the first or the second alternate data to become a multiple of encryption block size when the size of the first or the second alternate data is not a multiple of the encryption block size. The customizer also includes an alternate data encryptor component to encrypt the first and the second alternate data using the encryption key.

Another aspect of the disclosed embodiments relates to a method for identification of a watermark within an embedded content. The method includes obtaining the embedded content, searching a database of extraction manifests to obtain one or more extraction manifests that potentially match the embedded content, iteratively using each of the obtained one or more extraction manifests to perform a watermark extraction process, and, upon a successful extraction of a watermark message, providing an indication that the embedded content has been identified.

In one exemplary embodiment, obtaining one or more extraction manifests that potentially match the embedded content is carried out using one or more of a metadata search, a fingerprint search, or a watermarking-based content identifier search.

Another aspect of the disclosed embodiments relates to a computer program product stored on a one or more non-transitory computer readable media that includes computer code for obtaining the embedded content, computer code for searching a database of extraction manifests to obtain one or more extraction manifests that potentially match the embedded content, computer code for iteratively using each of the obtained one or more extraction manifests to perform a watermark extraction process, and computer code for, upon a successful extraction of a watermark message, providing an indication that the embedded content has been identified.

Another aspect of the disclosed embodiments relates to a device that includes a processor and a memory comprising processor executable code. The processor executable code when executed by the processor configures the device to obtain the embedded content, search a database of extraction manifests to obtain one or more extraction manifests that potentially match the embedded content, iteratively use each of the obtained one or more extraction manifests to perform a watermark extraction process, and upon a successful extraction of a watermark message, provide an indication that the embedded content has been identified.

Another aspect of the disclosed embodiments relates to a system that includes a portal for receiving a content from a subscriber, and a back-end processing device coupled to the portal so as to allow the portal to transmit the received content to the back-end processing device. The back-end processing component includes a watermark extractor, an extraction coordinator, an extraction manifest search component and one or more databases with fingerprints and extraction manifests stored therein. The watermark extractor coupled to the extraction coordinator to communicated watermark extraction results to the extraction coordinator and the extraction coordinator coupled to the portal to transmit information associated with the watermark extraction results to the portal for presentation to the subscriber.

In one exemplary embodiment, the portal is configured to allow reception of extractor manifests from the back-end device. In another exemplary embodiment, the portal is configured to allow reception of metadata from the subscriber in conjunction with the received content.

Another aspect of the disclosed embodiments relates to a method for selecting an area within a video content for insertion of watermarks. The method includes (a) selecting a candidate area within a frame of the video content that is smaller in size that the frame itself; (b) adding a first watermark value to the selected candidate area to obtain a first version of the area; (c) adding one or more noise components to the first version of the area to obtain a noisy first version of the area; (d) conducting a watermark extraction operation on the noisy first version of the area to obtain a first correlation value; (e) adding a second watermark signal to the selected candidate area to obtain a second version of the area; (f) adding one or more noise components to the second version of the area to obtain a noisy second version of the area; (g) conducting a watermark extraction operation on the noisy second version of the area to obtain a second correlation value; (h) selecting one or more pseudo-random offset values to select a different candidate area within the frame for adding the first watermark value or for adding the second watermark value; (i) repeating operations (a) through (g) until all pixels of the frame have been selected as part of one or more of the selected candidate areas, wherein in each iteration of operations (a) through (g) the values obtained for the first correlation value and the second correlated value are stored; and (j) designating one or more of the selected areas that produced the largest first correlation value or the largest second correlation value for the insertion of watermarks.

In one exemplary embodiment, the method also includes conducting a spatial psychovisual analysis on one or more frame frames that include the designated selected area(s). The spatial psychovisual analysis includes applying a non-linear inverse gamma curve to luminance components of the one or more video frames corresponding to the human visual system response in dark areas; performing a Laplacian or a Gaussian pyramid operation multiple times at multiple resolutions on the one or more video frames subsequent to the applying of the non-linear inverse gamma curve to detect highly textured areas; and performing an edge detection operation to detect edge features within the one or more frames.

In another exemplary embodiment, the above noted method further includes embedding the first watermark value in the designated area of the frame to produce a first embedded version of the frame, embedding the first watermark value in the designated area of the frame to produce a first embedded version of the frame, re-encoding the first and the second versions of the frame to obtain a first and a second encoded version of the frame, respectively, decoding the first and second versions of the encoded frames, comparing one or more measures of quality associated with the decoded first and second versions with corresponding one or more reference measures of quality, and based on the comparing, making a determination to accept or reject the frame as a frame that is suitable for watermark insertion.

BRIEF DESCRIPTION OF THE DRAWINGS

FIG. 4(b) illustrates a mapping of a PRN sequence to a circular area in accordance with an exemplary embodiment.

DETAILED DESCRIPTION OF CERTAIN EMBODIMENTS

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Figure 1:
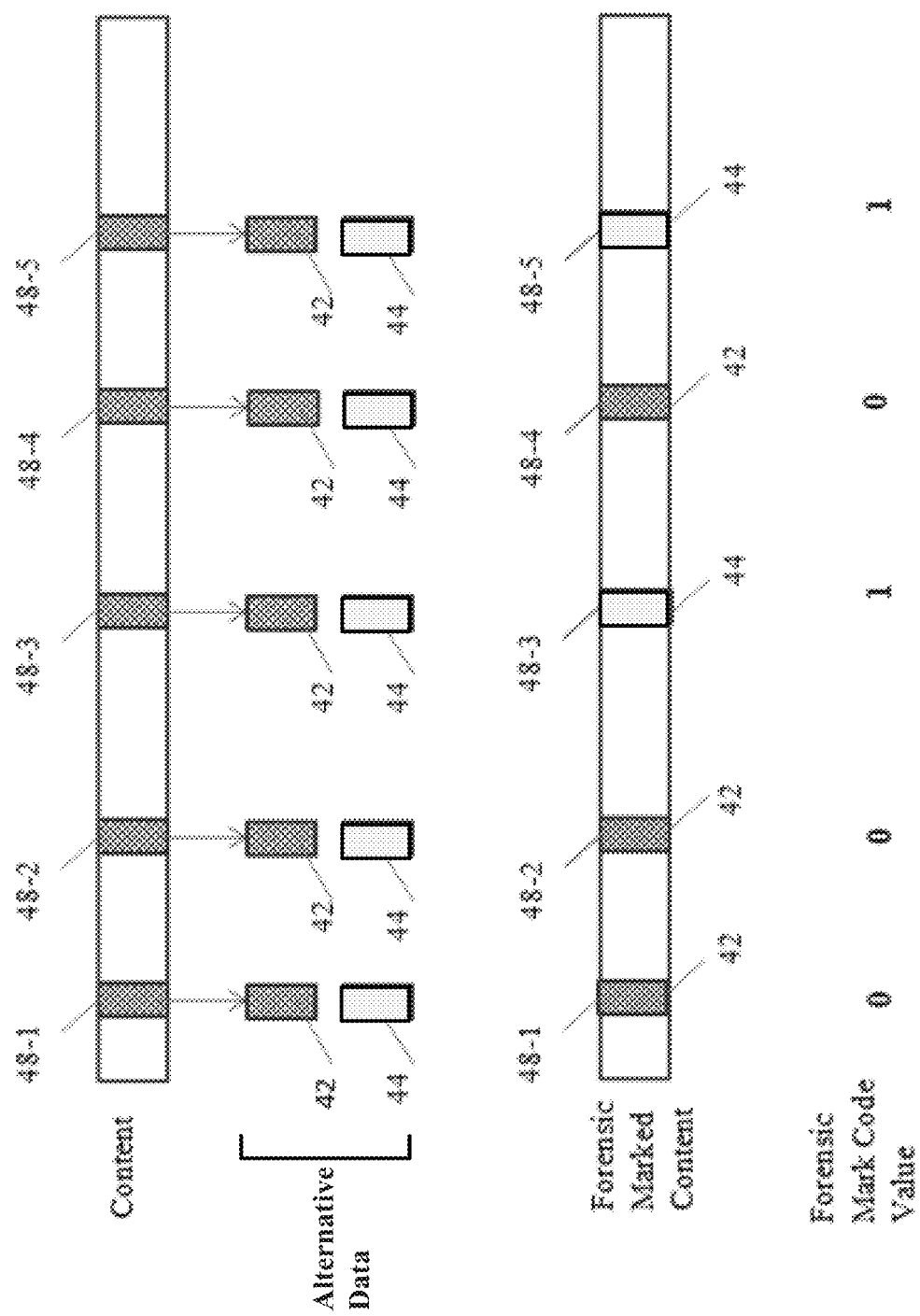
FIG. 1 is simplified diagram that illustrates the principles of transactional or forensic mark insertion into a content using preprocessed content.

FIG. 1 is simplified diagram that illustrates the principles of transactional or forensic mark insertion into a content using preprocessed content. In the exemplary diagram of FIG. 1, a preprocessing engine processes some segments of a particular content to produce two alternative data 42 and 44 for each segment. Alternative data 1 (42), for example, can be produced by embedding all zero-valued watermark symbols in a segment of the content. Alternative data 42, thus, is perceptually similar to the original (unmarked) content but includes embedded zero-valued watermarks at locations identified as segment 1 (48-1), segment 2 (48-2), etc. Similarly, the preprocessing engine processes the same segment of the unmarked content to produce alternative data 44 that is perceptually similar to the original (unmarked) content but includes, for example, embedded one-valued watermarks at the same locations identified as segment 1 (48-1), segment 2 (48-2), etc. The generation of the alternative data, such as alternative data 12 and 44 at the locations 48-1, 48-2, etc., facilitates the production of a forensically marked content at future stages of processing or at other locations. For example, alternative data 42 and 44 at all locations 48-1, 48-2, etc. may be transmitted to an inserter entity, where a transactional (or forensic) watermark is embedded using little computational effort. In particular, as shown at the bottom two rows of FIG. 1, embedding of the forensic mark code value can be carried out by selecting either alternative data 42 or 44 at a particular location 18-1, 48-2, etc., and then replacing the segments at such location with the selected alternative data to produce a forensically marked content. It should be noted that the diagram of FIG. 1 only illustrates a scenario in which binary watermark symbols are used. However, transactional marking can be done using non-binary symbols, i.e., more than 2 alternative data can be produced at any particular location. Further, alternative data 42 and 44 may be used to replace the segments at some locations, and segments at other locations may be unmarked or may contain other types of watermarks. As such, in some scenarios that will be described in the sections that follow, only a portion of each tributary may be preprocessed, and provided to subsequent stages to effect transactional watermarking.

The disclosed embodiments enable insertion of transactional (or forensic) watermarks in a video content in an efficient and flexible manner. It should be noted that the disclosed embodiments relate to principles that are well suited for embedding watermarks in compressed video domain, it is, however, understood that the disclosed embodiments are also applicable to watermarking in uncompressed video, as also described in the present application.

Figure 2:
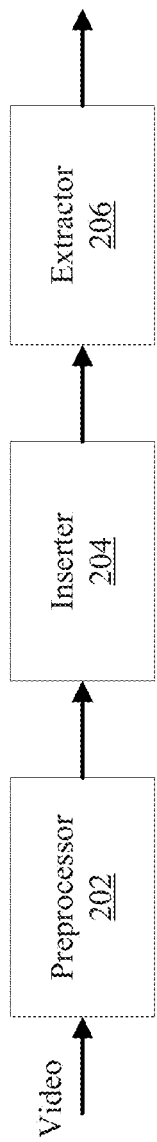
FIG. 2, is a high level block diagram of various components for embedding and detection of forensic marks.

FIG. 2 is a high level block diagram of various components for embedding and detection of forensic marks in an exemplary embodiment. The preprocessor 202 includes an input that allows a video content to be delivered to the preprocessor 202. The preprocessor 202 is also coupled to a an inserter 204 and is configured to analyze the input video asset to produce an inserter manifest and/or extractor manifest. The operations at the pre-processor 202 are expected to be computationally expensive and can include various processing, filtering, psychovisual analyses, and the like, that produce an inserter manifest. The insert manifest simplifies and guides the operations of the inserter 204. The preprocessor 202 also optionally produces an extractor manifest to assist watermark extraction by the extractor 206. The inserter manifest may be multiplexed into the video transport stream or transmitted securely and separately to the inserter 204. The inserter 204 is a simple and lightweight engine that inserts the video watermark according to the inserter manifest into video streams. The insertion of watermarks can be based on a provided watermark message (e.g., an identification number that identifies a transaction), as well as based on pre-assigned watermark payload values (e.g., a serial number identifying a device, user, or entity). The inserter 204 can operate within a video distribution server (e.g., at a content distribution head-end, at an edge server, etc.) or at a video client (e.g., a set top box, a TV, or an application running on a device).

Referring again to FIG. 2, the extractor 206 recovers the embedded watermark message typically after the content has been distributed to the public. For example, once a content has been embedded and publically distributed, the content owner (or another interested entity) may obtain a copy of the content that is suspected as being pirated. In this case, the extractor, optionally, with the assistance of the extractor manifest, can assess the video content to obtain the embedded watermarks and to investigate the origins and channels of content piracy.

Figure 3A:
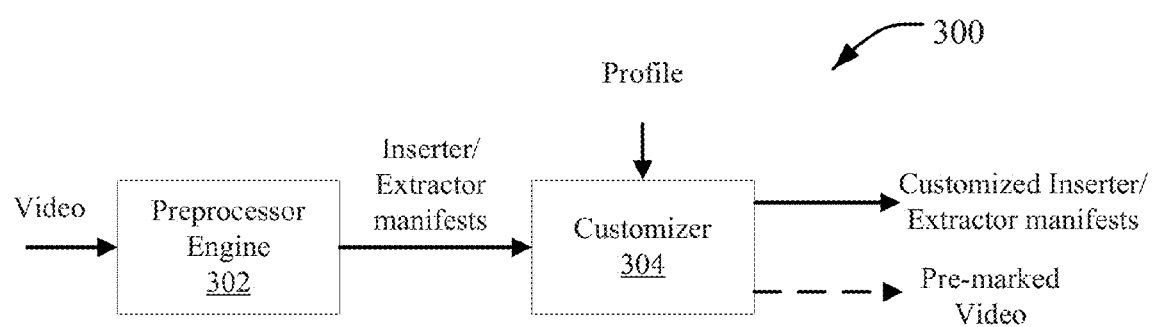
FIG. 3(a) is a simplified diagram illustrating some of the components of a preprocessor in accordance with an exemplary embodiment.

FIG. 3(a) is a simplified diagram illustrating some of the components of the preprocessor 300 in accordance with an exemplary embodiment. The preprocessor 300 comprises two components: the preprocessor engine 302 and the customizer 304. The pre-processor engine 302 is responsible for the majority of the computationally expensive operations performed on the video content. The preprocessor engine 302 generates the inserter and optionally the extractor manifests that are provided to the customizer 304. The operations and components of the preprocessor engine 302 will be discussed in further detail the sections that follow. The customizer 304 modifies the inserter manifest based on a given profile to produce customized inserter extractor manifests that facilitate embedding and extraction of watermarks at subsequent stages. In some embodiments, the customizer 304 can also optionally produce a pre-marked video. Further details of the operations and components of the customizer 304 are described in the sections that follow.

Figure 3B:
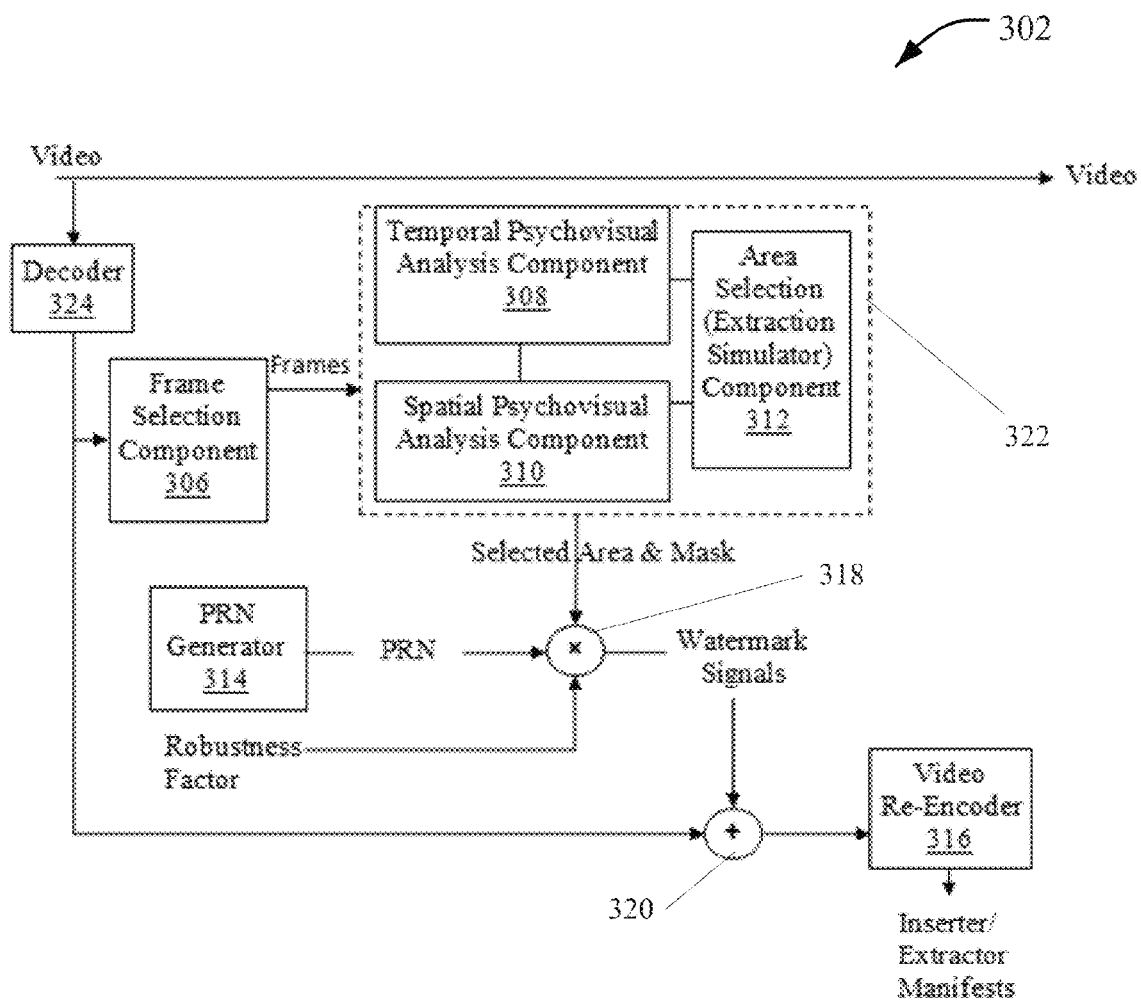
FIG. 3(b) is a block diagram of the preprocessor engine in accordance with an exemplary embodiment.

FIG. 3(b) is a block diagram of the preprocessor engine 302 in accordance with an exemplary embodiment. It should be noted that FIG. 3(b) is only a simplified diagram of the pre-processor engine 302 and thus may not show all components of the preprocessor and/or the connections among the various components. In the exemplary diagram of FIG. 3(b), the input video (e.g., a compressed video stream such as an MPEG stream) is routed through two different paths. In particular, the upper path is merely a pass-through path that allows video to be handed off to the next stage (e.g., stored on a media, transmitted to another component, such as the inserter, etc.). The upper path (e.g., the pass-through functionality) may be implemented inside or outside of the preprocessor engine 302. The video that enters the preprocessor engine 302, through the lower path undergoes several stages of processing to produce the inserter/extractor manifests at its output.

While each component of the preprocessor 302 will be described in greater detail in later sections, it is instructive to describe the overall operations of the pre-processor engine 302 as follows. The video is input to a decoder 324 to produce an uncompressed video stream, which is directed to a frame selection component 306 that selects a particular video frame or frames for the insertion of watermark. The selected frames are input to evaluation component 322 that may comprise several subcomponents. In particular, the temporal psychovisual analysis component 308 and spatial psychovisual analysis component 310 can conduct psychovisual analysis to determine areas within the frame(s) that can accommodate the embedding of watermarks. For instance, temporal analysis cam determine areas that due to the motion of images within a sequence of frames produce less perceptible artifacts when embedded with watermarks, or alternatively areas of the image that should not be embedded with watermarks since they produce perceptible artifacts. Similarly, spatial analysis determines areas within a frame where the presence of watermarks can be masked (and/or alternatively cannot be masked) due to, for example, the presence of stronger image signals, or higher spatial frequencies. The area selection component 312 determines the actual areas within a frame that can be used for embedding of watermarks. The mask values that are generated by the psychovisual analysis components can be binary valued or non-binary valued (e.g., as a real number). The area selection component 312 can, for example, simulate embedding and extraction of watermarks to select the areas that are suitable for watermark insertion. Thus, the output of the evaluation component 322 can include the selected areas, as well as the masking factors that can attenuate (or eliminate altogether) the embedding of watermarks at certain locations within the selected areas.

The pseudo-random number (PRN) generator 314 produces a set of random numbers (e.g., a random carrier) that can be used for embedding of watermarks. Using the combiner 318 (e.g., a modulator), the PRN is combined (e.g., modulated) with a robustness factor and the pixel values of the selected area as modified by the mask to produce the watermark signals. For example, in case of binary watermark symbols, such watermark signals can represent two streams, one corresponding to the "zero" watermark and one corresponding to the "one" watermark. Using the combiner 320 (e.g. an adder), the watermark signals can then be combined with the selected frames of the unmarked video signal to produce the watermarked video signal. The watermarked video signal is then re-encoded to properly form the compressed video stream that is part of the inserter/extractor manifests.

The PRNs that are generated by the PRN generator 314 are data signals or sequences with strong autocorrelation and/or cross-correlation properties. They also present noise-resistance features because they are pseudo random noise sequences. Examples of the PRNs include maximal length sequences, Gold codes, Kasami codes, Barker codecs, and complementary sequences. A watermark symbol can be embedded by modulating a specific PRN sequence into the video stream. The notation $S_i^j$ will be used throughout this document to indicate the element j of sequence i, where is the index to the PRN sequence and can range between 0 and the total number of the bits to be embedded as a watermark symbol, and j is the index to an element of the sequence $S_i$ and can range between 1 and the total number of pixels of a video frame. Most PRNs are binary sequence, e.g., the value of $S_i^j$ is either 1 or −1 (or, 0 or 1). Multiple PRA sequences in a set can be generated for embedding multi-bit symbols, and each such sequence has a very low correlation with any other sequence in the set. For example, for a set of 32 PRN sequences, 32 "alternative data" at a single location in the video stream may be produced by the preprocessor engine 302. In other words, up to 5 bits per symbol can be transmitted using the set of 32 PRN sequences.

It should be noted that the term alternative data refers to one or more video stream portions that may alternatively replace a particular segment of the video stream in a manner that such replacement does not produce perceptually significant differences on the rendering and quality of the video stream. For example, a first and a second segment of video stream that are embedded with a zero-valued and one-valued watermark are examples of two alternative data that can replace a corresponding unmarked segment of the video stream. Alternative data is often the same size as, or smaller than, the segment of the video stream that it intends to replace.

PRN Patterns:

A PRN sequence $S_i$ that is used in accordance with the disclosed embodiments can be expanded and mapped into one or more arbitrary 2-dimensional shapes such as rectangles, polygons, circles, ovals and the like. One exemplary shape is rectangular area that consists of W×H elements, where W and H are the width and height of the rectangular area, respectively. Such a rectangular area can be further divided into W/Wc×H/Hc cells, where Wc and Hc are the width and height of each cell, respectively. In one exemplary embodiment, mapping a PRN sequence to such a rectangular area is performed by applying the value of $S_i^j$ to all elements of a cell of the rectangular area.

Figure 4A:
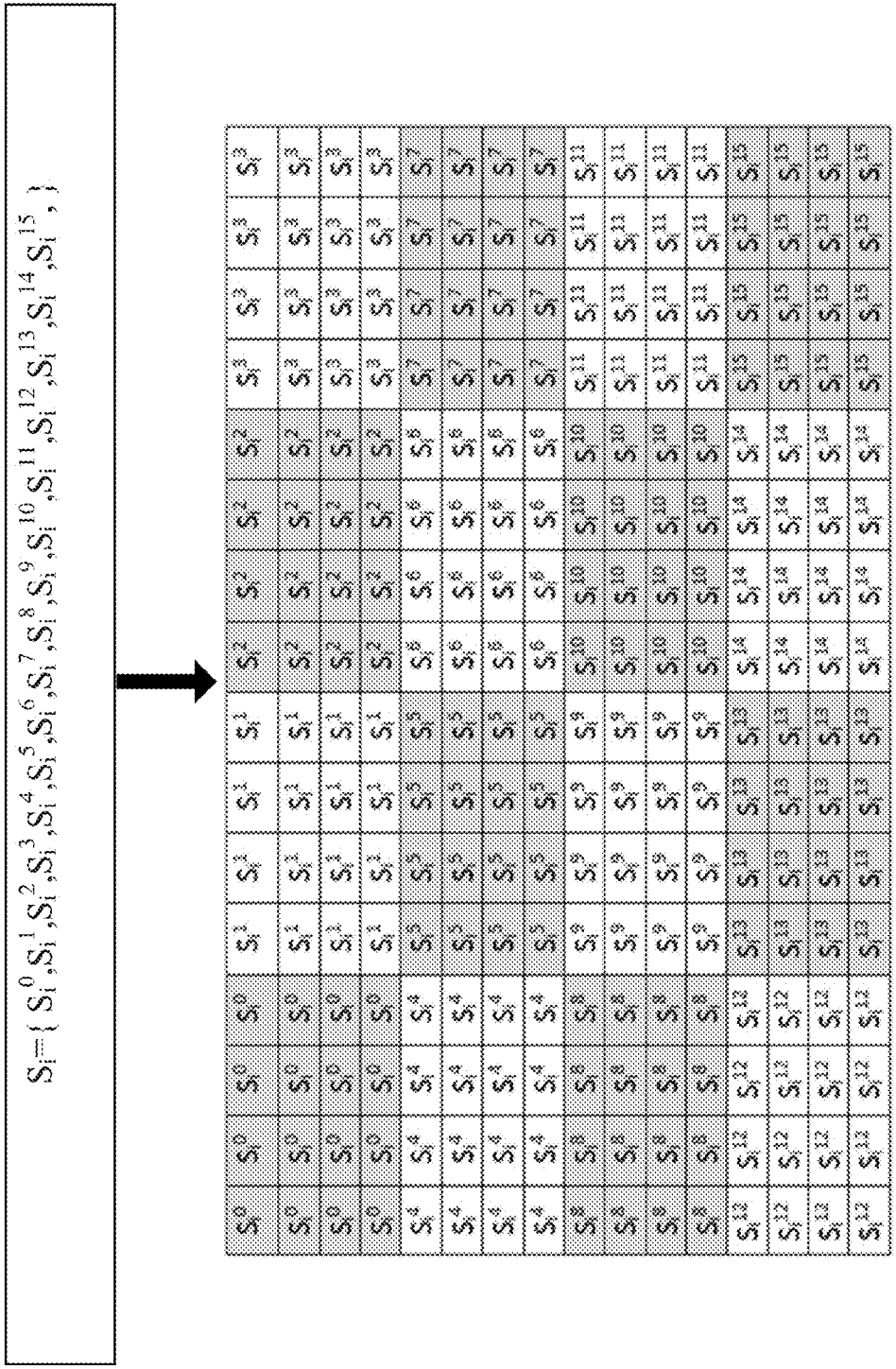
FIG. 4(a) illustrates an mapping of a PRN sequence to a rectangular area in accordance with an exemplary embodiment.

FIG. 4(a) shows a mapping of a PRN sequence to a rectangular area in accordance with an exemplary embodiment. The exemplary diagram of FIG. 4(a) shows a 16-element PRN sequence $S_i$ that is mapped to a rectangular 16×16 PRN pattern, where the value of each element ($S_i^0$ to $S_i^{15}$) is applied to a 4×4 cell. For example, in the upper left 4×4 cell grid of FIG. 4(a) (highlighted in gray), the value of $S_i^0$ is applied to the top-left cell, and the value of $S_i^{15}$ is applied to the bottom-right cell. In this example, the value of both W and H is 16, and the value of both Wc and Hc is 4. However, the value of W may be in the range between 1 and the width of video frame, and the value of H may be in the range between 1 and the height of video frame. Moreover, the value of Wc may range between 1 to W and the value of Hc may range between 1 and H.

In another exemplary embodiment, the PRN pattern can be in the form of a circular area. In particular, one example circular design maps a PRN sequence into an solid core with multiple bands of non-overlapping rings around the core. The value of each is applied to all elements of a specific ring (including the solid core), and/or a specific section of a ring. FIG. 4(b) illustrates a mapping of a PRN sequence to a circular area in accordance with an exemplary embodiment. In the exemplary diagram of FIG. 4(b), the 8 elements of a PRN sequence are mapped into a core and 7 rings, of the circular pattern, respectively. It should be noted that multiple elements of the PRN sequence may be mapped into different non-overlapping sections of a ring, especially in the large outer ring. Another example is to map each element of the PRN sequence into a circular section of a disk.

A PRN pattern is an expanded spatial representation of the PRN. In one exemplary embodiment, the number of elements in a PRN pattern is equal to the number of pixels of the watermarked area (e.g., in luminance domain), and the shape of the watermarked area in a video frame is identical to the shape of the PRN pattern. There are a number of ways to map a PRN sequence into a PRN Pattern. Some non-exclusive examples include: (a) the PRN has only one element and such element is applied to the entire video frame, (b) the PRN has 4 elements, and each element is applied to one of the quarters of the video frame, (c) the PRN has 2 elements, which are applied to the top half and bottom half of the video frame, respectively.

Once mapping of the PRN is carried out, the resulting spatial representation of the PRN is modulated with the mask values calculated by the psycho-visual analysis components to create the watermark signals, as shown in FIG. 3(b).

Referring back to FIG. 3(b), the frame selection component 306 selects one or more frames for embedding of watermarks. In some exemplary embodiments, a number of consecutive frames ("watermarked frames" or "selected frames") are typically selected for embedding of a watermark symbol. In other words, in such a scenario, the same symbol value is embedded into consecutive frames. The number of such consecutive frames may range from 1 to the total number of frames in a video stream to be watermarked. When the watermark signal is added to the selected frames in compressed domain (e.g., using the combiner 320 in FIG. 3(b)), one consideration for selection of the frames is to select particular frames in such a way to minimize the portion of the video stream that must be re-encoded in preprocessing stage. Re-encoding is described in detail in a later section of this document. Another consideration for frame selection is to ensure that the presence of "stable" areas over the selected consecutive frames, for example, the pictures in these stable areas over the selected consecutive frames are similar. These stable areas are in similar spatial locations in all selected consecutive frames.

Guided Frame Selection:

According to some exemplary embodiments, one or more frames of a video can be selected according to a guided frame selection methodology. In particular, an inserter manifest and/or extractor manifest produced from a first video stream can be used to guide the frame selection for a second video stream. For example, the first and the second video streams can be different encodings of the same movie title that are produced for different purposes, such as to provide different bit rates or language versions for the same movie title. In such scenarios, the content of one video are substantially similar to the contents of the other video and, therefore, an inserter (or extractor) manifest that has been generated for one video can greatly facilitate the generation of the inserting and/or extraction manifests for the other video. When the frames in the first video stream are not synchronized with the frames in the second stream (due to editing and/or different frame rates), temporal synchronization information (e.g., fingerprints, timestamps and temporal locations of key frames, scene changes) that is stored in the inserter/extractor manifests can be used to synchronize the frames between the first and second video streams when conducting a guided frame selection. After synchronization, if the selected frames at a temporal location in the first video stream do not exist in the second stream (e.g., because of editing), no frames at the same temporal location in the second stream are selected. Moreover, any frame in the second stream that does not exist in the first video stream is not selected.

In a guided frame selection mode, frames in the second video stream are identified with the frame numbers and/or timestamps of the selected frames specified in the inserter/extractor manifests produced from the first video stream. In another exemplary embodiment, the frames of the first video stream are identified based on an identification scheme (e.g., by computing a fingerprint that uniquely identifies a frame). Such identification information can, for example, reside at the inserter/extractor manifest, or at a database. Guided frame selection in the second video can be carried out by identifying the frames of the second video using the same identification scheme, matching them to frames in the first video stream, and obtaining the associated embedding/extraction information from the manifest.

Additionally, or alternatively, information obtained from sources other than the inserter/extractor manifest can be used to guide the frame selection. One example of such information is a client manifest or playlist for adaptive video streaming used in protocols and systems such as MPEG-DASH (Dynamic Adaptive Streaming over HTTP), Microsoft Smooth Streaming, HTTP Live Streaming (HLS) or HDS (HTTP Adaptive Streaming). Such a client manifest or playlist specifies the indices for a client to access the content segments for each bitrate version of the content.

Temporal Psychovisual Analysis: Referring back to FIG. 3(b), temporal psychovisual analysis component 308 analyzes the temporal features of the selected frames, and produces a temporal mask for each selected frame. The size of each temporal mask is identical to the frame size. The temporal mask reduces the visual artifacts in temporal domain that would be potentially introduced by the insertion of watermarks. In some embodiments, a temporal multi-resolution contrast mask is computed by analyzing neighboring frames. Areas with high temporal masking can significantly improve the transparency of embedded watermarks.

Spatial Psychovisual Analysis:

In the exemplary diagram of FIG. 3(b), the spatial psychovisual analysis component 310 analyzes a selected frame to produce a spatial mask that reduces the visual artifacts in the spatial domain that would be potentially introduced by the insertion of watermarks. Similar to the temporal mask, the size of each spatial mask is identical to the frame size. An example of a spatial psychovisual analysis includes using an algorithm that operates based on detection of highly textured areas using multi-resolution local contrast analysis.

In an exemplary embodiment, the spatial psychovisual analysis operations includes the following operations: 1) a non-linear inverse gamma curve is applied to the luminance component of video images to better match the human visual system response in dark areas; 2) a Laplacian/Gaussian pyramid is performed multiple times at multiple resolutions on video frames in the contrast domain for detection of highly textured areas; and 3) a edge and contour detection algorithm to handle edges is performed. In some cases, image areas within a few pixels of an edge (e.g., edge included) may be avoided by setting the mask values for such areas to 0, or adjusting the mask values to better match the human visual system response around edges. The Laplacian or Gaussian pyramid techniques involve creating a series of images which are weighted down using, e.g., a Gaussian average and scaled down. When these techniques are used multiple times, they create a stack of successively smaller images, with each pixel containing a local average that corresponds to a pixel neighborhood on a lower level of the pyramid.

The temporal mask and spatial mask for each selected frame can be combined multiplied with weights) to produce the final mask.

Area Selection:

Referring back to FIG. 3(b), the area selection component 312 is responsible for selection one or more particular areas within the selected frame(s) for watermark insertion. In one exemplary embodiment, the area selector component 312 utilizes an extraction simulator to select the best areas in the selected frame where the maximum robustness may be achieved when the watermark signals are added into such area. Furthermore, for each candidate area in a selected frame, different PRNs may be applied to such area repeatedly in watermark extraction simulation. The MIN with the maximum robustness is selected and stored in an Extractor manifest for each area. That is, watermarks that are embedded in such areas can still be detected when those areas within the frame(s) are subject to added noise, distortion and other impairments. Another consideration for area selection is to use the spatial masks to select areas with specific characteristics that allow the insertion of watermarks in a substantially transparent manner, without producing perceptible artifacts. For example, highly textured areas may be selected and flat image areas may be avoided. It is often beneficial to combine and balance these considerations (e.g., robustness versus transparency) for area selection.

To simulate noise channels, such as camcorder capture of the video content, compression or other image/video processing operations, additional noise signals are modulated onto the watermarked video. In one exemplary embodiment, an extraction simulator component, which can be implemented as part of the area selection component 312, performs the following steps in sequence. Assume that f is the selected frame, f(x,y,w,h) is a rectangular area within the frame f, where (x,y) is the top-left coordinate of the area, and w and h are the width and height of the area, and further assume that the number of alternative data is 2 (i.e., binary watermark symbols are used), and $w_0$ and $w_1$ are the watermark signals carrying the symbol '0' and '1' when they are added to f(x,y, w,h), respectively.

1. Set x=0, y=0, and reset C (C is a list for storing the correlation values),
2. Add the watermark signal $w_1$ to f(x,y,w,h) by calling the Watermark Embedding Function (which is described in detail in a later section of this document) to produce the watermarked frame f';
   Add additional simulation noises introduced by noise channels (e.g., camcordering, compression, etc.) to the watermarked frame f';
   Perform the extraction operations to obtain correlation values and add the correlation value (which is a result of the extraction function) to C.
3. Add the watermark signal $w_0$ to f(x,y,w,h) by calling the Watermark Embedding Function to produce the watermarked frame f'
   Add additional simulation noises introduced by noise channels such as camcordering, compression, etc., to the watermarked frame f';
   Perform extraction operations and add the correlation value to C.
4. Set x=N where N is constant value as the step size (e.g., N=1) or a pseudo-random number in a particular range n1 to n2 where n1 and n2 are numbers, and repeat Step 2-3 until x is equal to or greater than the width of f.
5. Set y=y+N and x=0 where N is a constant value as the step size N=1) or a pseudo-random number in a particular range n1 to n2 where n1 and n2 are numbers, and repeat Step 2-4 until y is equal to or greater than the height of f.
6. Sort the correlation values in C and select the area with the highest correlation value in C for watermarking. Such area is called the 'selected area' or 'watermarking area' in f.

Guided Area Selection:

Similar to the above-described guided frame selection, an inserter manifest and/or an extractor manifest produced from a first video stream can be used to guide the area selection for a second video stream. For example, the first and the second video streams can be different encodings of the same movie title that are produced for different purposes, such as to provide different bit rates or language versions for the same movie title. In a guided area selection mode, areas in the second video stream are selected based on the spatial location, size and/or shape of the selected area specified in the inserter/extractor manifests produced from the first video stream. If the width and/or height of the frames in the first video stream are different from the second video stream, the area selected by the guided selection in the second stream can be resized proportionally according to the width and height of the video frame of the first video stream, or registered with the selected area in the first video stream based on spatial fingerprints or other metadata.

Guided preprocessing based on the inserter/extractor manifests produced from the first video stream, including the guided frame and area selections, ensures that when an extractor manifest is required for watermark extraction, only a single extractor manifest is needed for different video streams that are derived from a specific visual work through encoding and/or editing or other processing. One example is the adaptive streaming scenario where multiple video streams with different bit rates are delivered to users based on, for example, the user's network bandwidth and capability of the playback client. In these cases, the input video stream to the preprocessor should be in streaming-ready format such as fragmented MP4, MPEG Transport Stream, or MPEG Dynamic Adaptive Streaming over HTTP (DASH) compatible video stream. In one exemplary embodiment, each video stream is divided into multiple segments, and all segments in all video streams with different bit rates at a specific temporal location are switchable under the request of the playback client. The preprocessor first generates inserter/extractor manifests from one of such multiple video streams (e.g., the video stream with the highest bit rate), and then uses such manifest(s) to guide the generation of inserter manifests for other video streams in such a way that 1) the inserter will insert the same watermark symbols (if any) in a segment, independent of which video stream such a segment come from; and 2) the extractor can extract the watermarks with the aid of the extractor manifest (if required) from a content mixed from segments from all video streams with the different bit rates. For example, assume that S1, S2, . . . Sn are the segments of the first video stream S at one bite rate, and S'1, S'2, . . . S'n are the corresponding segments of the second stream S' at another bit rate. The guided preprocessing ensures that the same watermark symbol is embedded into either Si or S'i (1≤i≤n), and the watermark can be extracted with a single extractor manifest (if required) from the content delivered to the playback client, which may consists of segments from either S or S'.

Another broader use case of the guided pre-processing is to ensure that a single extractor manifest can be used for all video streams derived from a specific visual work across different regions for a distributor or for all distributors. In the former case, an extractor/inserter manifest produced from the first video stream by a branch of a distributor may be provided to another branch of the same distributor for selected preprocessing of the second stream. In the latter case, a content producer or owner may provide extractor/inserter manifests to all distributors, in addition to the associated content; such distributors may optionally encode and edit the received content to produce video streams for distribution, and then can use such manifest to perform guided preprocessing on such video streams.

Video Re-Encoder:

Referring again to FIG. 3(b), the video-re-encoder 316 performs some or all of video encoding operations that may be needed after the unmarked video has been processed to embed watermark signals. In one exemplary embodiment, the algorithm for detection of one or more frames which need to be re-encoded is implemented using the following steps. Assume F is a set of frames that need to be re-encoded. F is determined by the following steps.

1. Set F={f1, . . . fn}, where f1, . . . , fn are the selected consecutives frames designated for carrying a watermark symbol, and n is the total number of such selected frames for watermarking;
2. If no frame in F is "referred" in the video stream by any frame that is not in F, go to Step 5. Otherwise, proceed to the next step. Referencing of frames in the video stream is clarified in a later section of this document,
3. If any frame in F is referenced by the frames that are not in F, add these referring frames to F.
4. Repeat Step 3 until no frame in F is referenced by the frames that are not in F.
5. Re-encode each frame in F.

It should be noted that any frame in the set F can be referred by any other frame within the frame set F, and also can use any other frames that are not in the set F as references, A strategy to reduce the number of re-encoded frames is to select the frames for watermarking immediately prior to a key frame (e.g., an instantaneous decoding refresh (IDR) frame in H.264).

In one exemplary embodiment, after a video frame is optionally re-encoded, the resulting video frame is decoded and its quality is compared with the original video frame using quality measurement methods such as SSIM (Structural Similarity) method, signal-to-noise ratio (SNR) and peak signal-to-noise ratio (PSNR). If the quality of re-encoded frame reaches unacceptable levels (compared to the original video frame), the candidate frames for watermarking may not be selected.

As is well known in video compression, a compressed video stream, such as an MPEG stream or High Efficiency Video Coding (HEVC), comprises a series of frames, some of which require information from the previous or future frames for decoding. For example, the raw frames in an MPEG-2 video can be compressed into three kinds of frames: intra-coded frames (I-frames), predictive-coded frames (P-frames), and bidirectionally-predictive-coded frames (B-frames). An I-frame is a compressed version of a single uncompressed (raw) frame that may be decoded independently, without referencing other P- or B-frames. P-frames and B-frames are not independently decidable since they are produced by computing a motion vector which points to the position of a matching block in a reference frame. The process of motion vector determination is called motion estimation. P-frames provide more compression than I-frames because they take advantage of the data in a previous I-frame or P-frame (i.e., the relied upon I- or P-frame is considered as a reference frame for the P-frame). B-frames use the picture in a subsequent reference frame as well as the picture in a preceding reference frame. As a result, B-frames usually provide more compression than P-frames. Further details of video compression and decoding are not described in this document since the details of video compression techniques can be readily found in many published documents and standards.

Figure 5:
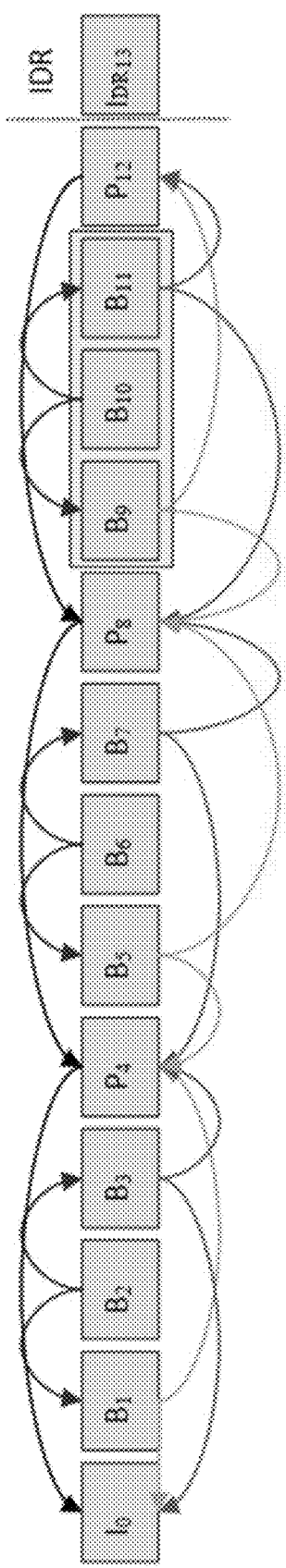
FIG. 5 illustrates an example of inter-frame dependencies for I, P and B frames.

FIG. 5 illustrates an example of inter-frame dependencies for I, P and B frames. If a frame is referred, there is an arrowed line pointing to that frame originated from another frame. If a frame uses another frame as a reference, there is an arrowed line originated from that frame. As shown in FIG. 5, the group of the frames (B9-B11) is independent from other frames because any frame within the group (B9-B11) is not referred by other frames outside this group. However, the frames within the group (B9-B11) may rely on other frames outside the group for reference. For example, frame B11 uses both P8 and P12 as references. If as part of preprocessing the video stream to produce the inserter/extractor manifests (e.g., by the preprocessor 302 of FIG. 3(b)) modifications are made to the frames within the group (B9-B11), then only frames of this group must be re-encoded (e.g., by the video re-encoder 316 of FIG. 3(b)).

Figure 6:
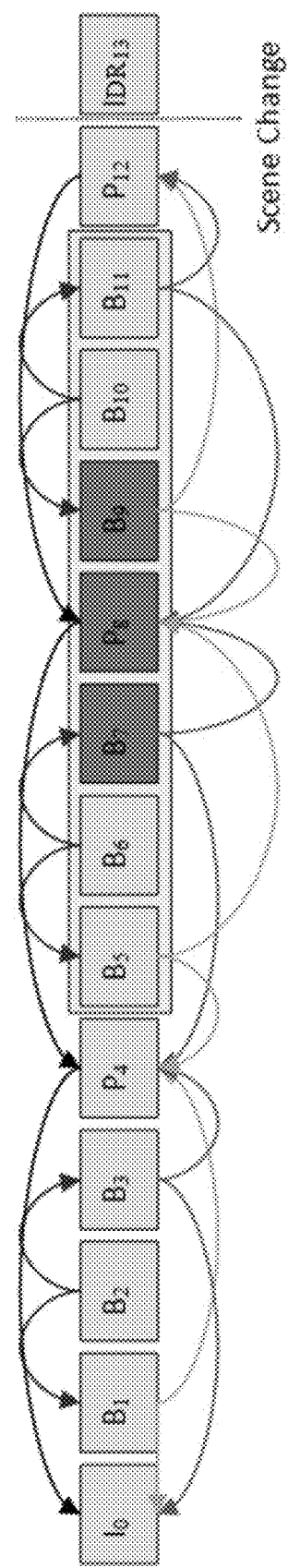
FIG. 6 shows a set of selected frames and frames that need to be re-encoded in accordance with an exemplary embodiment.

In some cases, the number of frames to be re-encoded may be larger than the frames in the selected group of frames. For example, FIG. 6 shows a scenario in which frames B7, P8 and B9 are the selected frames, but a group of 7 frames, (B5-B11), needs to be re-encoded because frame 37 if referred by frame 36, frame 38 is referred by frames 35 and 311, and frame 39 is referred by frame 310. Fortunately, such cases are not common. Even if such rare cases occur, a block-level analysis can be conducted to reduce the number of frames to be re-encoded by detecting un-referenced areas in each frame (since referencing is typically done on a sub-block or sub-block (e.g., macro-block by macro-block) basis. If a frame does not reference an area to be watermarked, it may not need to be re-encoded. Motion estimation can also be recomputed while avoiding certain areas of a frame or using other reference frames. Therefore, in some embodiments, the number of frames to be re-encoded is reduced by using block-level analysis and recalculation of motion estimation.

Alternative Data:

As also noted in connection with FIG. 1, in a transactional watermarking scheme, the selected frames or selected areas must be embedded with all values of a watermark symbol to allow subsequent replacement for watermark insertion. Therefore, the Re-Encoder 316 of FIG. 3(b) must also run for each watermark symbol value repeatedly to re-encode all selected frames or selected areas as alternative data. Moreover, to maintain the same size of the re-encoded frames as the original frame, the Re-Encoder 316 may need to repeat the re-encoding process by adjusting the bitrates of the re-encoded alternative data.

Figure 7:
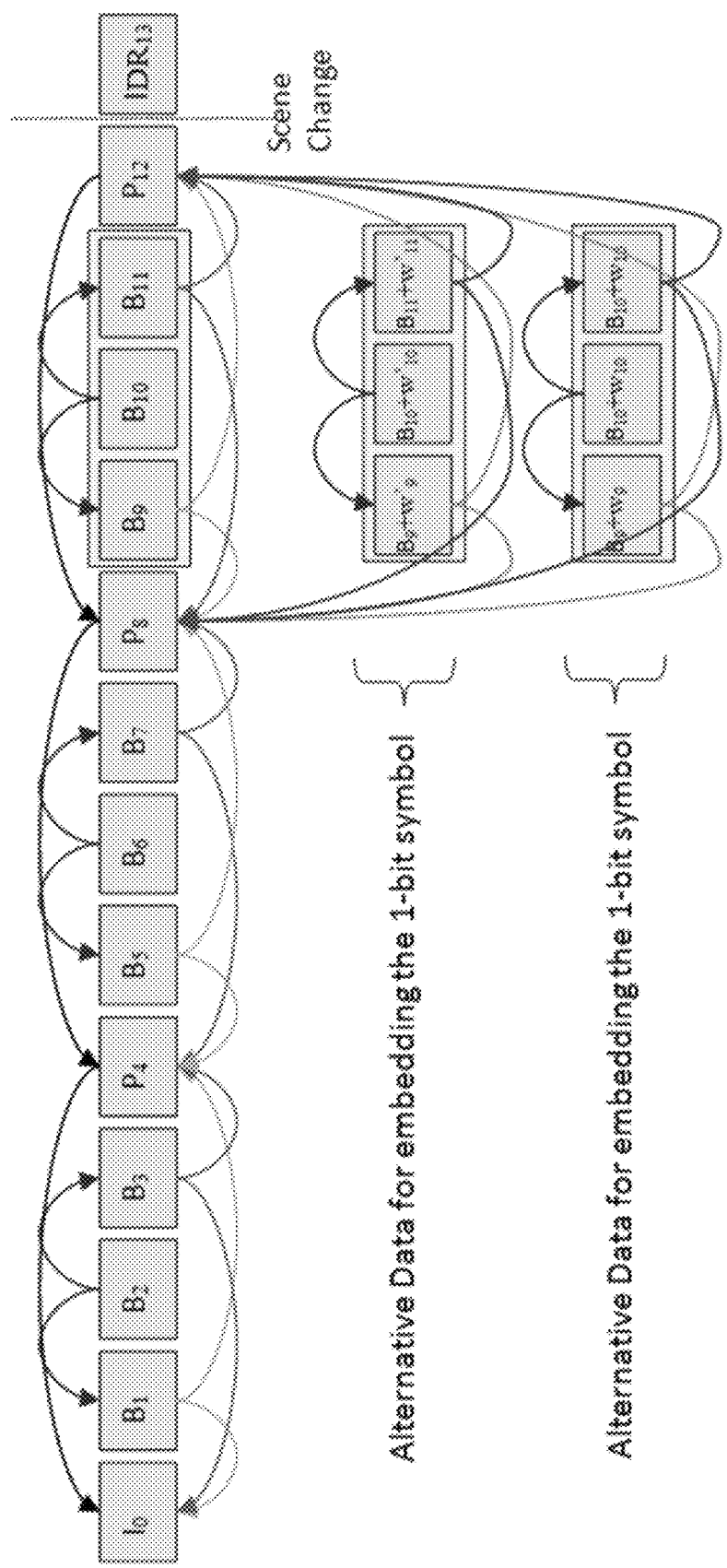
FIG. 7 shows two alternative data generated in accordance with an exemplary embodiment which may be stored in inserter manifest.

FIG. 7 shows two alternative data generated in accordance with an exemplary embodiment which may be stored in inserter manifest, In FIG. 7, $w'_9$ through $w'_{11}$ represent the watermark signals that carry the symbol '0' for the selected frames B9 through B11, respectively. Analogously, $w_9$ to $w_{11}$ represent the watermark signals that carry the 1-bit symbol '1' for the selected frames B9 through B11, respectively. In the example scenario of FIG. 7, the frames identified as $B9+w'_9$ through $B11+w'_{11}$ form one set of alternative data, and the frames identified as $B9+w_9$ through $B11+w_{11}$ form another set of alternative data. In another example that uses 5-bit watermark symbols, 32, such alternative data is generated for each selected frame in a similar fashion as described in connection with FIG. 7. When a selected frame is re-encoded into multiple slices, only the slice that contains the selected area is required to be re-encoded multiple times to produce the alternative data.

In some embodiments, to detect intentional or unintentional manipulations of the alternative data or wrong segment replacement, a hash value of the original data to be replaced by one of the alternative data is computed and associated with each alternative data. The inserter can then perform an integrity validation by comparing the hash value computed from the original data to be replaced with the hash value associated with the replacing alternative data before any replacement.

Watermark Embedding Function:

Referring back to FIG. 3(b), the watermark embedding function can be implemented at least in-part using the combiners 318 and 320. In one exemplary embodiment, watermark embedding in a rectangular area within a frame can be implemented according to the following procedure described as the watermark embedding function of Equation (1):

$$f'_i(x,y,w,h) = f_i(z,y,w,h) + [n_{j,u,v}(x,y,w,h) * m_i(x,y,w,h)] \quad \text{Eq. (1),}$$

where
- $f_i$ is the luminance component of the original frame that contains at least one area to be watermarked.
- $f'_i$ is the luminance component of the watermarked frame that contains at least one watermarked area.
- x and v specify the coordinates of an element in $f_i$ or $m_i$ (which have the identical width and height),
- w and h are the width and height of the watermarked area, respectively.
- u and v specify the coordinate of an element in the selected area to be watermarked. The default size of the watermarking area is w by h pixels.
- Assume that 1-bit symbols were embedded in the watermarked area (i.e., $P_0$ and $P_1$ are used), $n_{j,u,v}(x,y,w,h)$ (for j=0 or 1) is defined as follows:
  - if j=0 and x∈[u,u+w] and y∈[v,v+h], $n_{j,u,v}(x,y,w,h) = P_0(x-u, y-v)$ where $P_0$ is the PRN Pattern of $S_0$ as described earlier and the width and height, of $P_0$ are w and h, respectively.
  - if j=1 and x∈[u,u+w] and y∈[v,v+h], $n_{j,u,v}(X,y,w,h) = P_1(x-u, y-v)$ where $P_1$ is the PRN Pattern of $S_1$ as described earlier and the width and height of $P_0$ are w and h, respectively.
  - Otherwise, $n_{j,u,v}(x,y,w,h)=0$.
- $m_i$ is the mask frame for $f_i$, produced by the psycho-visual analysis components.

Figure 8A:
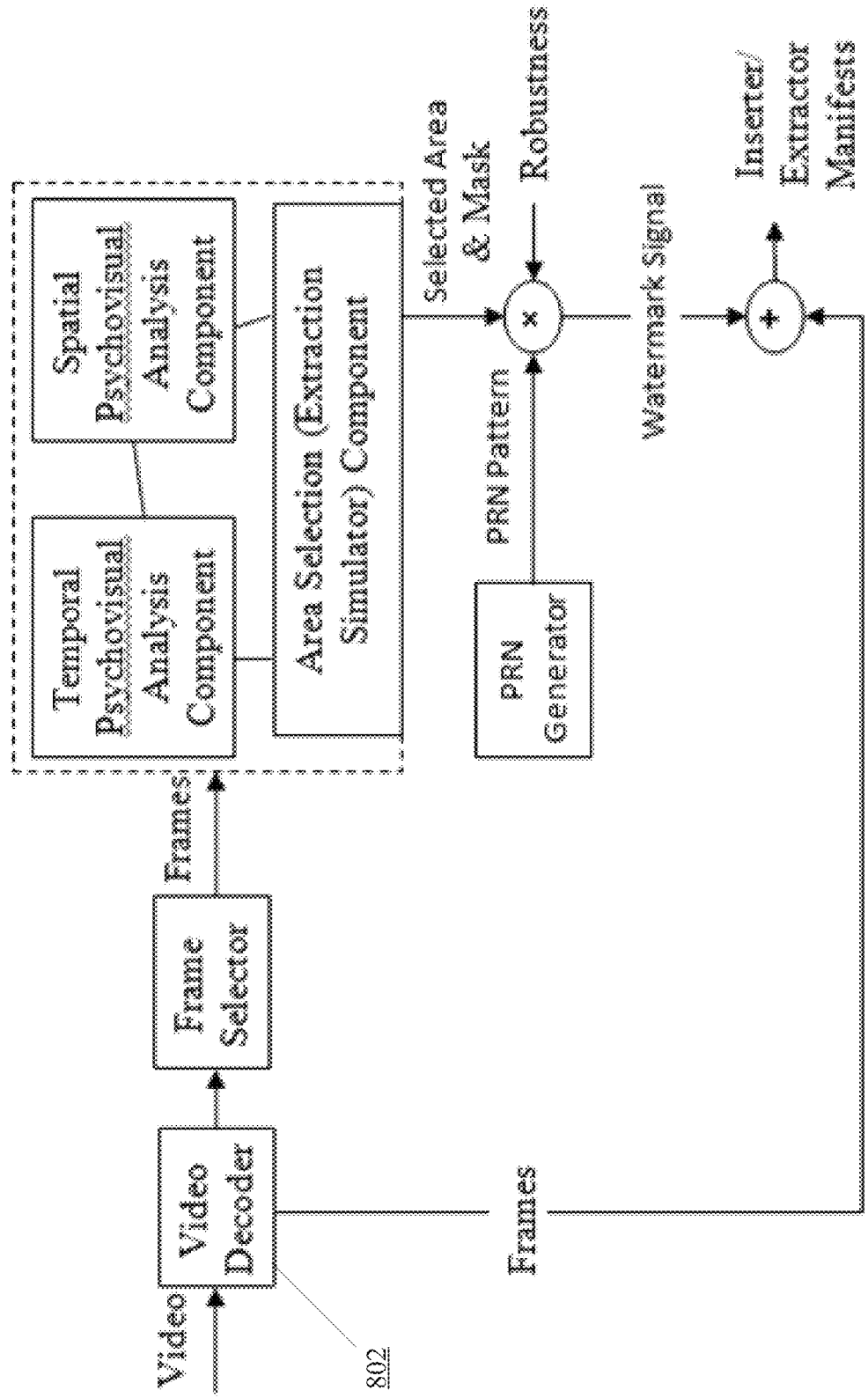
FIG. 8(a) illustrates a preprocessor engine for preprocessing an uncompressed video stream in accordance with an exemplary embodiment.

Watermarking in Uncompressed Domain:

In some embodiments, transactional watermarking can be carried out in an uncompressed video stream. FIG. 8(a) illustrates a preprocessor engine for preprocessing an uncompressed video stream in accordance with an exemplary embodiment. FIG. 8(a) includes similar components as FIG. 3(b) except that the re-encoder (such as the re-encoder 316 of FIG. 3(b)) is eliminated. Moreover, the video decoder 802 in FIG. 8(a) differs from the video decoder 324 of FIG. 3(h) since the latter performs various decompression operations to obtain the frames from a compressed stream, whereas the former obtains the frames from an uncompressed stream. The inserter/extractor manifests that are produced at the output of the pre-processing engine of FIG. 8(a) may be used to allow customization of the inserter/extractor manifests, as well as watermark insertion and/or extraction at subsequent stages. The pre-processor engine of FIG. 8(a) may be used to allow embedding of transactional watermarks in an uncompressed video stream.

Figure 8B:
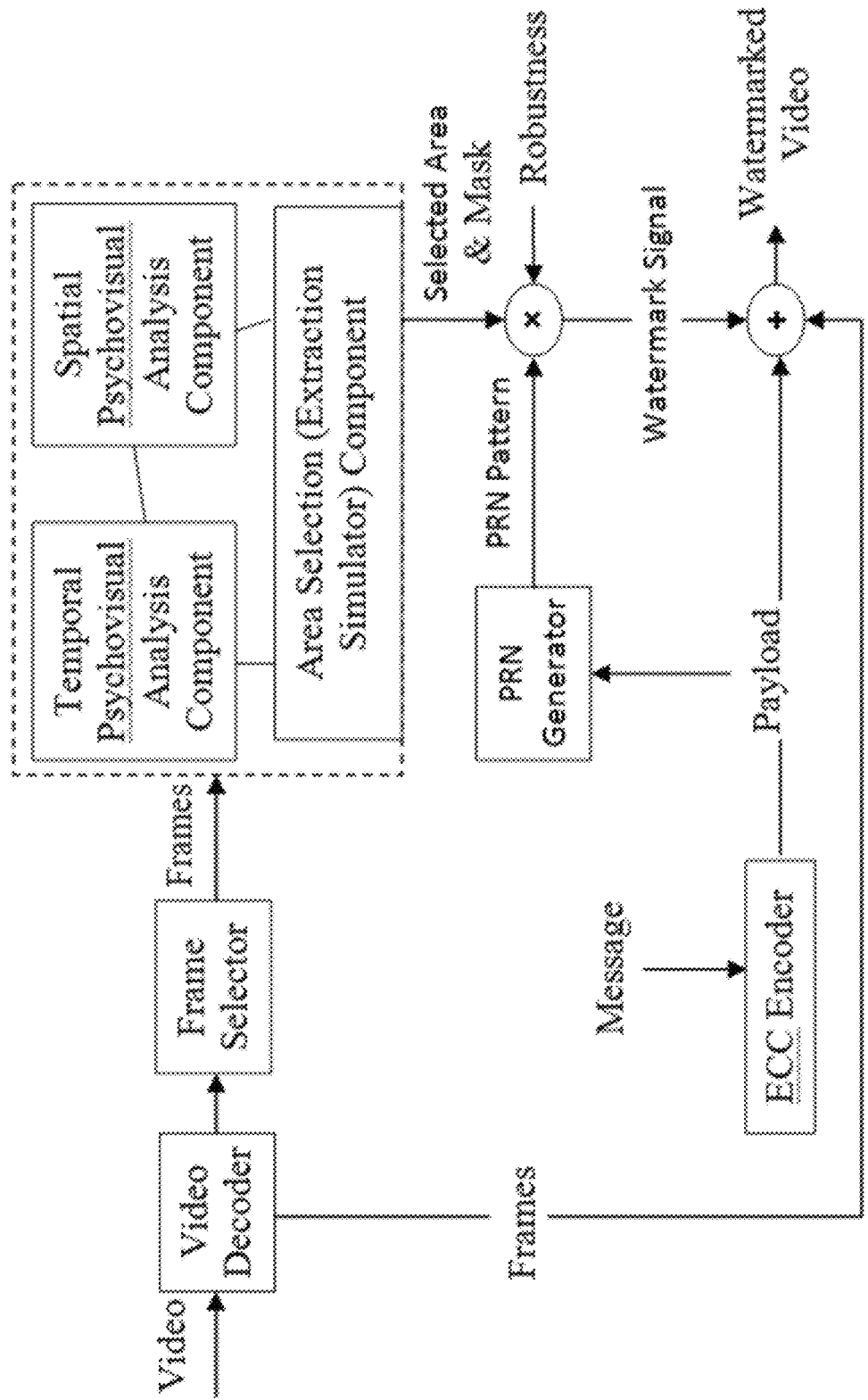
FIG. 8(b) illustrates a preprocessor engine in accordance with another exemplary embodiment.

Another exemplary embodiment is depicted in FIG. 8(b), in which a subset of the pre-processor engine of FIG. 8(a), such as components that perform frame selection, temporal and spatial psycho-visual analysis, area selection, PRN generation, are used to produce a single watermark signal that is produced based a particular payload information (rather than embedding multiple alternative data). In FIG. 8(b), the message may optionally be error-correction-code (ECC) encoded to add parity symbols to help recover the watermark message in the presence of channel errors. The produced watermark payload is input to the PRN generator. The produced watermark signal can be modulated directly onto one or more components of the selected frames to produce the watermarked video. An example is to modulate such watermark signal into the luminance of the selected frames to represent a watermark symbol. This particular embodiment may be used for direct embedding of watermark in, for example, digital cinema, video decoder, media receiver, or video camcorder, or playback devices and applications, without preprocessing.

Customizer:

As noted in connection with FIG. 3(a), the customizer 304 optimizes and customizes the inserter/extractor manifest generated by the pre-processor engine 302 according to a profile (sometimes referred to as "message profile"). An inserter or extractor manifest may consist of a list entries, where each entry corresponds to one watermark symbol (which can contain one or more bits). A message profile can specify the structure (but not necessarily the actual values) of the message that is to be embedded into the video frames, including the message channels, sizes, payload embedding and extraction intervals, and/or the arrangement of inserter/extractor manifests entries for such message definition. A wide range of methods can be applied to customize inserterExtractor manifest files. Non-exclusive examples of the customizer operations include:

Select the best entries in the inserter/extractor manifests based on a set of selection criteria;

Remove the entries in the inserter/extractor manifests that are not needed;

Process (e.g., encrypt) the alternative data in the inserter/extractor manifests according to the profile;

Update the entries in the inserter/extractor manifests accordingly if the video stream is updated.

Invoke the Inserter (e.g., the Inserter 204 in FIG. 2) to generate a 'pre-marked' stream prior to the distribution of such video stream;

Customize the inserter manifest in such a way that a pre-defined built-in message is inserted by an inserter;

Encrypt the entire inserter manifest for delivery.

Figure 9:
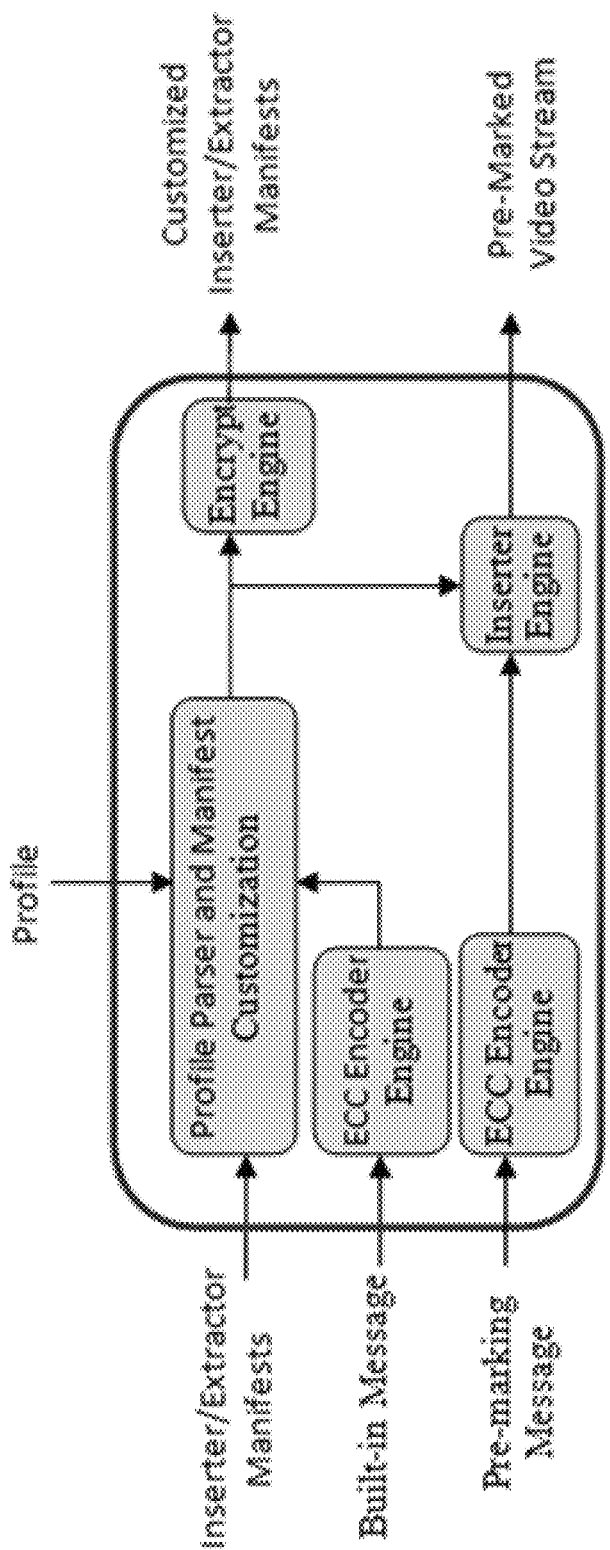
FIG. 9 is a block diagram of a customizer in accordance with an exemplary embodiment.

FIG. 9 is a block diagram of a customizer in accordance with an exemplary embodiment. The sub-components of the customizer will be described in the sections that follow. It should be noted that the exemplary customizer of FIG. 9 shows certain inputs and outputs. However, in different exemplary embodiments, some of those inputs and outputs may not be implemented. For example, the inputs labeled as "built-in" message" and "pre-marking message," as well as the output labeled as "pre-marked video stream" may not be present in some exemplary embodiments.

Profile:

The profile includes a set of instruction or information that is provided to the customizer to facilitate the generation of customized inserter/extractor manifests, and/or the pre-marked video stream. A Profile may include a list of attributes described below.

Channel design: Transactional watermarking in accordance with the disclosed embodiments allows the insertion of different transactional watermarks in separate "channels."

For example, if a video stream can support a watermarking bit rate of 100 bits per second, the watermarks bits may be allocated as 5 separate channels, each allowing 20-bits-per-second watermark insertion rate. The channel design field (or entry) in the profile defines the design of the channels (for example, up to 5 channels), including, for example, a built-in channel that is only available to the preprocessor (i.e., customizer) for insertion of particular watermark message that will be described later.

As such the disclosed embodiments enable more than one watermark messages to be inserted into a single video stream through one or multiple insertion, sessions. This capability is sometimes referred to as "multi-channel watermarking."

Each channel can have a payload interval that defines the duration of the segment of the video stream in which one payload for such channel is embedded. In some exemplary embodiments, each payload interval can be configured as being either dynamic or static.

A dynamic payload interval does not have a fixed duration. Therefore, when a payload with a dynamic payload interval is repeatedly embedded into a video stream, each instance of the payload may be embedded in a different duration of the video stream. A static payload interval has a fixed duration. Therefore, when a payload with a static payload interval is repeatedly embedded into the video stream, each instance of the payload shall be embedded in a fixed duration of the video stream.

In some embodiments, a channel may be designed as a sequential channel or as an overlapping channel.

Figure 10:
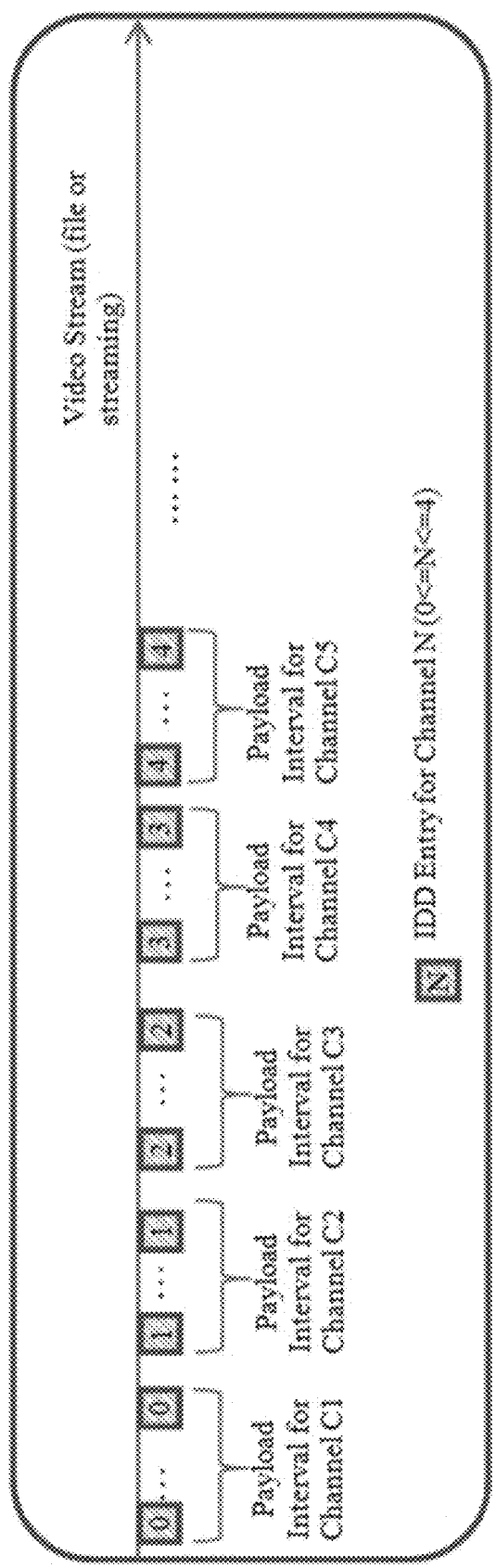
FIG. 10 illustrates a sequential channel design in accordance with an exemplary embodiment.

Sequential channel design: FIG. 10 illustrates a sequential channel design in accordance with an exemplary embodiment. In FIG. 10, N is the total number of channels, each square represents a watermark insertion location, and the number inside of each square represents the channel number associated with that watermarking location. In a sequential design, all channels defined in the profile are serially arranged in the order of the channel definition. For example, if the profile defines channel 1 before the definition of channel 0 in a profile, the inserter manifest entries should be assigned to channel 1 and channel 0 in a serial order.

Figure 11:
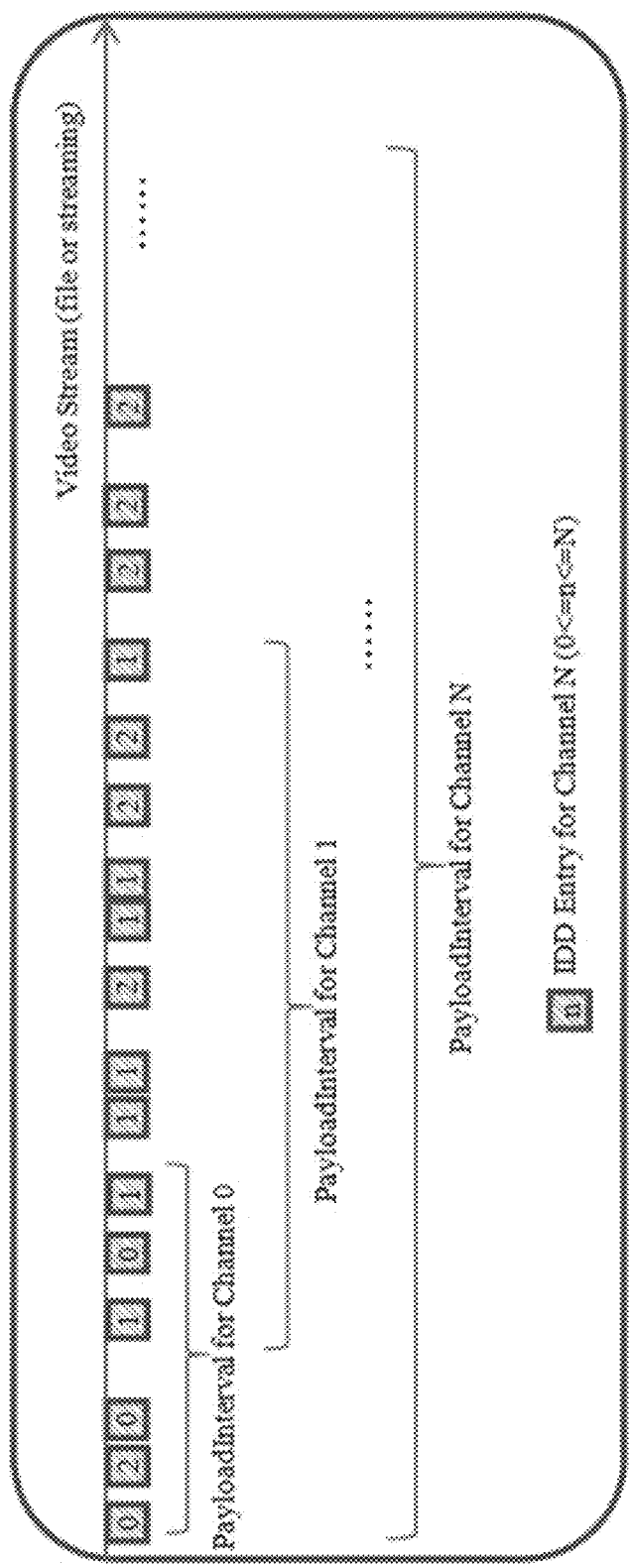
FIG. 11 illustrates an overlapping channel design in accordance with an exemplary embodiment.

Overlapping channel design: FIG. 11 illustrates an overlapping channel design in accordance with an exemplary embodiment. The notation in FIG. 11 is similar to that in FIG. 10. In an overlapping design, watermarking locations for each payload interval may be divided among more than one channel. For example, in FIG. 11, the payload interval for channel 0 includes 6 embedding locations, three of which are designated for use with channel 0, two of them designated for use with channel 1, and one designated for use with channel 2. Similarly, the payload interval for channel 1 includes 11 embedding locations that are shared amongst channels 0, 1 and 2. As depicted in FIG. 11, when a payload interval overlaps with another payload interval, the overlapping segment may consist of inserter manifest entries for both payload Intervals.

Repeat:
Another entry in the profile can be the repeat field. This field defines the repetition structure of the payload in each channel. For example, a repeat entry of zero indicates that the payload must be repeated from the start to the end of the video stream, whereas a non-zero entry (e.g., N>0) can indicate that the payload must be repeated in every N times in the video stream.

Message Size:
This field in the profile defines the number of bits in Message defined in each channel.

Payload Size:
This field in the profile defines the number of bits in the Payload defined in each channel.

Payload Interval:
This field in the profile defines the duration in which a payload in a specific channel is embedded once. For example, if the value of this field is 0, the payload interval is dynamic (e.g., a single payload is embedded in a dynamic duration of the video stream based on the embedding capability of the inserter manifest entries). If the value of this field is N (N>0), a single payload is embedded in a fixed N-seconds of the video stream.

Priority:
This field in the profile defines the priority (or importance) of each channel (e.g. from 1 to 5 if the total number of the channels is 5). The greater the value of this field, the higher the priority (or importance) of the channel when more than one channel competes for the embedding resources and capabilities (e.g., when the channels compete to acquire better inserter manifest entries). If two or more channels have the same value of this field, the Inserter Manifest entries are assigned to the channels without considering the priority. By default, this field is set to 0 (i.e., no priority).

In some exemplary embodiments, the priority is determined by one of more following criteria:

Watermark Robustness: Inserter manifest entries with more robust watermarks are selected for channels with a higher priority; the watermark robustness can be determined based on, for example, correlation values that were described previously.

Inserter Manifest Size: Inserter manifest entries with the smaller sizes are selected for channels with a higher priority.

Watermark Transparency: Inserter manifest entries with more transparent watermarks are selected for channels with a higher priority; the transparency can be determined based on, for example, the mask values that were described previously.

The following Table illustrates the assignment of priority values in accordance with an exemplary embodiment.

| Value | Explanation |
| --- | --- |
| 0 | No priority, all inserter manifest entries are assigned to channels without considering the priority. |
| R1 ... Rn | Priorty according to the robustness of each watermark; R1 represents the lowest priority (e.g., the inserter manifest entries with weakest robustness) and Rn for the strongest robustness where n is the total number of channels. |
| S1 ... Sn | Priorty according to the size of inserter manifest entry; S1 represents the lowest priority (e.g. the inserter manifest entries with the largest sizes) and Sn for the smallest sizes where n is the total number of channels. |

Pre-Watermarking:
Referring back to FIG. 9, the customizer may have a pre-marking message input. Such an input may optionally be ECC-encoded by the ECC encoder engine, and inserted into the input video stream. The customizer can perform the insertion by, for example, invoking the inserter (or inserter functionality). In embodiments where pre-marking (or pre-watermarking) is implemented, the customizer output includes not only the inserter/extractor manifest files but also a pre-marked video stream.

Built-In Message:
Referring again to FIG. 9, the customizer may have a built-in message input. A built-in message is a watermark message that is configured by customizer and blindly inserted by an inserter. For example, the customizer may remove some of the alternative data in the channel that is dedicated to such built-in message based on the value of such message. For example, if the first bit of the built-in message is '0', the alternative data that carries the bit '1' is removed from the first entry of the inserter manifest. In one exemplary embodiment, the customized inserter manifest at the output of the customizer includes only one "alternative data" in the manifest entry dedicated for such a built-in message.

An example application of the built-in message includes a scenario in which the inserter only needs to insert a unique identifier for each pre-processor, as provided by the built-in message. Such identifier can be stored in a pre-processor prior to its shipment. Thus, all video streams that are preprocessed by such preprocessor will contain such preprocessor identifier after applying inserter functionality. When such pre-processor identifiers are associated with a content distributor, such identifiers (e.g., "Distributor IDs") can also be used to identify the content distributor.

Over-Watermarking:

An inserter manifest can be customized to allow an inserter to insert a new watermark message that completely replaces the existing watermark message in the video stream.

Figure 12:
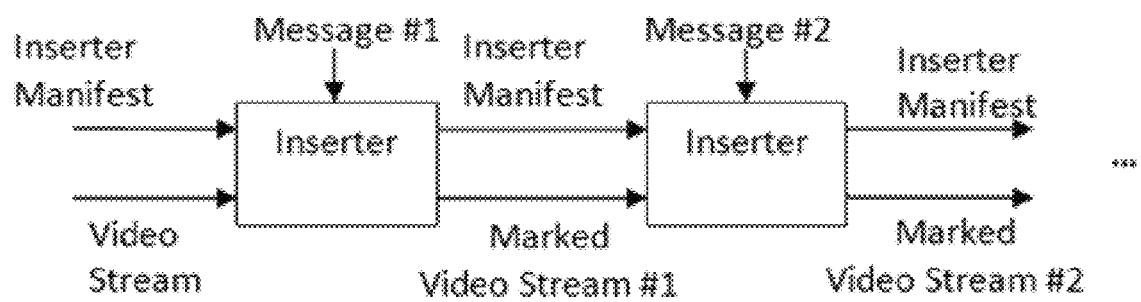
FIG. 12 illustrates the components that perform over-watermarking of a video stream in accordance with an exemplary embodiment.

FIG. 12 illustrates the components that perform over-watermarking of a video stream in accordance with an exemplary embodiment. As shown in FIG. 12, the watermark in video stream may be marked by message #1 to produce a marked video stream #1, which is subsequently overwritten by message #2 to produce the marked video stream #2.

Over-watermarking in accordance with the exemplary embodiments of the present application may be carried out in one of two different manners: in overwriting mode and in swapping mode. In the swapping mode, the inserter updates the inserter manifest for each insertion, whereas in the overwriting mode the same inserter manifest may be used for all over-watermarking.

Overwriting Mode:

In the overwriting mode, the number of alternative data in the inserter manifest entries is equal to all possible alternative data entries. In one exemplary embodiment, the inserter manifest includes $2^n$ alternative data entries, where n is the number of bits that can be inserted in an entry. The inserter performs the insertion without considering the presence of the existing watermark. For example, if the new watermark is a "1" watermark, the alternative data in the inserter manifest entry associated with the "1" watermark is selected and is used to replace the video segment associated with the existing watermark in the video stream regardless of the value of the existing watermark.

Swapping Mode:

In the swapping mode, the inserter manifest does not include all of possible alternative data entries. In one exemplary embodiment, the number of alternative data in inserter manifest entries is $2^n-1$, where n is the number of bits that can be inserted in an entry. The reason for the missing entry (compared to the overwriting mode) is that the missing entry is presumed to have been inserted in the video stream. In the swapping mode, if the pre-existing watermark value (e.g., a bit) is different from the value of the new watermark to be inserted, the alternative data is swapped with the data that is in the video stream (i.e., the original data). However, if the pre-existing watermark value is the same as the alternative data, no replacement or swapping takes place.

The swapping mode reduces the inserter manifest size by remembering the presence and the value represented by the "original data" in the inserter manifest. However, the inserter manifest needs to be updated by the inserter for each over-watermarking session.

Watermark Encrypted Content:

To support direct insertion on encrypted video stream, the inserter manifest produced by pre-processor is customized in accordance with an exemplary embodiment to meet the following criteria: 1) all alternative data in the inserter manifest is encrypted by the same algorithm and the same key used for encryption of the video stream; and 2) all alternative data must is an integer byte number of the encryption block size. For example, the size of an alternative data must be in the multiple of 16 bytes if an AES encryption block size is 16 bytes.

Figure 13:
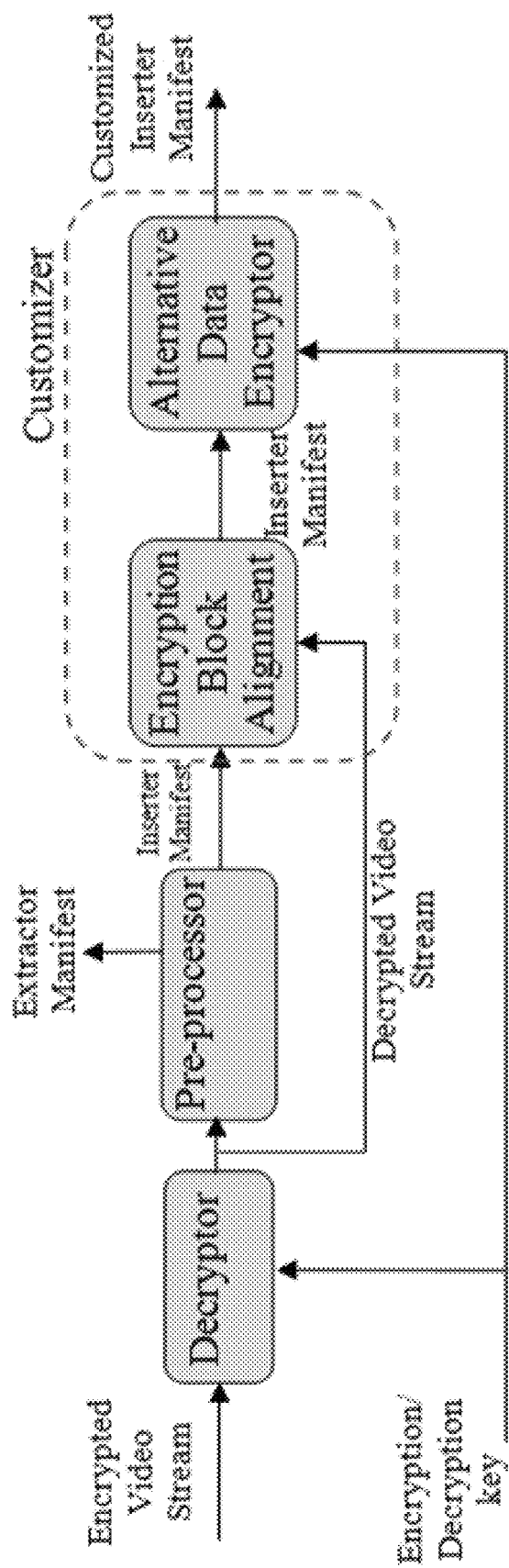
FIG. 13 illustrates the components that perform customization of the inserter manifest to enable watermarking of an encrypted content in accordance with an exemplary embodiment.

FIG. 13 illustrates the components that perform customization of the inserter manifest to enable watermarking of an encrypted content in accordance with an exemplary embodiment. The encrypted video stream is first decrypted using a decryption key before being input to the pre-processor. The inserter manifest produced by the pre-processor is provided to the customizer, which produces a customized inserter manifest. The exemplary configuration of FIG. 13 allows customization of the inserter manifest in conformance with the above two criteria. In particular, the encryption block alignment component increases the size of the alternative data if its size is not a multiple of encryption block size and the alternative data encryptor uses the same encryption algorithm and key used for video stream encryption to encrypt the aligned alternative data in the entire inserter manifest.

Figure 14:
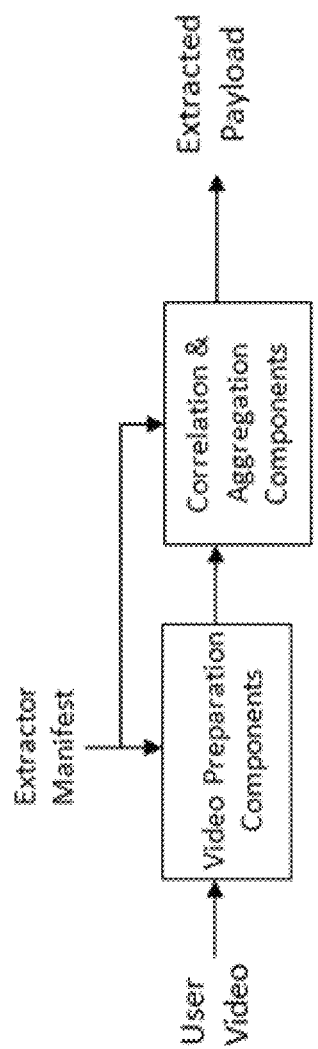
FIG. 14 illustrates the components of a watermark extractor in accordance with an exemplary embodiment.

Watermark Extraction:

FIG. 14 illustrates the components of a watermark extractor in accordance with an exemplary embodiment. The components that are depicted in FIG. 14 may be implemented as part of the extractor 206 of FIG. 2. It should be noted that throughout this document the term user is used to denote a user of the systems and devices that are described in the present application. Such users can include content owners, content distributors, and like, and may or may not include consumers of video content, such as members of general public that purchase, rent or otherwise use the video.

Video Preparation:

As illustrated in FIG. 14, video preparation components operate on the user video using the extractor. Video preparation can include temporal and/or spatial registration, temporal and spatial tittering, and/or other operations that may be needed to prepare the video stream for watermark extraction. The information in the extractor manifest file, such as the reference frame images, fingerprints, geometric descriptions of the watermarked area within the watermarked frames may help video preparation. The temporal and spatial registration may be performed manually or automatically. That is, the images of received video may have been rotated or shifted in space, or may have undergone other geometric deformations that may need to be corrected. Further, the video sequence may have been shifted in time and may need to be temporally aligned prior to watermark extraction.

According to an exemplary embodiment, at least two kinds of fingerprints that are registered by the pre-processor and stored in the extractor manifest file can help the automated video temporal and spatial registration: 1) temporal fingerprints based on the relationships and characteristics between and among frames for identifying the watermarked frames, and 2) spatial fingerprints based on salient and feature points for identifying the watermarked areas within the watermarked frames.

Correlation:

Referring to FIG. 14, correlation and aggregation component(s) video preparation components operate on the video prepared by the video preparation components to enable extraction of the embedded watermarks. In one exemplary embodiment, reference PRN Patterns (i.e., the PRN patterns used for embedding of watermarks that are fixed, stored at the extractor, or communicated to the extractor through the extractor manifest or through other techniques) are correlated with the watermarked areas within the selected frames of the user video where a watermark signal was originally inserted to extract a watermark symbol. The expected locations of the inserted watermarks can be signaled through the extractor manifest. Alternatively, a blind extraction attempt may be conducted which eliminates the need for knowing the expected locations of the inserted watermarks at the expense of increased processing.

In one example embodiment, to extract an N-bit symbol, $2^N$ PRN patterns are retrieved, or generated, as described earlier. Each of these $2^N$ PRN patterns is correlated with the watermarked area of the user video to produce N correlation values. The symbol value corresponding to the highest correlation value is the extracted symbol value (or the most likely extracted symbol value).

Figure 15:
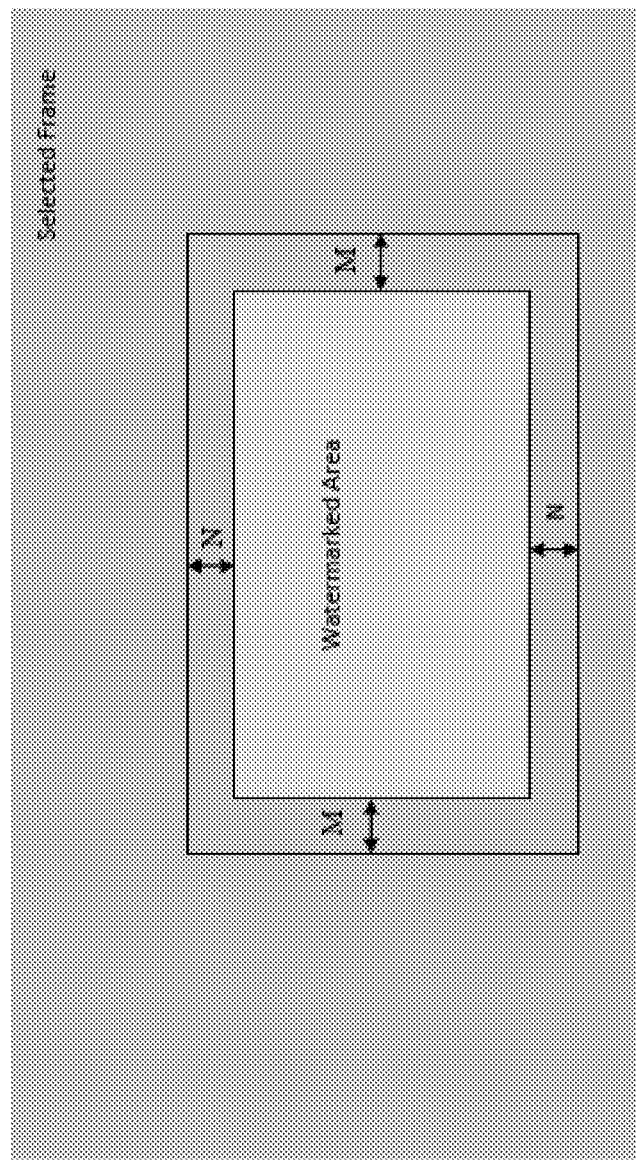
FIG. 15 illustrates an example watermarked area and selected frame that can facilitate the understanding of correlation operations of the present application.

Local optimization may be performed by conducting a local search of the watermarked areas in the user video with a search window. The correlation operation is performed repeatedly by moving the watermarked area within the windows. FIG. 15 illustrates an example watermarked area and selected frame that can facilitate the understanding of correlation operations of the present application. FIG. 15 depicts a rectangular PRN pattern and a search window that is defined by M and N pixels. In this configuration, 2M*2N correlations are performed if the search step is one pixel. When the search window is extended to the entire or majority part of the video frame, watermark detection can be performed without any additional information (other than the user video). In this case, the extractor manifest is not required for watermark extraction.

Aggregation Over Watermarked Frames: The correlation operations described above extract a symbol value from a single selected frame. When two or more consecutive frames are selected to embed the same symbol, the correlation values from each of such consecutive frames are statistically aggregated. In one exemplary embodiment, the symbol value corresponding to the highest aggregated correlation value determines the extracted symbol value. In the example system of FIG. 14, aggregation can be carried out by a subcomponent within the correlation and aggregation component.

One, or a combination, of the following aggregation methods can be used for watermark aggregation: (1) first aggregate watermark signals over consecutive watermarked frames, and then perform correlation, or (2) first perform correlation on each watermarked frame, and then aggregate the correlation values over consecutive watermarked frames.

Message Decoder:

Message decoder decodes the extracted payload into a watermark message. The following example illustrates how message decoding can be done in one exemplary embodiment where the inserted watermark payload is error-correction-code encoded. Once an instance of the payload is detected, an error correction decoder is invoked to decode the payload instance. If the error correction decoder fails to decode the payload instance, this instance is statistically combined with the previous consecutive payload instances, which cannot be decoded individually or combined, to produce a combined payload instance. The error correction decoder is called again to decode the combined payload instance. The above steps can be repeated until a watermark message is successfully decoded, or to a point where the end of the content from which the extraction is attempted is reached.

Figure 16:
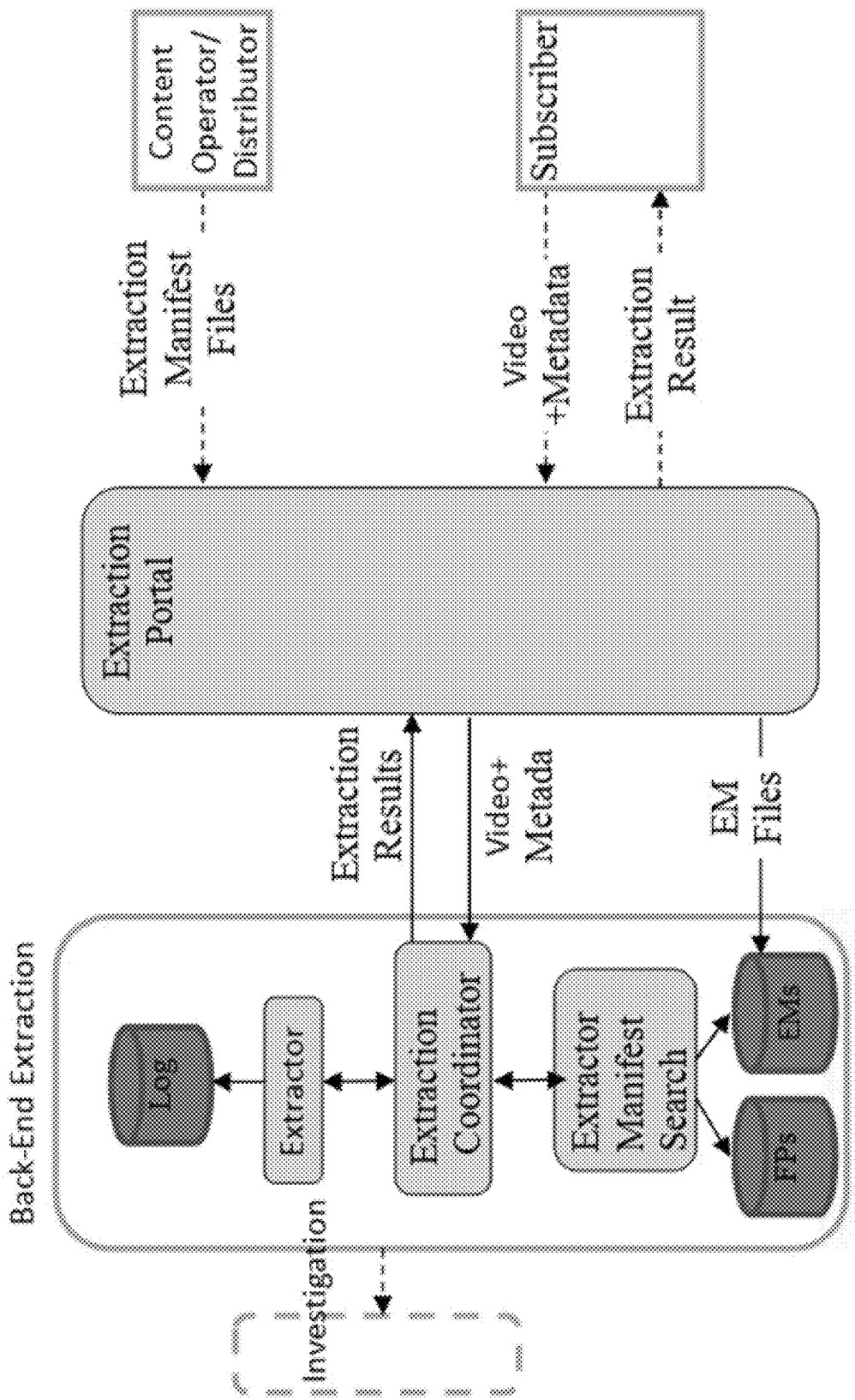
FIG. 16 illustrates a system that can be used to allow extraction and assessment of watermarks from a video content in accordance with an exemplary embodiment.

Extraction Portal:

FIG. 16 illustrates a system that can be used to allow extraction and assessment of watermarks from a video content in accordance with an exemplary embodiment. To enable automated extraction of watermarks from submitted videos (e.g., when such videos are discovered and suspected as being a pirated movie) the extractor must be capable of handling automated temporal and spatial (image) registration, especially when pirated videos that are often geometrically distorted are being examined. In some embodiments, scene change detection and image fingerprint can be used to achieve temporal and spatial (image) registration.

In the exemplary system of FIG. 16, the content owners/distributors can submit the generated extraction manifest to the portal as part of an extractor manifest registration process. The extraction manifests are sent to the back-end extraction components and saved in one or more databases. When a subscriber conies across a suspect video, the video can be submitted to the extraction portal, optionally with an associated metadata, such as the title of the video, the language of the video, the duration of the video or any other information that can facilitate identification of the content and extraction of watermarks. The video and associated metadata is sent to the back-end extraction components to extract the embedded watermarks, and to identify the transaction node(s), users, playback device, and/or the chain of content distribution.

Extractor Manifest Registration:

In the exemplary system of FIG. 16, the extractor manifest files produced by the preprocessor are uploaded to the extraction portal for subsequent utilization in the extraction services. The extractor manifest file can include a metadata section that includes: Title name, operator/distributor, identification information of the audio and/or video for the content from which the extractor manifest was produced (e.g., watermark-based content identifier or digital fingerprints) and/or other information than can assist with extraction of watermarks. The uploaded extractor manifest files are stored in the extractor manifest database. It should be noted that EM in FIG. 16 represent a database that holds the extraction manifests, and FP in FIG. 16 represents a database that holds the fingerprints.

Extractor Manifest Search:

According to an exemplary embodiment, once the extractor manifest search module receives an extraction request, it first identifies the corresponding extractor manifests that have been registered with the portal. The search can be conducted using any one, or combinations of, the following methodologies.

Metadata Search:

This method identities the extraction manifests by matching the metadata optionally provided in the request against the metadata in the extractor manifest files that reside at the extractor manifest database.

Fingerprints Match:

This method uses fingerprints to identify the extractor manifest. For example, video fingerprints of movie titles are registered in the fingerprint (FP) database(s). The extractor manifest search module extracts the fingerprints from the submitted video, matches them against the stored fingerprints at the FP database, and provides all extractor manifest files that belong to the matched title to the extraction coordinator.

Watermarking-Based Content Identifier (CID):

In this search method, a CID detected from the watermarks embedded in the audio and/or video tracks of the submitted video can be used to identify the registered extractor manifests by matching such CIDs with the CIDs of the registered video that reside at the database.

Figure 17:
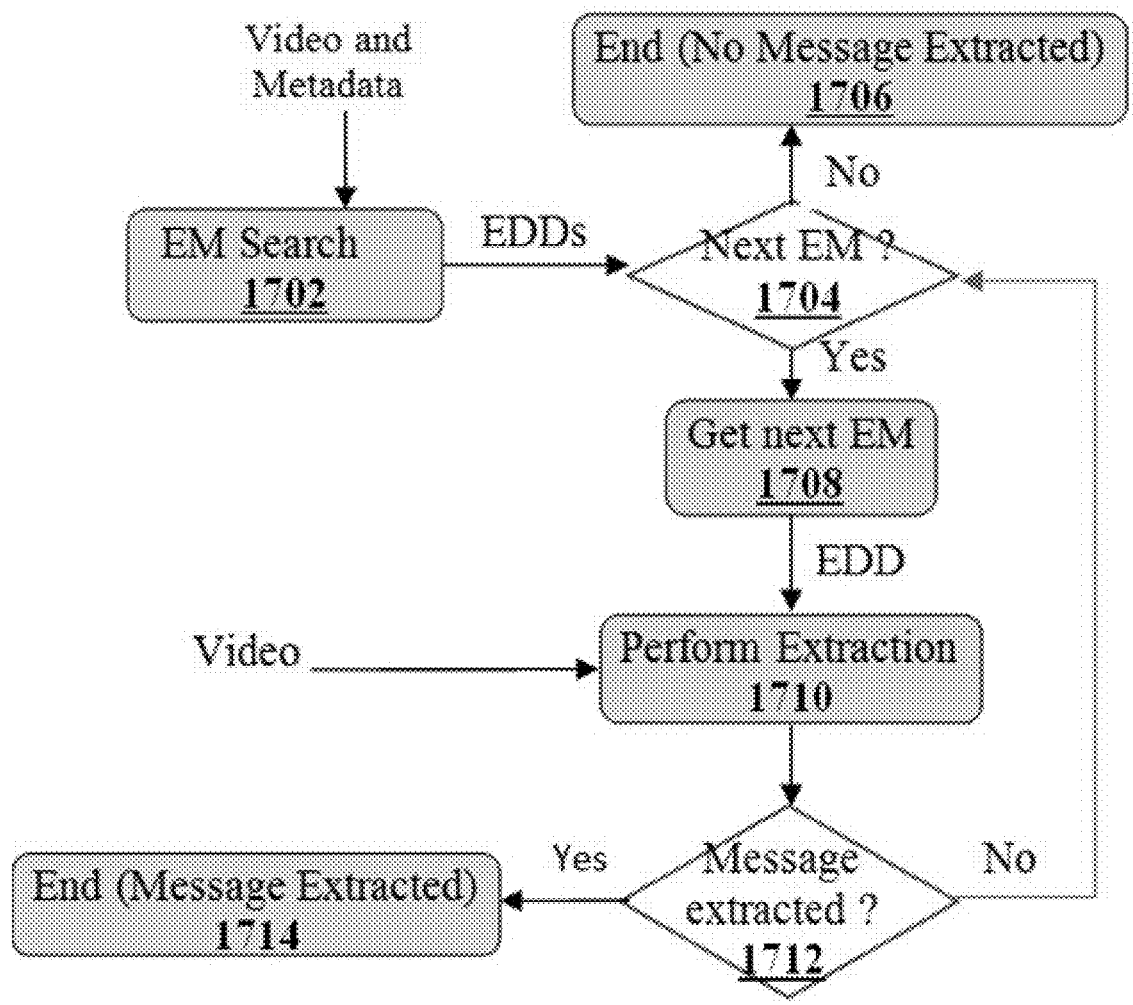
FIG. 17 illustrates a set of exemplary operations that may be carried out by the extraction coordinator in accordance with an exemplary embodiment.

Extraction Coordinator:

Referring again to FIG. 16, the extraction coordinator coordinates the automated extraction process in response to the extraction request submitted by a subscriber. FIG. 17 illustrates a set of exemplary operations that may be carried out by the extraction coordinator in accordance with an exemplary embodiment. At 1702, the coordinator calls the extractor manifest search module (or component) to identify all extractor manifest (EM) files in the Extractor Manifest database that match the submitted video. At 1704 it is determined if an extractor manifest is found. Upon a determination that no EMs are found, at 1706 the coordinator provides feedback to the requestor that no message could be extracted, or the content is sent to be subject to further investigation. If one or more EMs are found, at 1708 the extraction coordinator calls the watermark extractor at 1710 repeatedly to attempt the extraction of watermark message from the video using the each of the identified extractor manifest files. At 1712, a determination is made as to whether or not a watermark message is extracted. If a watermark message is extracted, at 1714 the requestor can be informed as such, and optionally provided with information regarding transactional history and distribution channels of the content. If no message is extracted after all extraction iterations, the coordinator provides feedback to the requestor that no message could be extracted, or the content is sent to be subject to further investigation.

Extraction Investigation:

Extraction investigation is a forensic investigation phase typically involving a manual process and/or an in-depth scrutiny of content to evaluate whether or not watermarks are present (even if their value cannot be ascertained) and to provide any other insight as to the origins or history of the content. In one exemplary embodiment, the extraction investigation process includes 1) verifying the extractor manifest files selected by the extractor manifest search module and/or 2) verifying the extraction results by investigating the detailed log files produced by the extractor. Such detailed log files may only be produced by Extractor under an "investigative" execution mode.

Figure 18:
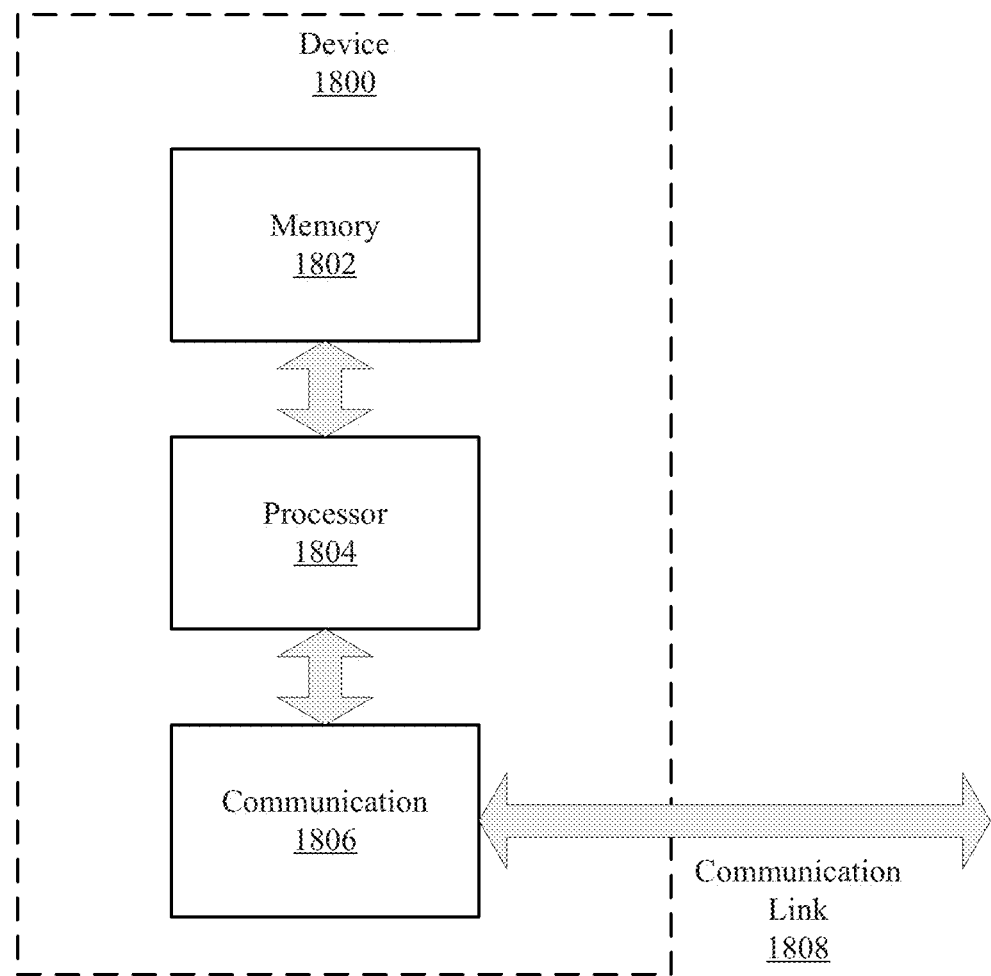
FIG. 18 illustrates a block diagram of a device within which various disclosed embodiments may be implemented.

Certain aspects of the disclosed embodiments can be implemented as a device that includes a processor, and a memory comprising processor executable code. The processor executable code, when executed by the processor, configures the device to perform any one of and/or all operations that are described in the present application. For example, FIG. 18 illustrates a block diagram of a device 1800 within which various disclosed embodiments may be implemented. The device 1800 comprises at least one processor 1804 and/or controller, at least one memory 1802 unit that is in communication with the processor 804, and at least one communication unit 1806 that enables the exchange of data and information, directly or indirectly, through the communication link 1808 with other entities, devices, databases and networks. The communication unit 1806 may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The exemplary device 1800 of FIG. 18 may be integrated as part of the transactional watermarking system of the present application, including as part of the pre-processor, the inserter, and/or the extractor.

Figure 19:
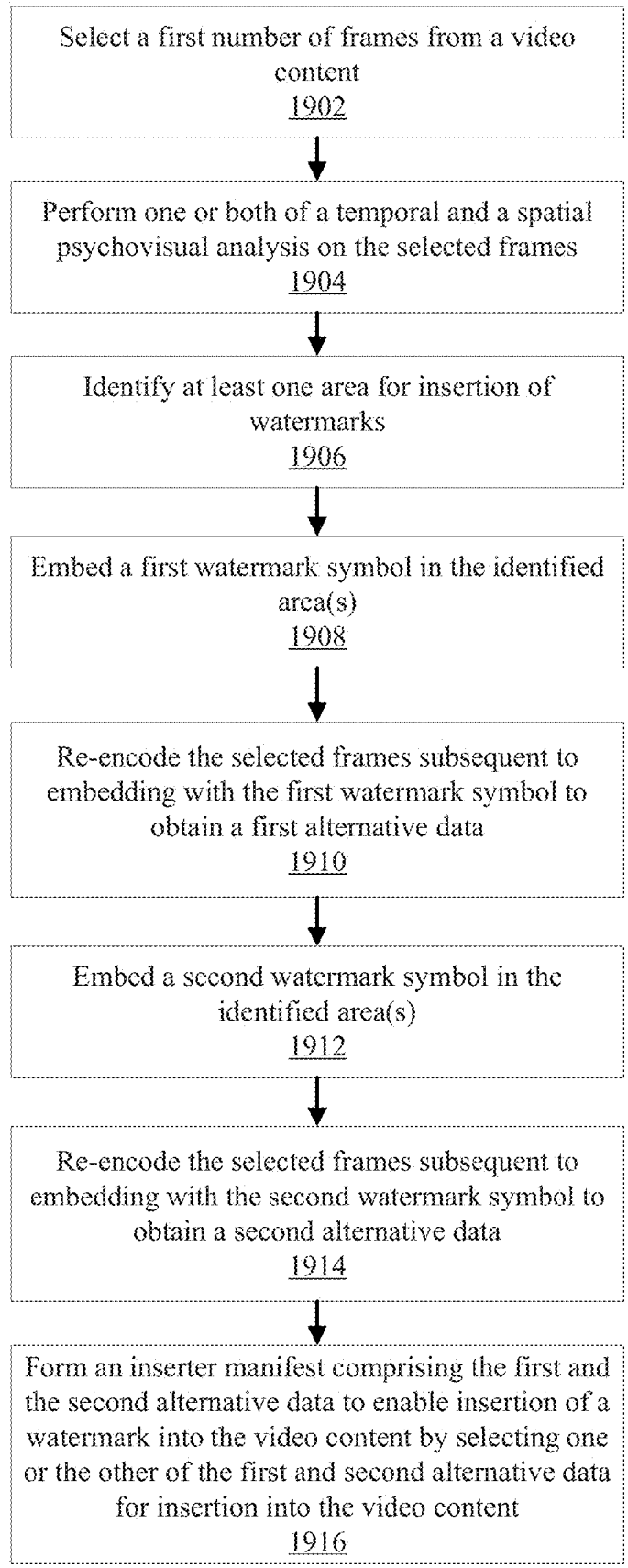
FIG. 19 illustrate a set of operations that can be carried out for facilitating embedding of watermarks into a video content in accordance with an exemplary embodiment.
Figure 20:
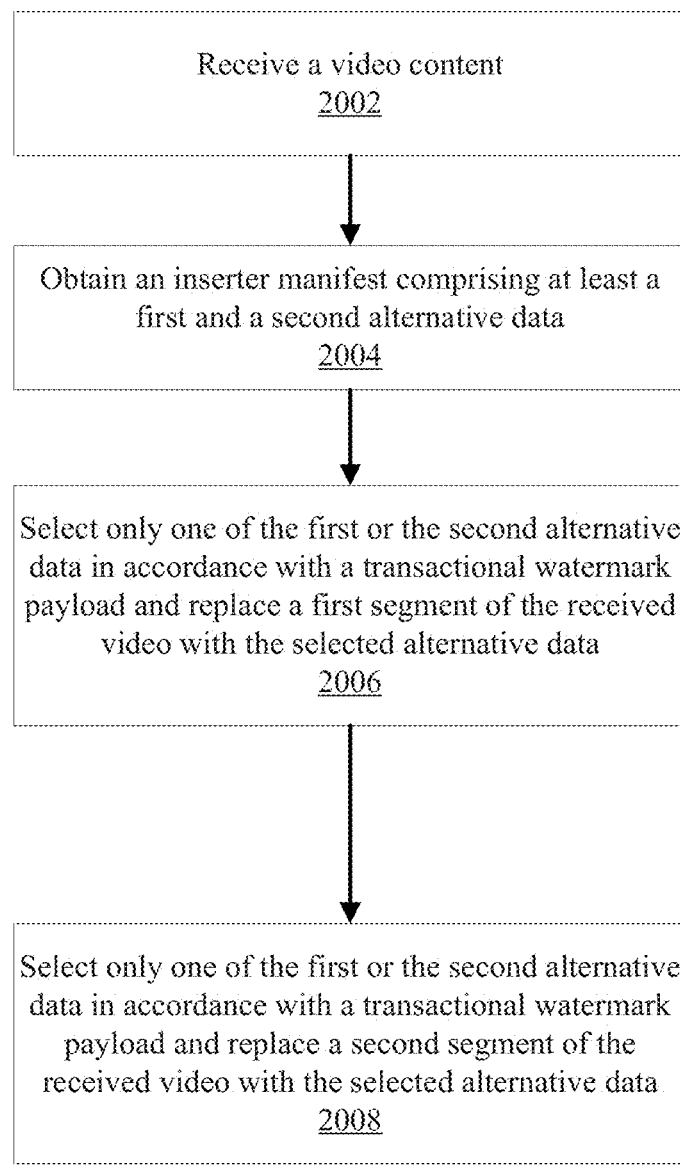
FIG. 20 illustrate a set of operations that can be carried out for inserting a watermark into a video content in accordance with an exemplary embodiment.

FIG. 19 illustrate a set of operations that can be carried out for facilitating embedding of watermarks into a video content in accordance with an exemplary embodiment. At 1902, a first number of frames from the video content is selected. At 1904, one or both of a temporal and a spatial psychovisual analysis on the selected frames is performed. At 1906, for each frame of the selected frames, at least one area for insertion of watermarks is identified. At 1908, a first watermark symbol is embedded in the identified area(s) of the selected frames. At 1910, the selected frames subsequent to embedding with the first watermark symbol are re-encoded to obtain a first alternative data. At 1912, a second watermark symbol is embedded in the identified area(s) of the selected frame. At 1914, the selected frames subsequent to embedding with the second watermark symbol are re-encoded to obtain a second alternative data. At 1916, an inserter manifest is formed that comprises the first and the second alternative data to enable insertion of a watermark into the video content by selecting one or the other of the first and second alternative data for insertion into the video content FIG. 20 illustrate a set of operations that can be carried out for inserting a watermark into a video content in accordance with an exemplary embodiment. At 2002, a video content is received. At 2004, inserter manifest is obtained that comprises at least a first and a second alternative data. At 2006, only one of the first or the second alternative data is selected in accordance with a transactional watermark payload and replacing a first segment of the received video with the selected alternative data. At 2008, only one of the first or the second alternative data is selected in accordance with a transactional watermark payload and replacing a second segment of the received video with the selected alternative data.

Figure 21:
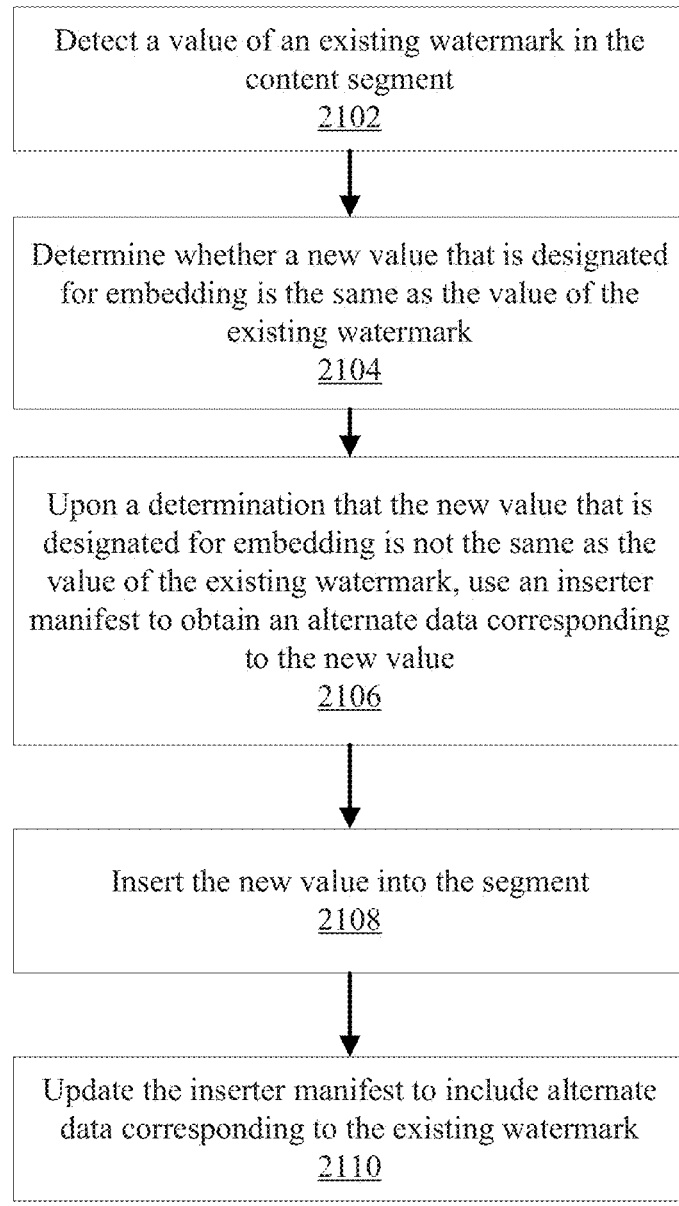
FIG. 21 illustrate a set of operations that can be carried out for over-watermarking a segment of a video that has an existing watermark embedded therein in accordance with an exemplary embodiment.

FIG. 21 illustrate a set of operations that can be carried out for over-watermarking a segment of a video that has an existing watermark embedded therein in accordance with an exemplary embodiment. At 2102, a value of an existing watermark in a content segment is detected. At 2104, it is determined whether a new value that is designated for embedding is the same as the value of the existing watermark. At 2106, upon a determination that the new value is designated for embedding is not the same as the value of the existing watermark, an inserter manifest is used to obtain an alternate data corresponding to the new value. At 2108, the new value is inserted into the segment. At 2110, the inserter manifest is updated to include alternate data corresponding to the existing watermark.

Figure 22:
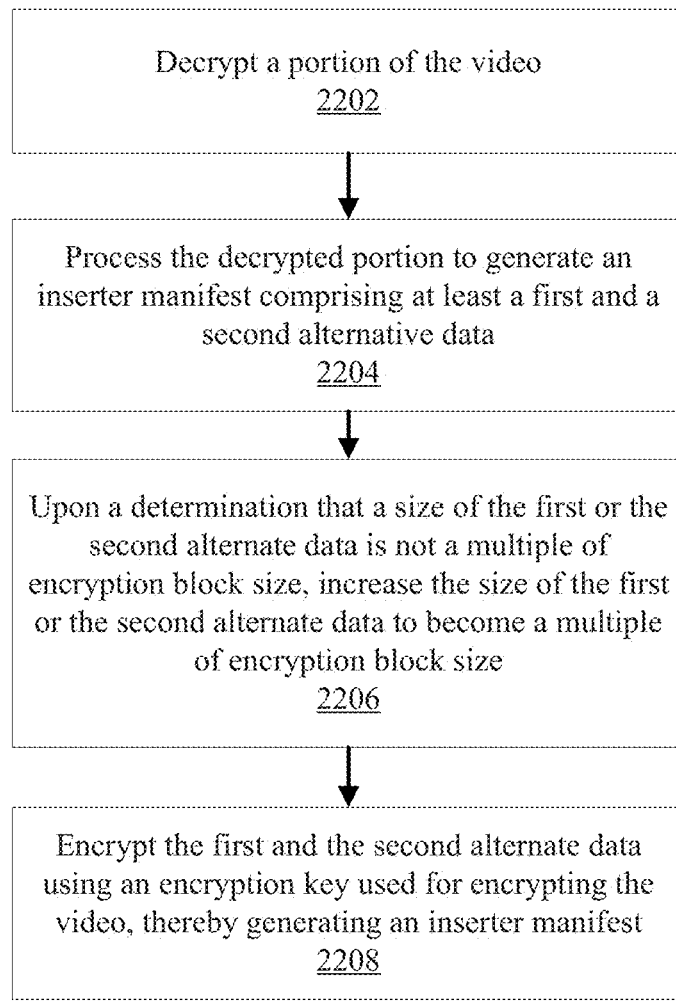
FIG. 22 illustrate a set of operations that can be carried out for facilitating insertion of a watermark into an encrypted video in accordance with an exemplary embodiment.

FIG. 22 illustrate a set of operations that can be carried out for facilitating insertion of a watermark into an encrypted video in accordance with an exemplary embodiment. At 2202, a portion of a video content is decrypted. At 2204, the decrypted portion is processed to generate an inserter manifest comprising at least a first and a second alternative data. At 2206, upon a determination that a size of the first or the second alternate data is not a multiple of encryption block size, the size of the first or the second alternate data is increased to become a multiple of encryption block size. At 2208, the first and the second alternate data is encrypted using an encryption key used for encrypting the video, thereby generating an inserter manifest.

Figure 23:
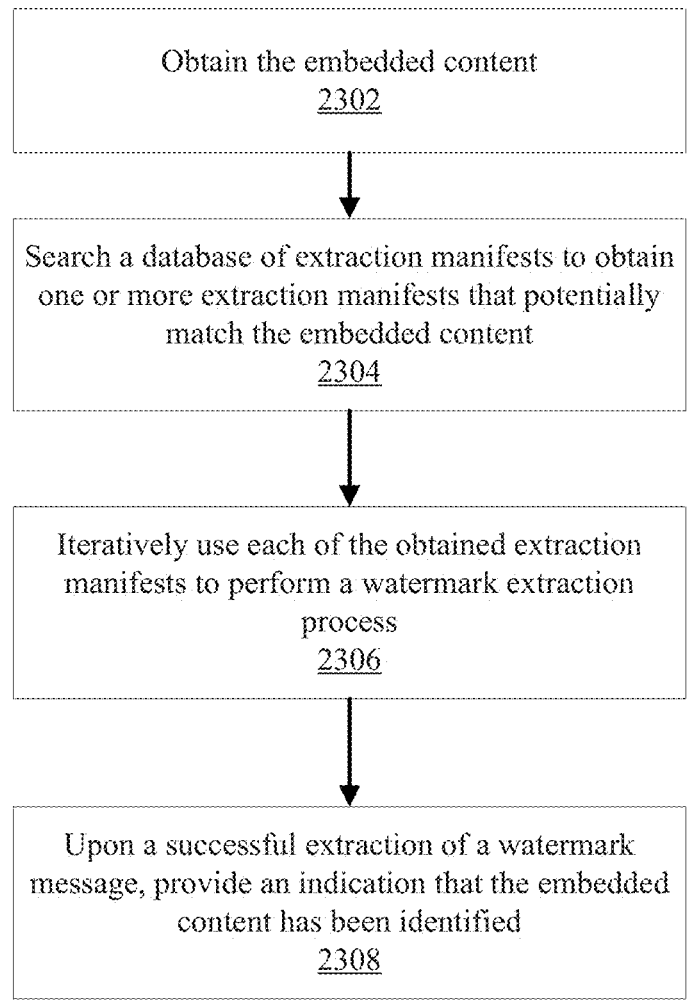
FIG. 23 illustrate a set of operations that can be carried out for identification of a watermark within an embedded content in accordance with an exemplary embodiment.

FIG. 23 illustrate a set of operations that can be carried out for identification of a watermark within an embedded content in accordance with an exemplary embodiment. At 2302, an embedded content is obtained. At 2304, a database of extraction manifests is searched to obtain one or more extraction manifests that potentially match the embedded content. At 2306, each of the obtained extraction manifests is iteratively used to perform a watermark extraction process. At 2308, upon a successful extraction of a watermark message, an indication that the embedded content has been identified is provided.

As shown in various figures of the present application, such as FIGS. 2, 3(a), 3(b), 9 and others, the components or modules that are described in connection with the disclosed embodiments can be implemented as hardware, software, or combinations thereof. For example, a hardware implementation can include discrete analog and/or digital components that are, for example, integrate(as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (psT) that is a specialized microprocessor with an architecture optimized for the operational needs of digital signal processing associated with the disclosed functionalities of this application.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

For example, one aspect of the disclosed embodiments relates to a computer program product that is embodied on a non-transitory computer readable medium. The computer program product includes program code for carrying out any one or and/or all of the operations of the disclosed embodiments.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method for selecting an area within a video content for insertion of watermarks, the method comprising:
    (a) selecting a candidate area within a frame of the video content that is smaller in size that the frame itself;
    (b) adding a first watermark value to the selected candidate area to obtain a first version of the area;
    (c) adding one or more noise components to the first version of the area to obtain a noisy first version of the area;
    (d) conducting a watermark extraction operation on the noisy first version of the area to obtain a first correlation value;
    (e) adding a second watermark signal to the selected candidate area to obtain a second version of the area;
    (f) adding one or more noise components to the second version of the area to obtain a noisy second version of the area;
    (g) conducting a watermark extraction operation on the noisy second version of the area to obtain a second correlation value;
    (h) selecting one or more pseudo-random offset values to select a different candidate area within the frame for adding the first watermark value or for adding the second watermark value;
    (i) repeating operations (a) through (g) until all pixels of the frame have been selected as part of one or more of the selected candidate areas, wherein in each iteration of operations (a) through (g) the values obtained for the first correlation value and the second correlated value are stored; and
    (j) designating one or more of the selected areas that produced the largest first correlation value or the largest second correlation value for the insertion of watermarks.

2. The method of claim 1, further comprising conducting a spatial psychovisual analysis on one or more frame frames that include the designated selected area(s), the spatial psychovisual analysis comprising:
    applying a non-linear inverse gamma curve to luminance components of the one or more video frames corresponding to the human visual system response in dark areas;
    performing a Laplacian or a Gaussian pyramid operation multiple times at multiple resolutions on the one or more video frames subsequent to the applying of the non-linear inverse gamma curve to detect highly textured areas; and
    performing an edge detection operation to detect edge features within the one or more frames.

3. The method of claim 1, further comprising:
    embedding the first watermark value in the designated area of the frame to produce a first embedded version of the frame;
    embedding the first watermark value in the designated area of the frame to produce a first embedded version of the frame;
    re-encoding the first and the second versions of the frame to obtain a first and a second encoded version of the frame, respectively;
    decoding the first and second versions of the encoded frames;
    comparing one or more measures of quality associated with the decoded first and second versions with corresponding one or more reference measures of quality; and
    based on the comparing, making a determination to accept or reject the frame as a frame that is suitable for watermark insertion.

4. A computer program product stored on a one or more non-transitory computer readable media, comprising:
    program code for (a) selecting a candidate area within a frame of the video content that is smaller in size that the frame itself;
    program code for (b) adding a first watermark value to selected candidate area to obtain a first version of the area;
    program code for (c) adding one or more noise components to the first version of the area to obtain a noisy first version of the area;

program code for (d) conducting a watermark extraction operation on the noisy first version of the area to obtain a first correlation value;

program code for (e) adding a second watermark signal to the selected candidate area to obtain a second version of the area;

program code for (f) adding one or more noise components to the second version of the area to obtain a noisy second version of the area;

program code for (g) conducting a watermark extraction operation on the noisy second version of the area to obtain a second correlation value;

program code for (h) selecting one or more pseudo-random offset values to select a different candidate area within the frame for adding the first watermark value or for adding the second watermark value;

program code for (i) repeating operations (a) through (g) until all pixels of the frame have been selected as part of one or more of the selected candidate areas, wherein in each iteration of operations (a) through (g) the values obtained for the first correlation value and the second correlated value are stored; and program code for (j) designating one or more of the selected areas that produced the largest first correlation value or the largest second correlation value for the insertion of watermarks.

5. The computer program product of claim 4, further comprising program code for conducting a spatial psychovisual analysis on one or more frame frames that include the designated selected area(s), the spatial psychovisual analysis comprising:

applying a non-linear inverse gamma curve to luminance components of the one or more video frames corresponding to the human visual system response in dark areas;

performing a Laplacian or a Gaussian pyramid operation multiple times at multiple resolutions on the one or more video frames subsequent to the applying of the non-linear inverse gamma curve to detect highly textured areas; and performing an edge detection operation to detect edge features within the one or more frames.

6. The computer program product of claim 4, further comprising:

program code for embedding the first watermark value in the designated area of the frame to produce a first embedded version of the frame;

program code for embedding the first watermark value in the designated area of the frame to produce a first embedded version of the frame;

program code for re-encoding the first and the second versions of the frame to obtain a first and a second encoded version of the frame, respectively;

program code for decoding the first and second versions of the encoded frames;

program code for comparing one or more measures of quality associated with the decoded first and second versions with corresponding one or more reference measures of quality; and program code for based on the comparing, making a determination to accept or reject the frame as a frame that is suitable for watermark insertion.

7. A device, comprising:
a processor; and
a memory comprising processor executable code, the processor executable code when executed by the processor configures the device to:

(a) select a candidate area within a frame of the video content that is smaller in size that the frame itself;

(b) add a first watermark value to the selected candidate area to obtain a first version of the area;

(c) add one or more noise components to the first version of the area to obtain a noisy first version of the area;

(d) conduct a watermark extraction operation on the noisy first version of the area to obtain a first correlation value;

(e) add a second watermark signal to the selected candidate area to obtain a second version of the area;

(f) add one or more noise components to the second version of the area to obtain a noisy second version of the area;

(g) conduct a watermark extraction operation on the noisy second version of the area to obtain a second correlation value;

(h) select one or more pseudo-random offset values to select a different candidate area within the frame for adding the first watermark value or for adding the second watermark value;

(i) repeat operations (a) through (g) until all pixels of the frame have been selected as part of one or more of the selected candidate areas, wherein in each iteration of operations (a) through (g) the values obtained for the first correlation value and the second correlated value are stored; and (j) designate one or more of the selected areas that produced the largest first correlation value or the largest second correlation value for the insertion of watermarks.

8. The device of claim 7, wherein, the processor executable code when executed by the processor, configures the device to:

conduct a spatial psychovisual analysis on one or more frame frames that include the designated selected area(s), including the following:

apply a non-linear inverse gamma curve to luminance components of the one or more video frames corresponding to the human visual system response in dark areas;

perform a Laplacian or a Gaussian pyramid operation multiple times at multiple resolutions on the one or more video frames subsequent to the applying of the non-linear inverse gamma curve to detect highly textured areas; and perform a edge detection operation to detect edge features within the one or more frames.

9. The device of claim 7, wherein, the processor executable code when executed by the processor, configures the device to:

embed the first watermark value in the designated area of the frame to produce a first embedded version of the frame;

embed the first watermark value in the designated area of the frame to produce a first embedded version of the frame;

re-encode the first and the second versions of the frame to obtain a first and a second encoded version of the frame, respectively;

decode the first and second versions of the encoded frames;

compare one or more measures of quality associated with the decoded first and second versions with corresponding one or more reference measures of quality; and based on the comparing, make a determination to accept or reject the frame as a frame that is suitable for watermark insertion.

* * * * *